United States Patent [19]

Creber et al.

[11] Patent Number: 5,340,655
[45] Date of Patent: Aug. 23, 1994

[54] METHOD OF MAKING SHAPED CERAMIC COMPOSITES WITH THE USE OF A BARRIER AND ARTICLES PRODUCED THEREBY

[75] Inventors: David K. Creber, Kingston, Canada; William B. Johnson; Marc S. Newkirk, both of Newark, Del.

[73] Assignee: Lanxide Technology Company, LP, Newark, Del.

[21] Appl. No.: 819,308

[22] Filed: Jan. 9, 1992

Related U.S. Application Data

[63] Continuation-in-part of Ser. No. 786,660, Nov. 1, 1991, abandoned, which is a continuation-in-part of Ser. No. 724,236, Jul. 1, 1991, abandoned, which is a continuation-in-part of Ser. No. 659,523, Feb. 22, 1991, Pat. No. 5,236,786, which is a continuation of Ser. No. 295,488, Jan. 10, 1989, abandoned, which is a continuation of Ser. No. 861,024, May 8, 1986, Pat. No. 4,923,832.

[51] Int. Cl.$^5$ ............................................. B32B 9/04
[52] U.S. Cl. .................................... 428/446; 428/448; 428/688; 428/689; 428/697; 428/698; 428/702; 501/89; 501/92; 501/93; 501/94; 501/133
[58] Field of Search ............... 428/446, 688, 689, 697, 428/698, 702, 448; 501/89, 92, 93, 94, 133

[56] References Cited

U.S. PATENT DOCUMENTS 1,362,237 12/1920 Ros ........................... 423/618 OR
2,741,822 4/1956 Udy ................................ 25/157

(List continued on next page.)

FOREIGN PATENT DOCUMENTS 0116809 8/1984 European Pat. Off. .

(List continued on next page.)

OTHER PUBLICATIONS

A. J. Moulson, "Review: Reaction-Bonded Silicon Nitride: Its Formation and Properties", J. Mat. Science, 14, (1979), 1017–1051.

(List continued on next page.)

*Primary Examiner*—Ellis P. Robinson
*Assistant Examiner*—Timothy M. Speer
*Attorney, Agent, or Firm*—Mark G. Mortenson; Jeffrey R. Ramberg

[57] ABSTRACT

In the present invention, there is provided a method for producing a self-supporting ceramic or ceramic composite body by the oxidation of a parent metal to form a polycrystalline ceramic material comprising the oxidation reaction product of said parent metal with an oxidant, including a vapor-phase oxidant, and optionally one or more metallic constituents dispersed throughout the polycrystalline ceramic material. The method comprises the steps of providing at least a portion of said parent metal with a barrier means at least partially spaced from said parent metal for establishing at least one surface of the ceramic body, and heating said parent metal to a temperature above its melting point but below the melting point of the oxidation reaction product to form a body of molten metal. At that temperature, the molten metal is reacted with the oxidant, thus forming the oxidation reaction product. At least a portion of the oxidation reaction product is maintained in contact with and between the molten metal and oxidant to transport the molten metal through the oxidation reaction product toward the barrier means and into contact with the oxidant so that fresh oxidation reaction product continues to form at an interface between the oxidant and previously formed oxidation reaction product. The reaction is continued until the oxidation reaction product contacts the barrier means to produce a ceramic body having the surface established by the barrier means. A shaped ceramic composite is formed by superimposing a barrier means onto either a loose mass of filler material or a self-supporting preform, and infiltrating the mass of filler or preform with the polycrystalline ceramic matrix, which grows until it contacts the barrier means.

23 Claims, 24 Drawing Sheets

U.S. PATENT DOCUMENTS

| | | | |
|---|---|---|---|
| 3,108,887 | 10/1963 | Lenie | 501/984 |
| 3,255,027 | 6/1966 | Talsma | 264/65 |
| 3,262,763 | 7/1966 | Bechtold | 501/984 |
| 3,296,002 | 1/1967 | Hare | 501/80 |
| 3,298,842 | 1/1967 | Seufert | 501/127 |
| 3,419,404 | 12/1968 | Mao | 501/984 |
| 3,421,863 | 1/1969 | Bawa | 501/128 |
| 3,437,468 | 4/1969 | Seufert | 75/235 |
| 3,473,938 | 10/1969 | Oberlin | 264/65 |
| 3,473,987 | 10/1969 | Sowards | 501/119 |
| 3,538,231 | 11/1970 | Newkirk | 373/117 |
| 3,551,101 | 12/1970 | Matsuo | 423/412 OR |
| 3,692,474 | 9/1972 | Arber | 423/411 X |
| 3,789,096 | 1/1974 | Church et al. | 264/60 |
| 3,796,564 | 3/1974 | Taylor et al. | 75/203 |
| 3,864,154 | 2/1975 | Gazza et al. | 29/123 |
| 3,973,977 | 8/1976 | Wilson | 501/120 |
| 4,117,096 | 7/1978 | Hosaka et al. | 501/884 |
| 4,824,625 | 4/1989 | Claar et al. | 264/126 |
| 4,885,199 | 12/1989 | Corbin | 428/113 |
| 4,923,832 | 5/1990 | Newkirk et al. | 501/128 |

FOREIGN PATENT DOCUMENTS

| | | | |
|---|---|---|---|
| 0155831 | 9/1985 | European Pat. Off. | |
| 0127208 | 7/1985 | Japan | 423/412 |
| 1011527 | 4/1983 | U.S.S.R. | 423/618 |
| 0896766 | 5/1962 | United Kingdom | 423/412 |
| 2127709 | 4/1984 | United Kingdom | 423/412 |

OTHER PUBLICATIONS

Drouzy et al., "Oxidation of Molten Aluminum Alloys", Reaction With Refractories, France, vol. 29, No. 332, pp. 121–128, Mar. 1974.

Clavaud et al., "Refractories for Aluminum Alloy Melting Furnaces," Sep. 25 & 26, 1980.

Moskovits, "The Kinetics of Oxidation of Molten Aluminum in Oxidation Streams", Oxidation of Metals, vol. 5, No. 1 (1972).

W. Kaiser and C. D. Thurmond, "Nitrogen in Silicon", Journal of Applied Physics, vol. 30, No. 3, pp. 427–431, Mar. 1959.

Kari Blegen, "Equilibria and Kinetics in the Systems Si–N and Si–N–O" pp. 223–244, Special Ceramics, vol. 6 (1975).

Y. W. Cho and J. A. Charles, "Synthesis of Nitrogen Ceramic Powders by Carbothermal Reduction and Nitridation, Part 1 Silicon Nitride", Materials Science and Technology Apr. 1991 vol. 7, pp. 289–298.

A. J. Moulson, "Review: Reaction–bonded Silicon Nitride: Its Formation and Properties", Journal of Materials Science 14 (1979) pp. 1017–1051.

R. A. Alliegro, "Processing and Fabrication of Non–Hot–Pressed Silicon Carbide", Ceramics For High Performance Applications, vol. 2 (1974) pp. 253–263.

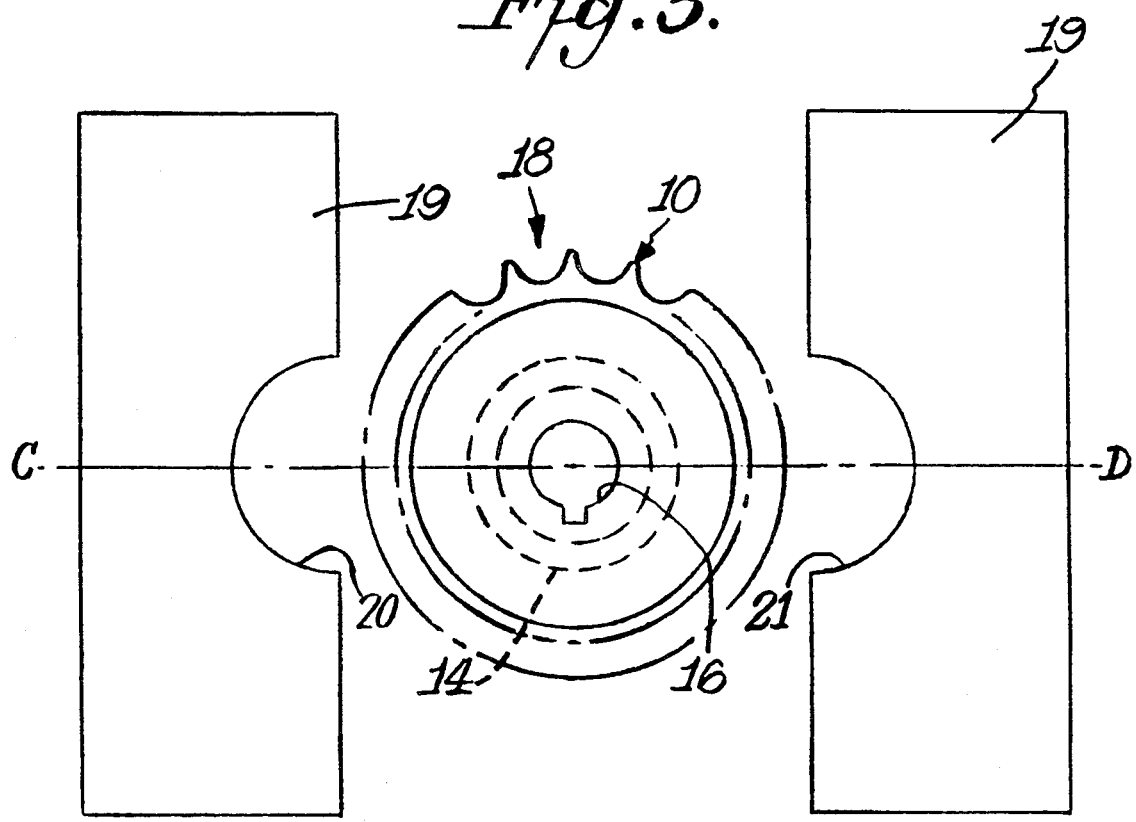
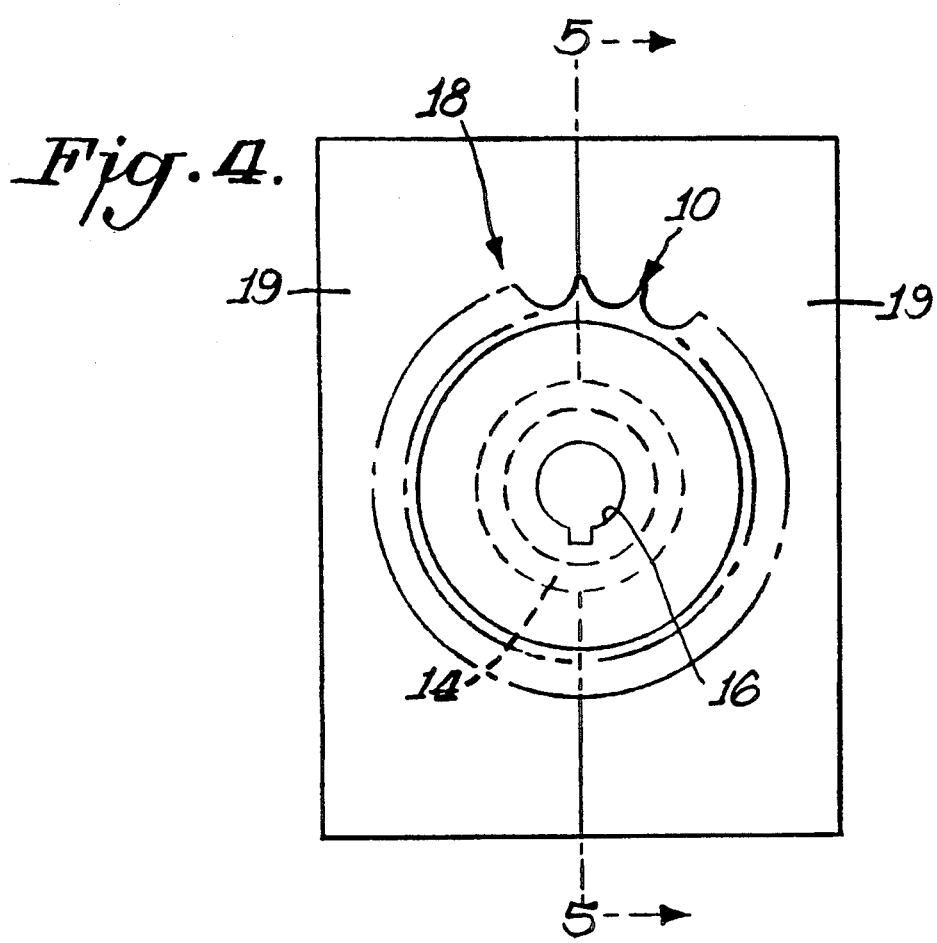

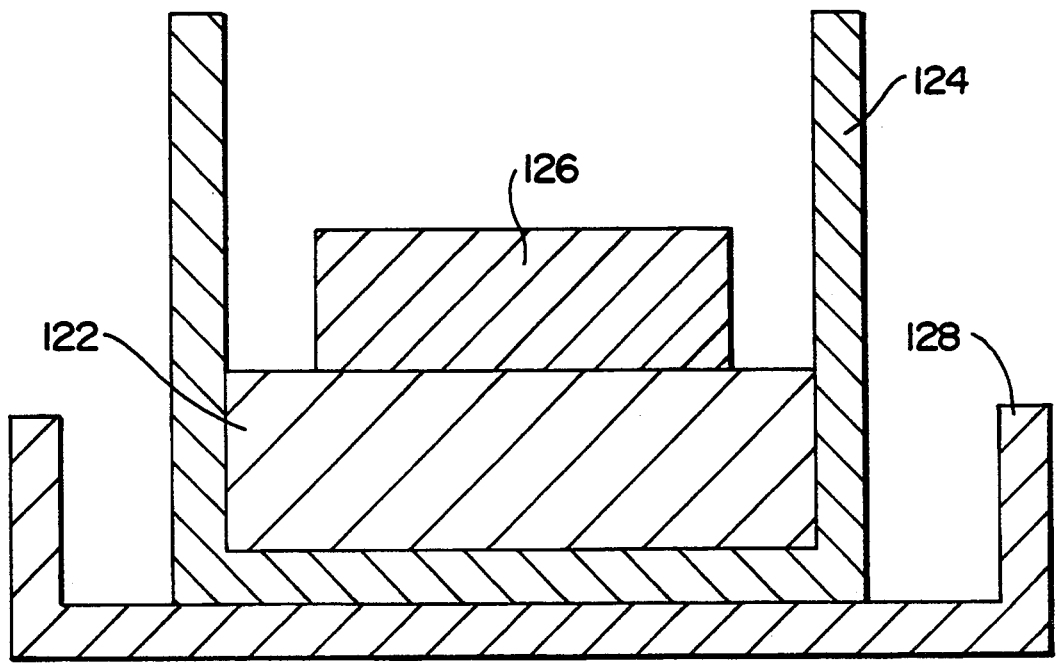
Fig_ 15
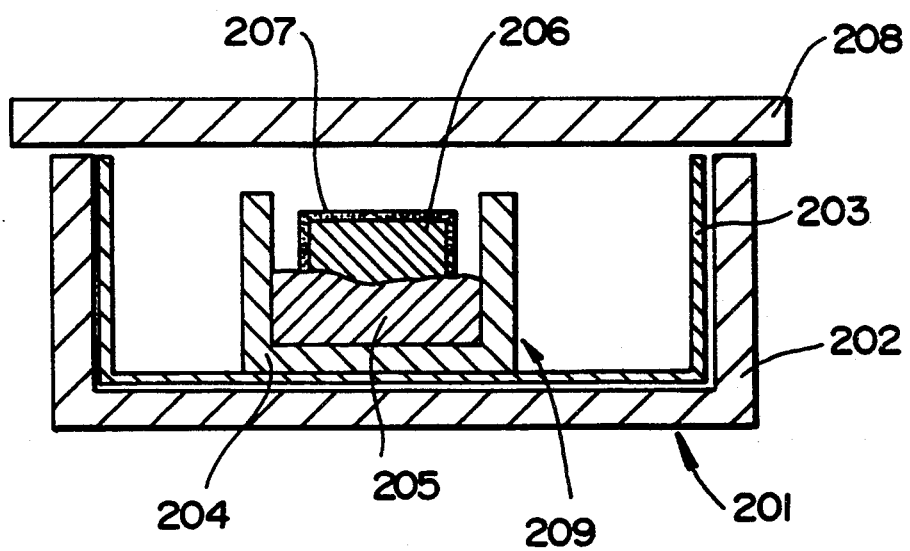
Fig_ 17

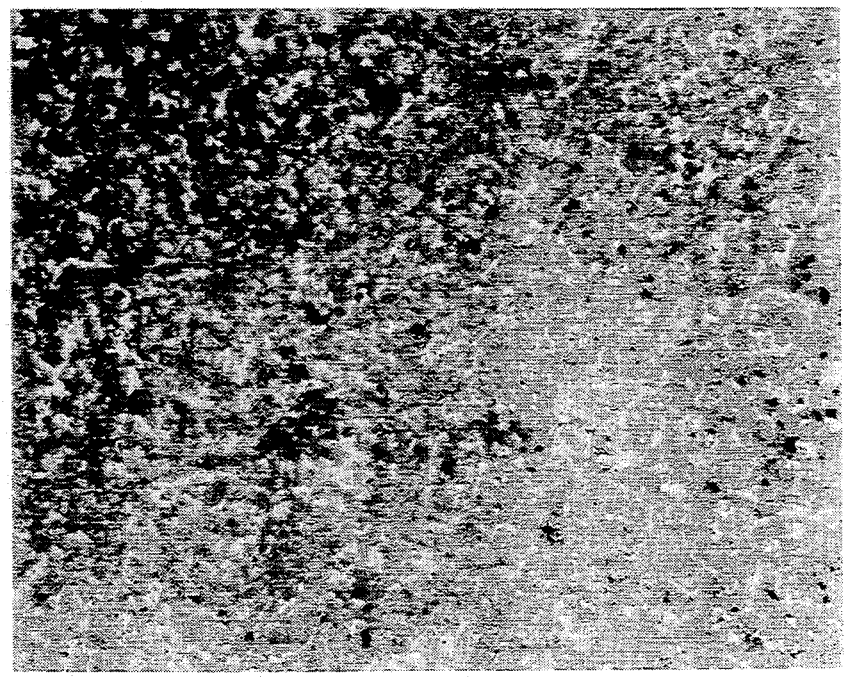
Fig_ 19k
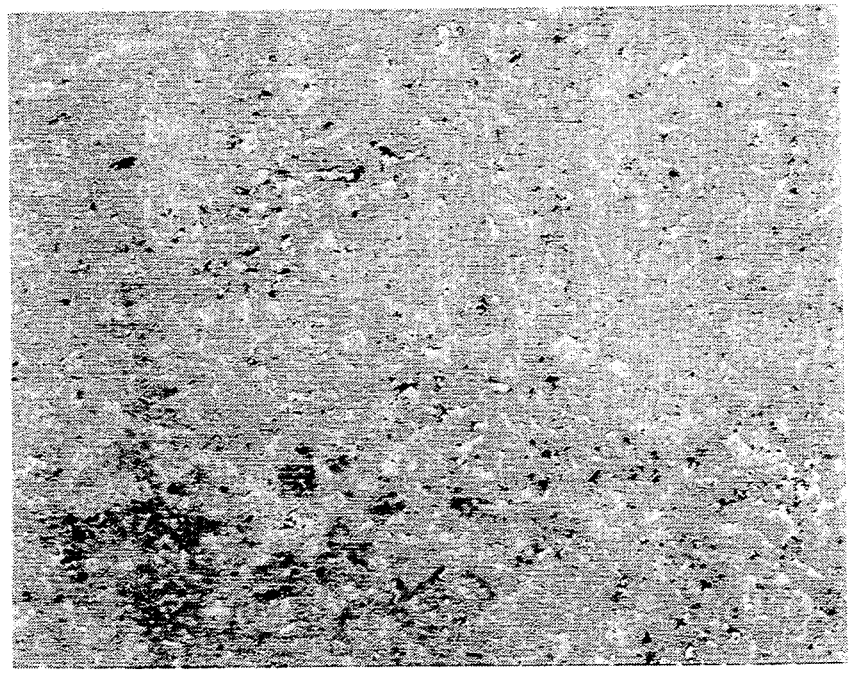
Fig_ 19l

METHOD OF MAKING SHAPED CERAMIC COMPOSITES WITH THE USE OF A BARRIER AND ARTICLES PRODUCED THEREBY

CROSS REFERENCE TO RELATED PATENT APPLICATION AND PATENT

This patent application is a continuation-in-part of U.S. patent application Ser. No. 07/786,660, which was filed on Nov. 1, 1991, now abandoned as a continuation-in-part of U.S. patent application Ser. No. 07/724,236, which was filed on Jul. 1, 1991, now abandoned as a continuation-in-part of U.S. patent application Ser. No. 07/659,523, U.S. Pat. No. 5,236,786, which was filed on Feb. 22, 1991, as a continuation 07/295,488, now abandoned, which was filed on Jan. 10, 1989, and now abandoned, which was a continuation of U.S. Pat. No. 4,923,832, which issued on May 8, 1990, from U.S. patent application Ser. No. 06/861,024, which was filed on May 8, 1986, all of which are expressly incorporated by reference herein.

FIELD OF THE INVENTION

This invention broadly relates to methods for producing self-supporting ceramic bodies. More particularly, this invention relates to methods for producing shaped self-supporting silicon nitride ceramic bodies, including shaped ceramic composites, grown by the oxidation reaction of a silicon precursor metal to a barrier means for establishing a surface, perimeter, boundary or the like in order to produce net shapes.

BACKGROUND OF THE INVENTION

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities when compared with metals, coupled with the fact that the engineering limits of performance of many modern components and systems are now gated by these properties in conventionally employed materials. Examples of areas for such prospective use include engine components, heat exchangers, cutting tools, bearings and wear surfaces, pumps, and marine hardware.

Current efforts at producing higher strength, more reliable, and tougher ceramic articles are largely focused upon (1) the development of improved processing methods for monolithic ceramics and (2) the development of ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse kinds of filler or preform materials such as particulates, fibers, rods or the like.

There are several known limitations or difficulties in substituting ceramics for metals, such as scaling versatility, capability to produce complex shapes, satisfying the properties required for the end use application, and costs. Several copending patent applications and patents assigned to the same owner as this application overcome these limitations or difficulties and provide novel methods for reliably producing ceramic materials, including composites. Thus, commonly owned U.S. Pat. No. 4,713,360 which issued on Dec. 15, 1987, and was based on U.S. application Ser. No. 06/818,943, filed Jan. 15, 1986, which was a continuation-in-part of application Ser. No. 06/776,964, filed Sep. 17, 1985, now abandoned, which was a continuation-in-part of application Ser. No. 06/705,787, filed Feb. 26, 1985, now abandoned, which was a continuation-in-part of application Ser. No. 06/591,392, filed Mar. 16, 1984, now abandoned, all in the names of Marc S. Newkirk et al and entitled NOVEL CERAMIC MATERIALS AND METHODS OF MAKING THE SAME, disclose generically the method of producing self-supporting ceramic bodies grown as the oxidation reaction product from a parent metal precursor. Molten metal is reacted with a vapor-phase oxidant to form an oxidation reaction product, and the metal migrates through the oxidation product toward the oxidant and further oxidizes, thereby continuously developing a ceramic polycrystalline body. The process may be enhanced by the use of an alloyed dopant, such as is used in the case of oxidizing aluminum in air to form alpha-alumina ceramic structures. This method was improved upon by the application of dopant materials to the surface of the precursor metal, as disclosed in commonly owned U.S. application Ser. No. 07/220,935, filed Jun. 23, 1988, now U.S. Pat. No. 4,853,352, which was a continuation of Ser. No. 06/822,999, filed Jan. 27, 1986, now abandoned, which was a continuation-in-part of Ser. No. 06/776,965, filed Sep. 17, 1985, now abandoned, which was a continuation-in-part of application Ser. No. 06/747,788, filed Jun. 25, 1985, now abandoned, which was a continuation-in-part of application Ser. No. 06/632,636, filed Jul. 20, 1984, now abandoned, entitled METHODS OF MAKING SELF-SUPPORTING CERAMIC MATERIALS, all in the names of Marc S. Newkirk et al.

This oxidation phenomenon was utilized in producing composite ceramic bodies as described in commonly owned U.S. patent application Ser. No. 07/265,835, filed Nov. 1, 1988, how U.S. Pat. No. 4,916,113, both entitled METHODS OF MAKING COMPOSITE CERAMIC ARTICLES, which was a continuation of application Ser. No. 819,397, filed Jan. 17, 1986, now U.S. Pat. No. 4,851,375, entitled METHODS OF MAKING COMPOSITE CERAMIC ARTICLES HAVING EMBEDDED FILLER, which was a continuation-in-part of application Ser. No. 06/697,876, filed Feb. 4, 1985, now abandoned, entitled COMPOSITE CERAMIC ARTICLES AND METHODS OF MAKING SAME, all in the names of Marc S. Newkirk et al. This patent discloses novel methods for producing a self-supporting ceramic composite by growing an oxidation reaction product from a parent metal precursor into a permeable mass of filler, thereby embedding the filler within a ceramic matrix. The resulting composite, however, has no defined or predetermined geometry, shape, or configuration.

A method for producing ceramic composite bodies having a predetermined geometry or shape is disclosed in the commonly owned U.S. application Ser. No. 07/338,471, filed Apr. 14, 1989, now U.S. Pat. No. 5,017,526, entitled METHOD OF MAKING SHAPED CERAMIC COMPOSITE, which was a continuation of application Ser. No. 06/861,025, filed May 8, 1986, entitled SHAPED CERAMIC COM- POSITES AND METHODS OF MAKING THE SAME and in the names of Marc S. Newkirk et al. In accordance with the method of this invention, the developing oxidation reaction product infiltrates a permeable preform in the direction towards a defined surface boundary. Ceramic composites having a cavity with an interior geometry inversely replicating the shape of the original parent metal body are disclosed in commonly owned U.S. application Ser. No. 06/823,542, filed Jan. 27, 1986, now U.S. Pat. No. 4,828,785, in the names of Marc S. Newkirk et al. and entitled INVERSE SHAPE REPLICATION METHOD OF MAKING CERAMIC COMPOSITE ARTICLES.

The entire disclosures of all of the foregoing commonly owned patent applications and patents are expressly incorporated herein by reference.

A key element in using the methods of the above-mentioned commonly owned copending applications and patents to produce a net or near net shape ceramic body, including composite bodies which retain essentially the original shape and dimensions of the filler or preform, is to minimize or inhibit ceramic matrix overgrowth of defined surface boundaries. Overgrowth of the surface boundaries can be substantially prevented by controlling the infiltration of the polycrystalline ceramic matrix to any defined surface boundaries, which may be accomplished such as by using a predetermined quantity of parent metal, establishing within the preform favorable oxidation kinetics, exhausting the oxidizing atmosphere or lowering the reaction temperature. Any of these steps may require close control or vigilance to obtain essentially no polycrystalline overgrowth of any defined surface boundary, and still may not produce the most desirable net or near net shape, or may require additional machining or finishing.

The present invention provides means for reliably establishing a boundary or substantially preventing overgrowth of the developing oxidation reaction product which is desirable in forming net shapes particularly with larger, single-piece bodies or bodies with complicated geometry.

SUMMARY OF THE INVENTION

The present invention broadly provides a self-supporting ceramic body obtained by the oxidation reaction of a silicon parent metal to form a polycrystalline material consisting essentially of a silicon nitride oxidation reaction product of the parent metal with one or more nitrogenous oxidants, including nitrogenous vapor-phase oxidants and, optionally, one or more metallic constituents, having a surface boundary established by a barrier means. The vapor-phase oxidant may be used in conjunction with a solid oxidant or a liquid oxidant, as explained below in greater detail. A barrier means is used to establish a surface, perimeter, boundary or the like of the ceramic body.

The present invention further broadly provides a ceramic composite of a desired, predetermined shape. In accordance with this embodiment, a shaped mass of filler material having a surface boundary is superimposed with a barrier means to inhibit formation of the ceramic body therebeyond. Development or growth of the oxidation reaction product infiltrates the shaped mass and essentially terminates with the barrier means.

In accordance with one method of the present invention, the self-supporting ceramic body is produced by providing a barrier means at least partially spaced from the parent metal. The parent metal is heated to a temperature above its melting point but below the melting point of the oxidation reaction product to form a body of molten metal, and at this temperature or within this temperature range, the molten metal reacts with a vapor-phase oxidant to form the oxidation reaction product. It should be understood that the operable temperature range or preferred temperature may not extend over this entire temperature interval. At least a portion of the oxidation reaction product is maintained in contact with and between the molten metal and the oxidant, to draw molten metal through the polycrystalline material towards the barrier means and into contact with the oxidant such that fresh oxidation reaction product continues to form at the interface between the oxidant and previously formed oxidation reaction product, and optionally, leaving metallic constituents dispersed or distributed through the polycrystalline material. It should be understood that the polycrystalline material may exhibit porosity in place of some or all of the metal phase(s), but the volume percent of voids will depend largely on such conditions as temperature, time, and type of parent metal. The reaction is continued to produce the ceramic body grown to the surface or boundary established by the barrier means.

Most typically in forming a ceramic composite by the method of the present invention, the parent metal is positioned adjacent to and preferably in contact with a bed of filler material having a predetermined form or shape, e.g. a preform, such that the surface of the pre-shaped bed possessing a barrier means is situated outwardly, or away from, or spaced from, the parent metal. Formation and growth of the oxidation reaction product occurs in the bed in a direction towards the surface having the barrier means. The reaction is continued until the polycrystalline oxidation reaction product has infiltrated the preshaped mass to produce the ceramic composite having a configuration or geometry of the bed with the barrier means inhibiting or terminating growth thereby achieving a net or near net shape body.

The materials of this invention can exhibit substantially uniform properties throughout their cross-section to a thickness heretofore difficult to achieve by conventional processes for producing dense ceramic structures. The process which yields these materials also obviates the high costs associated with some conventional ceramic production methods, including fine, high purity, uniform powder preparation, hot pressing and hot isostatic pressing. The products of the present invention are adaptable or fabricated for use as articles of commerce which, as used herein, is intended to include, without limitation, industrial, structural and technical ceramic bodies for such applications where electrical, wear, thermal, structural, or other features or properties are important or beneficial; and is not intended to include recycle or waste materials such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but, rather, refers to a body which is predominantly ceramic with respect to either composition or dominant properties, although the body may contain minor or substantial amounts of one or more metallic constituents derived from the parent metal or produced from the oxidant or a dopant, most typically within a range of from about 1–40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of the reaction of one or more metals with an oxidant.

"Oxidant" means one or more suitable electron acceptors or electron sharers and may be an element, combination of elements, a compound, or combination of compounds including reducible compounds, and is a vapor, solid or liquid at the process conditions.

"Parent metal" refers to that metal, e.g. silicon, which is the precursor for the polycrystalline oxidation reaction product, and includes that metal as a relatively pure metal, a commercially available metal with impurities and/or alloying constituents, or an alloy in which the metal precursor is the major constituent; and when a specified metal is mentioned as the parent metal, e.g. silicon, the metal identified should be read with this definition in mind unless indicated otherwise by the context.

BRIEF DESCRIPTION OF THE DRAWINGS

FIG. 3 is a plan view of the preform of FIG. 2 showing the parent metal plate before contacting with the preform.

FIG. 4 is a plan view of the assembly of preform and parent metal in accordance with Example 1.

FIG. 15 is a cross-sectional view of a lay-up used to form a composite in accordance with Example 10.

FIG. 17 is a cross-sectional view of a lay-up used to form composites in accordance with Example 11.

FIGS. 19k and 19l are photomicrographs taken at a magnification of about 50 X corresponding to Samples K and L, respectively, of Example 12.

DETAILED DESCRIPTION OF THE INVENTION AND PREFERRED EMBODIMENTS

Figure 1:
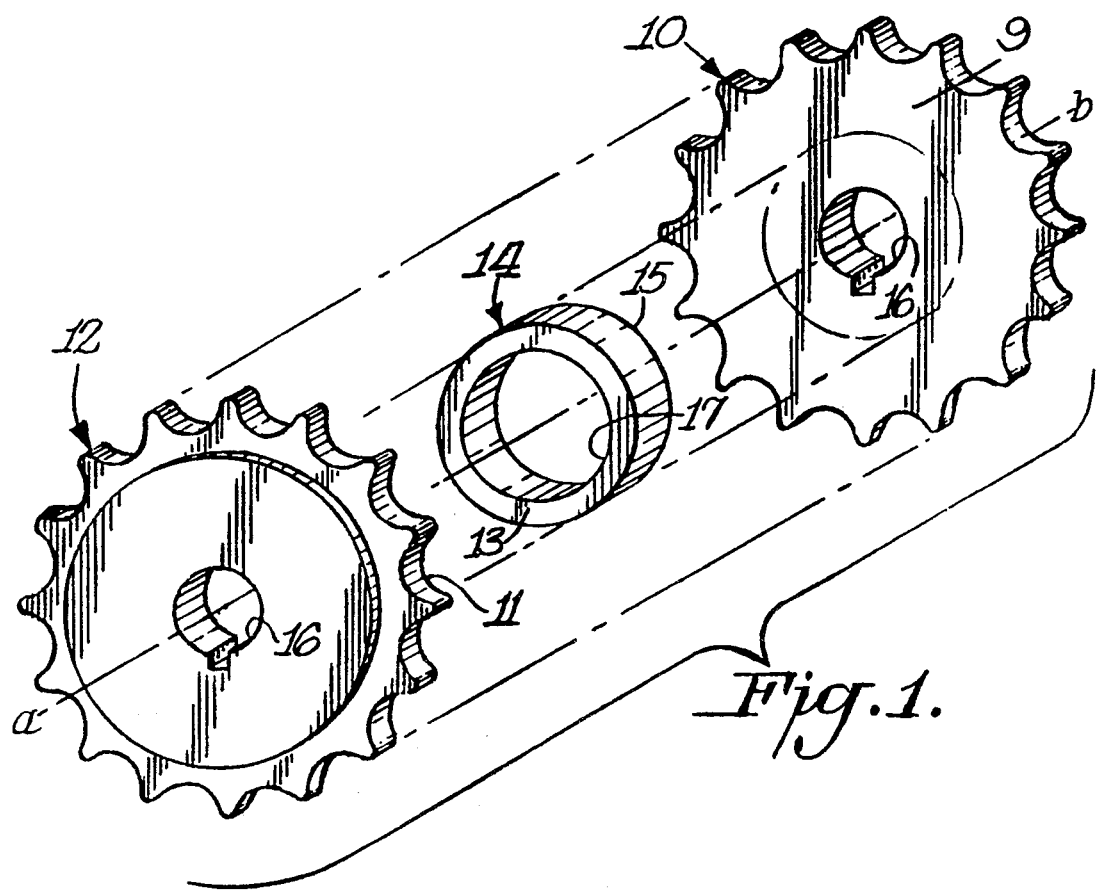
FIG. 1 is an exploded perspective view of the preform fabricated in accordance with Example 1.

In accordance with the present invention, the parent metal, which may be doped (as explained below in greater detail) and is the precursor to the oxidation reaction product, is formed into an ingot, billet, rod, plate, or the like, and placed in an inert bed, crucible or other refractory container. The parent metal is overlayed with a barrier means which is at least partially spaced from the parent metal. The barrier means establishes the surface, perimeter or boundary of the ceramic body in that growth or development of the oxidation reaction product is inhibited or terminated by the barrier means. The container, its contents, and the barrier means are subsequently placed in a furnace which is supplied with an oxidant including a vapor-phase oxidant. This setup is heated to temperatures below the melting point of the oxidation reaction product but above the melting point of the parent metal which, for example, in the case of aluminum using air as the vapor-phase oxidant, is generally between about 850°–1450° C. and more preferably between about 900°–1350° C.; and in the case of a silicon parent metal using a nitrogenous atmosphere, is generally between about 1450° C.–1800° C., and more preferably between about 1500° C.–1700° C. Within this operable temperature interval or range, a body or pool of molten metal forms, and on contact with the oxidant, the molten metal will react to form a layer of oxidation reaction product. Upon continued exposure to the oxidizing environment, molten metal is progressively drawn into and through any previously formed oxidation reaction product in the direction of the oxidant and towards the barrier means. On contact with the oxidant, the molten metal will react to form additional oxidation reaction product and thus form a progressively thicker oxidation reaction product while, optionally, leaving metallic constituents dispersed through the polycrystalline material. The reaction of the molten metal with the oxidant is continued until the oxidation reaction product has grown to the barrier means which prevents or inhibits growth of the oxidation reaction product and produces the net or near net shape ceramic body. Thus, the barrier means of this invention inhibits or terminates growth of the polycrystalline material and assists in producing a well-defined, net or near net shaped ceramic body.

It should be understood that the resulting polycrystalline material may exhibit porosity which may be a partial or nearly complete replacement of the metal phase(s), but the volume percent of voids will depend largely on such conditions as temperature, time, type of parent metal, and dopant concentrations. Typically in these polycrystalline ceramic structures, the oxidation reaction product crystallites are interconnected in more than one dimension, preferably in three dimensions, and the metal may be at least partially interconnected. Because of the barrier means, the ceramic product has generally well-defined boundaries regardless of the metal volume content or porosity.

The barrier means of this invention may be any suitable means which interferes, inhibits, or terminates growth or development of the oxidation reaction product. Suitable barrier means may be any material, compound, element, composition, or the like, which, under the process conditions of this invention, maintains some integrity, is not volatile and preferably is permeable to the vapor-phase oxidant while being capable of locally inhibiting, poisoning, stopping, interfering with, preventing, or the like, continued growth of the oxidation reaction product.

It appears that one category of barrier means is that class of materials which is substantially non-wettable by the transported molten parent metal. A barrier of this type exhibits substantially no affinity for the molten metal, and growth is terminated or inhibited by the barrier means. Other barriers tend to react with the transported molten parent metal to inhibit further growth either by dissolving into and diluting the transported metal excessively or by forming solid reaction products, e.g. intermetallics, which obstruct the molten metal transport process. A barrier of this type may be a metal or metal alloy, including any suitable precursor thereto such as an oxide or a reducible metal compound, or a dense ceramic. Because of the nature of the growth inhibition or obstruction process with this type of barrier, growth may extend into or somewhat beyond the barrier before growth is terminated. Nevertheless, the barrier reduces any final machining or grinding that may be required of the product. As stated above, the barrier should preferably be permeable or porous, and therefore, when a solid, impermeable wall is used, the barrier should be opened in at least one zone or at one or both ends to permit the vapor-phase oxidant to contact the molten parent metal.

Suitable barriers particularly useful in this invention in the case of using aluminum parent metals are calcium sulfate and calcium silicate, which are essentially non-wettable by the transported molten parent metal; and in the case of using silicon parent metals suitable barriers include boron nitride, titanium nitride, zirconium nitride and aluminum nitride, with boron nitride being the most preferred. Such barriers typically may be applied as a slurry or paste to the surfaces of a filler bed which preferably is preshaped as a preform. The barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20–1000. The alumina particulate may be mixed with the calcium sulfate, for example, in a ratio ranging from about 10:1 to 1:10, with the preferred ratio being about 1:1. In one preferred embodiment of the invention, the barrier means includes an admixture of calcium sulfate (i.e. Plaster of Paris) and portland cement. The portland cement may be mixed with the Plaster of Paris in a ratio of 10:1 to 1:10, with the preferred ratio of portland cement to Plaster of Paris being about 1:3. Where desired, portland cement may be used alone as the barrier material.

Another preferred embodiment, when using aluminum parent metals, comprises Plaster of Paris admixed with silica in a stoichiometric amount, but there can be an excess of Plaster of Paris. During processing, the Plaster of Paris and silica react to form calcium silicate, which results in a particularly beneficial barrier in that it is substantially free of fissures. In still another embodiment, the Plaster of Paris is admixed with about 25–40 weight percent calcium carbonate. On heating, the calcium carbonate decomposes emitting carbon dioxide, thereby enhancing the porosity of the barrier means.

Other particularly useful barriers for aluminum-based parent metal systems include ferrous materials, e.g. a stainless steel container, chromia and other refractory oxides, which may be employed as a superimposed wall or container to the filler bed, or as a layer to the surface of a filler bed. Additional barriers include dense, sintered or fused ceramics such as alumina. These barriers are usually impermeable, and therefore are either specially fabricated to allow for porosity or require an open section such as an open end. The barrier means may form a friable product under the reaction conditions and can be removed as by abrading to recover the ceramic body.

When certain filler materials (e.g., silicon nitride) are utilized with a silicon parent metal and a nitrogenous atmosphere as the oxidant, it may be desirable for a barrier material (e.g., a boron nitride barrier material) to be present on at least one surface of the mass of filler material or preform to be embedded by the growth of oxidation reaction product to prevent the molten silicon parent metal from wetting along the exterior surfaces of the mass of filler material or preform which could result in the surrounding or engulfing of the mass of filler material or preform by the molten silicon parent metal.

If the barrier material was not present on at least one surface of a mass or preform of such filler material, the resulting encapsulation of the filler material by the molten silicon parent metal could prevent the silicon nitride oxidation reaction product from completely embedding the filler material.

The barrier means may be manufactured or produced in any suitable form, size, and shape, and preferably is permeable to the vapor-phase oxidant. The barrier means may be applied or utilized as a film, paste, slurry, pervious or impervious sheet or plate, or a reticulated or foraminous web such as a metal or ceramic screen or cloth, or a combination thereof. The barrier means also may comprise some filler and/or binder.

The size and shape of the barrier means depends on the desired shape for the ceramic product. By way of example only, if the barrier means is placed or situated at a predetermined distance from the parent metal, growth of the ceramic matrix would be locally terminated or inhibited where it encounters the barrier means. Generally, the shape of the ceramic product is the inverse of the shape of the barrier means. For example, if a concave barrier is at least partially spaced from a parent metal, the polycrystalline growth occurs within the volumetric space defined by the boundary of the concave barrier and the surface area of the parent metal. Growth terminates substantially at the concave barrier. After the barrier means is removed, a ceramic body remains having at least a convex portion defined by the concavity of the barrier means. It should be noted that with respect to a barrier means having porosity, there may be some polycrystalline material overgrowth through the interstices, although such overgrowth is severely limited or eliminated by the more effective barrier materials. In such a case, after the barrier means is removed from the grown polycrystalline ceramic body, any polycrystalline overgrowth may be removed from the ceramic body by grinding, grit blasting or the like, to produce the desired ceramic part with no remaining overgrowth of polycrystalline material. By way of a further illustration, a barrier means spaced from a parent metal, and having a cylindrical protuberance in the direction of the metal, will produce a ceramic body with a cylindrical recess inversely replicating the same diameter and depth of the cylindrical protuberance.

In order to achieve minimal or no polycrystalline material overgrowth in the formation of ceramic composites, the barrier means may be placed on, or positioned in close proximity to, the defined surface boundary of any filler bed or preform. Disposal of the barrier means on the defined surface boundary of the bed or preform may be performed by any suitable means, such as by layering the defined surface boundary with the barrier means. Such layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, growth of the polycrystalline oxidation reaction product terminates upon reaching the defined surface boundary of the preform and contacting the barrier means.

In a preferred embodiment of the present invention, a permeable shaped preform (described below in greater detail) is formed having at least one defined surface boundary with at least a portion of the defined surface boundary having, or superimposed with, the barrier means. It is understood that the term "preform" may include an assembly of separate preforms ultimately bonded into an integral composite, and explained below in greater detail. The preform is placed adjacent to and in contact with one or more parent metal surfaces or a portion of a surface of the parent metal such that at least a portion of the defined surface boundary having or superimposed with the barrier means is generally positioned distantly or outwardly from the metal surface, and formation of the oxidation reaction product will occur into the preform and in a direction towards the defined surface boundary with the barrier means. The permeable preform is part of the lay-up, and upon heating in a furnace, the parent metal and the preform are exposed to or enveloped by the vapor phase oxidant, which may be used in combination with a solid or a liquid oxidant. The reaction process is continued until the oxidation reaction product has infiltrated the preform and comes in contact with the defined surface boundary having, or superimposed with, the barrier means. Most typically, the boundaries of the preform, and of the polycrystalline matrix, substantially coincide; but individual constituents at the surfaces of the preform may be exposed or may protrude from the matrix, and therefore infiltration and embeddment may not be complete in terms of completely surrounding or encapsulating the preform by the matrix. The barrier means prevents, inhibits or terminates growth upon contact with the barrier means, and substantially no "overgrowth" of the polycrystalline material occurs. The resulting ceramic composite product includes a preform infiltrated or embedded to its boundaries by a ceramic matrix comprising a polycrystalline material consisting essentially of the oxidation reaction product of the parent metal with the oxidant and, optionally, one or more metallic constituents such as non-oxidized constituents of the parent metal or reduced constituents of an oxidant.

A preferred embodiment employing a barrier means with a preform is illustrated in the accompanying FIGS. 1–7, and further explained in Example 1. Here the preform typically may comprise silicon carbide having a mesh size of 500. The defined surface boundary is coated with a permeable layer of $CaSO_4$ (Plaster of Paris) which is to act as a barrier means. This layer is applied as a thixotropic slurry or paste which then sets by hydrolysis, facilitating handling of the lay-up. After the entire lay-up has been heated in a furnace to the process temperature range, the polycrystalline oxidation reaction product grows and infiltrates the preform to the defined surface boundary. The $CaSO_4$ prevents overgrowth of the polycrystalline material beyond the defined surface boundary of the infiltrated preform. After being heated during the oxidation reaction process, the $CaSO_4$ has dehydrolyzed, facilitating its easy removal from the surface of the preform by light grit-blasting, scraping or tumbling in abrasive powder or grit.

Figure 12:
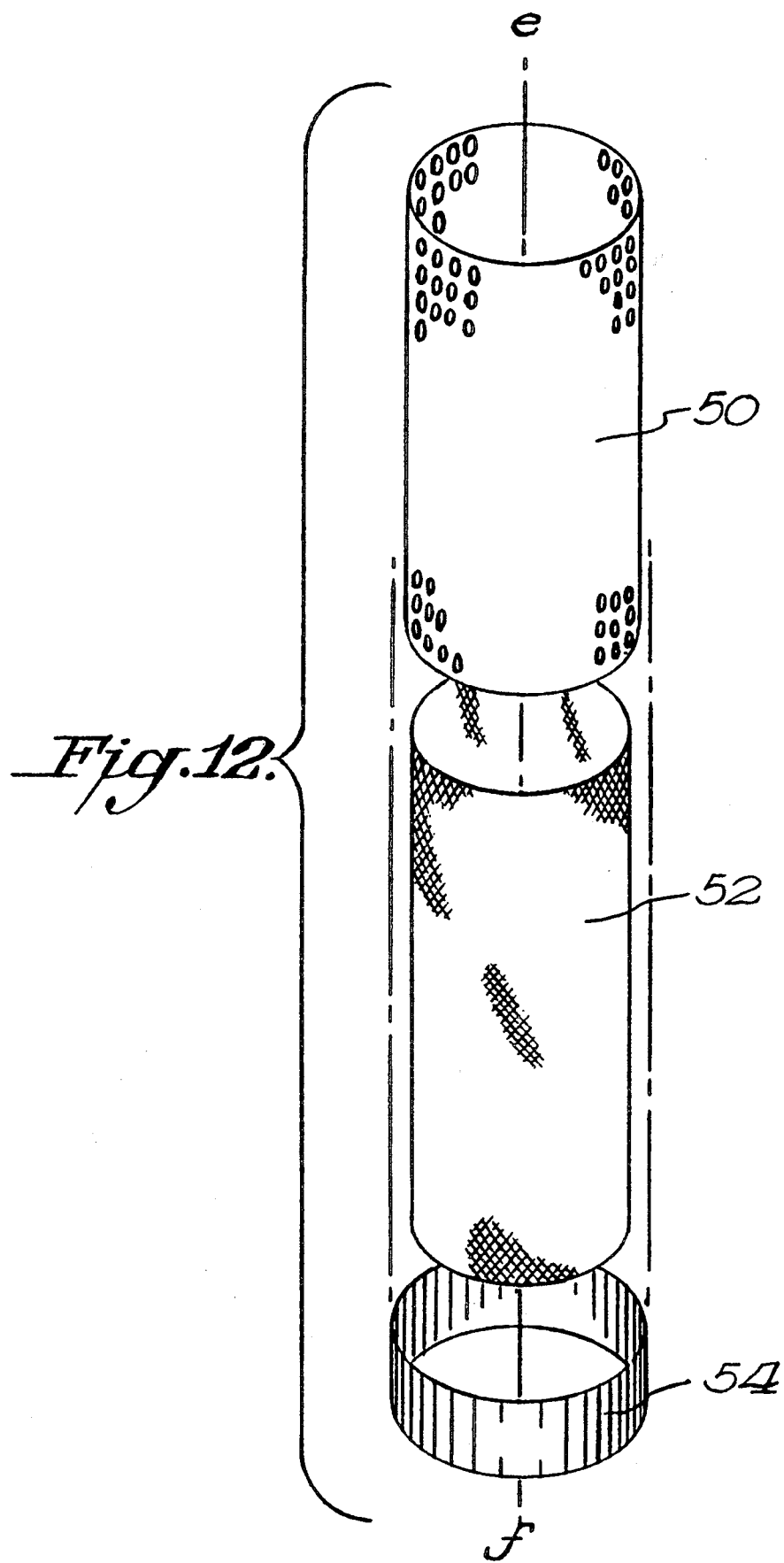
FIG. 12 is an exploded perspective view of the stainless steel barrier assembly of Example 6.

In still another embodiment for producing a composite having a negative cavity pattern inversely replicating a positive pattern of the parent metal precursor, the barrier per se is selected to possess sufficient structural integrity to support the set-up. Particulate filler material is packed around at least a portion of a shaped parent metal precursor, but there should be no seepage of the particulate through the porous barrier. In order to avoid seepage of the filler, the barrier means includes a foraminous or reticulated container such as sheath or sleeve (e.g. metal screen) enveloping the particulate filler. If this sheath is not structurally strong at the process conditions, the sheath can be reinforced with a second, stronger sleeve (e.g. a ceramic, steel or steel alloy cylinder) arranged concentrically with the reticulated sheath. The cylinder has a perforated pattern to allow the vapor-phase oxidant to permeate the sleeve and sheath and to contact the molten parent metal, but the combination of cylinder and sheath prevents the particulate filler from seeping through the barrier means. The surface geometry of the filler is congruent to the interior surface of the container, which is then replicated by the resulting composite product. FIG. 12 and Example 6 depict this embodiment of a barrier means in the form of a metal container for a vertical lay-up.

It should be understood that certain barriers referred to herein may undergo chemical changes or alterations in composition or species under the process conditions. In the case of an applied barrier composition comprising a mixture of calcium sulfate (Plaster of Paris) and alumina particles, for example, under the process conditions, the mixture can form calcium aluminum oxysulfate. A barrier comprised of AISI 304 stainless steel can oxidize under process conditions to the constituent metal oxides and, most predominantly, iron oxide. Any undesired barrier materials remaining can be easily removed from the ceramic body.

The ceramic composite obtained by the practice of the present invention will usually be a coherent product wherein between about 5% and about 98% by volume of the total volume of the ceramic composite product is comprised of one or more of the preform materials embedded to the defined surface boundary of the preform with a polycrystalline material matrix. The polycrystalline material matrix is usually comprised of, when the parent metal is aluminum or silicon, about 60% to about 99% by volume (of the volume of polycrystalline material) for example, interconnected aluminum oxide or silicon nitride and about 1% to 40% by volume (same basis) of nonoxidized constituents of the parent metal.

Although the present invention is hereinafter described with particular emphasis on systems wherein aluminum or an aluminum alloy is employed as the parent metal and alumina is the intended oxidation reaction product, or wherein silicon or a silicon alloy is employed as the parent metal and silicon nitride is the intended oxidation reaction product those references are for exemplary purposes only, and it is to be understood that the present invention is adaptable by application of the teachings herein to other systems wherein other metals such as tin, titanium, zirconium, etc., are employed as the parent metal, and the intended oxidation reaction product is that metal oxide, nitride, boride, carbide, or the like. Thus, the barrier means may depend upon such factors as choice of parent metal, dopants, ceramic matrix, composition of the filler material, and process conditions. Calcium sulfate may be a useful barrier in such other systems when the conditions are somewhat similar to aluminum, as for example in the case of tin with air as the oxidant. On the other hand, calcium sulfate would not be a suitable barrier for a process carried out in a temperature region or under reaction conditions wherein calcium sulfate is not stable, e.g. titanium in a nitrogen atmosphere, which oxidation reaction is in excess of 2000° C. For such high temperature reactions, a dense alumina ceramic or zirconia ceramic, for example, which otherwise satisfies the criteria herein of a barrier, might be employed which can withstand the high temperature of the process while maintaining the characteristics necessary for a barrier.

In the process of this invention, the vapor-phase oxidant is normally gaseous or vaporized at the process conditions to provide an oxidizing atmosphere, such as atmospheric air. Typical vapor oxidants include, for example, elements or compounds of the following, or combinations of elements or compounds of the following, including volatile or vaporizable elements or constituents of compounds or mixtures: oxygen, nitrogen, a halogen, sulphur, phosphorus, arsenic, carbon, boron, selenium, tellurium, and compounds and combinations thereof, for example, methane, ethane, propane, acetylene, ethylene, propylene (the hydrocarbons as a source of carbon), and mixtures such as air, $H_2/H_2O$, and $CO/CO_2$, the latter two (i.e., $H_2/H_2O$ and $CO/CO_2$) being useful in reducing the oxygen activity of the environment. Oxygen or gas mixtures containing oxygen (including air) are suitable vapor-phase oxidants, with air usually being preferred for obvious reasons of economy. When a vapor-phase oxidant is identified as containing or comprising a particular gas or vapor, this means a vapor-phase oxidant in which the identified gas or vapor is the sole, predominant or at least a significant oxidizer of the parent metal under the conditions obtained in the oxidizing environment utilized. For example, although the major constituent of air is nitrogen, the oxygen content of air is normally the sole oxidizer of the parent metal under the conditions obtained in the oxidizing environment utilized. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which typically contains about 96 volume percent nitrogen and about 4 volume percent hydrogen.

The oxidant may also include a solid oxidant and/or a liquid oxidant, which is solid or liquid at the process conditions. The solid oxidant and/or the liquid oxidant is employed in combination with the vapor-phase oxidant. When a solid oxidant is employed, it is usually dispersed or admixed through the entire filler bed or preform or through a portion of the bed or preform adjacent the parent metal, in particulate form, or perhaps as a coating on the bed or preform particles. Any suitable solid oxidant may be employed including elements, such as boron or carbon, or reducible compounds, such as oxides or borides of lower thermodynamic stability than the oxide or boride reaction product of the parent metal.

If a liquid oxidant is employed in conjunction with the vapor-phase oxidant, it may be dispersed throughout the entire filler bed or preform or a portion thereof adjacent to the parent metal, provided such liquid oxidant does not block access of the molten metal to the vapor-phase oxidant. Reference to a liquid oxidant means one which is a liquid under the oxidation reaction conditions and so a liquid oxidant may have a solid precursor such as a salt, which is molten or liquid at the oxidation reaction conditions. Alternatively, the liquid oxidant may be a liquid precursor, e.g., a solution of a material, which is used to coat part or all of the porous surfaces of the filler bed or preform and which is melted or decomposed at the process conditions to provide a suitable oxidant moiety. Examples of liquid oxidants as herein defined include low melting glasses.

Although the invention is described below with particular reference to a preform in the formation of composite bodies, it should be understood that loose filler beds are also applicable and useful in the practice of this invention.

The preform should be sufficiently porous or permeable to allow the vapor-phase oxidant to permeate the preform and contact the parent metal. The preform also should be sufficiently permeable to accommodate growth of the oxidation reaction product within the preform without substantially disturbing, upsetting or otherwise altering the configuration or geometry of the preform. In the event the preform includes a solid oxidant and/or liquid oxidant which may accompany the vapor-phase oxidant, the preform then should be sufficiently porous or permeable to permit and accept growth of the oxidation reaction product originating from the solid and/or liquid oxidant. It should be understood that whenever "preform" or "permeable preform" is referred to herein, it means a permeable preform possessing the foregoing porosity and/or permeability properties unless otherwise stated.

The permeable preforms may be created or formed into any predetermined desired size and shape by any conventional methods, such as slipcasting, injection molding, transfer molding, vacuum forming, or otherwise, by processing any suitable material(s), more specifically identified and described elsewhere. The permeable preform, as was previously mentioned, may include a solid oxidant and/or a liquid oxidant, used in conjunction with a vapor-phase oxidant as the oxidant. The permeable preform should be manufactured with at least one surface boundary, and such as to retain a significant shape integrity and green strength, as well as dimensional fidelity after being infiltrated and embedded by the ceramic matrix. The permeable preform, however, should be permeable enough to accept the growing polycrystalline oxidation reaction product. The permeable preform should also be capable of being wetted by the parent metal, and of such constituency that the polycrystalline oxidation reaction product can bond or adhere to and within the preform to produce a ceramic composite product of high integrity and well-defined borders.

The preform may be of any size or shape, as long as it contacts or is adjacent to the metal surface of the parent metal and has at least one surface boundary with a superimposed barrier means which defines the destination for the growing polycrystalline matrix. By way of example only, the preform may be hemispherical in shape with the flat surface boundary in contact with the parent metal surface and the dome-shaped surface boundary representing the defined surface boundary to where the polycrystalline material is to grow; or the preform may be cubical in shape with one square surface boundary contacting the metal surface of the parent metal and the remaining five square surface boundaries being the objective points for the growing polycrystalline matrix. A matrix of the polycrystalline material resulting from the oxidation reaction product growth is simply grown into the permeable preform so as to infiltrate and embed the latter to its defined surface boundary with the barrier means without substantially disturbing or displacing it.

The permeable preform of this invention may be composed of any suitable material, such as ceramic and/or metal particulates, powders, fibers, whiskers, wires, particles, hollow bodies or spheres, wire cloth, solid spheres, etc., and combinations thereof. The preform materials can comprise either a loose or bonded array or arrangement, which array has interstices, openings, intervening spaces, or the like, to render the preform permeable to the oxidant and the infiltration of molten parent metal to allow for the formation of oxidation reaction product growth without altering the configuration of the preform. The preform may include a lattice of reinforcing rods, bars, tubes, tubules, plates, wires, spheres or other particulates, wire cloth, ceramic refractory cloth or the like, or a combination of any of the foregoing, prearranged in a desired shape. Further, the material(s) of the preform may be homogeneous or heterogeneous. The suitable materials of the preform, such as ceramic powders or particulate, may be bonded together with any suitable binding agent, or the like, which does not interfere with the reactions of this invention, or leave any undesirable residual by-products within the ceramic composite product. Suitable particulates, such as silicon carbide or alumina, may have a grit size of from about 10 to 1000 or smaller or an admixture of grit sizes and types may be used. The particulate may be molded by known or conventional techniques as by forming a slurry of the particulate in an organic binder, pouring the slurry into a mold, and then letting the mold set as by drying or curing at an elevated temperature.

More specifically with respect to the suitable materials that may be employed in the formation and manufacture of the permeable preform or filler bed of this invention, three classes of useful materials may be identified as suitable materials for the permeable preform.

The first class contains those chemical species which, under the temperature and oxizing conditions of the process, are not volatile, are thermodynamically stable and do not react with or dissolve excessively in the tool ten parent metal. Numerous material s are known to those skilled in the art as meeting such criteria in the case where aluminum is the parent metal and air or oxygen is employed as the oxidant. Such materials include the single-metal oxides of: aluminum, $Al_2O_3$; cerium, $CeO_2$; hafnium, $HfO_2$; lanthanum, $La_2O_3$; neodymium, $Nd_2O_3$, praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgAl_2O_4$, are contained in this class of stable refractory compounds.

The second class of suitable materials for the preform are those which are not intrinsically stable in the oxidizing and high temperature environment of the preferred embodiment, but which can be used due to relatively slow kinetics of the degradation reactions. An example in the case of aluminum with oxygen or air in forming alumina ceramic matrix is silicon carbide. This material would oxidize completely under the conditions necessary to oxidize the aluminum were it not for a protective layer of silicon oxide forming and covering the silicon carbide particles to limit further oxidation of the silicon carbide.

A third class of suitable materials for the preform of this invention are those which are not, on thermodynamic or on kinetic grounds, expected to survive the oxidizing environment or the exposure to molten metal necessary for practice of the invention. Such materials can be made compatible with the process of the present invention if (1) the environment is made less active, for example through the use of $H_2O$ or $CO/CO_2$ as the oxidizing gases, or (2) through the application of a coating thereto, such as aluminum oxide, which makes the species kinetically nonreactive in the oxidizing environment. An example of such a class of materials would be carbon fiber employed in conjunction with a molten aluminum parent metal. If the aluminum is to be oxidized with air or oxygen at, for example 1250° C. to generate a matrix incorporating a preform containing said fibers, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant. Alternatively, the tendency of the carbon filler to react with the oxidant can be controlled by employing a $CO/CO_2$ atmosphere as oxidant which tends to be oxidizing to the aluminum but not the contained carbon fiber.

A preform used in the practice of this invention may be employed as a single preform or as an assemblage of preforms to form more complex shapes. It has been discovered that the polycrystalline matrix material can be grown through adjacent, contacting portions of a preform assemblage to bond contiguous preforms into a unified, or integral ceramic composite. The assembly of preforms is arranged so that a direction of growth of the oxidation reaction product will be towards and into the assembly of preforms to infiltrate and embed the assembly to the barrier means of the assemblage of preforms bonding them together. Thus, complex ceramic composites can be formed as an integral body which cannot otherwise be produced by conventional manufacturing techniques. It should be understood that whenever "preform" is referred to herein, it means a preform or an assemblage of preforms unless otherwise stated.

In the embodiment of the present invention wherein the primary constituent of the parent metal is silicon, and the oxidant comprises a nitrogenous atmosphere, suitable filler materials include silicon carbide, silicon nitride, carbon fibers, and mixtures thereof. More specifically, when the primary constituent of the filler material mass or preform is silicon carbide, it has been discovered that silicon oxide(s) may be important to the formation of the silicon nitride oxidation reaction product. The silicon oxide(s) may be present as a layer on the surface of the silicon carbide filler particles. The silicon oxide(s) may be formed on suitable silicon carbide in particulate form or in a preform that is fired or heated in an oxygen-containing atmosphere (e.g. air) at a temperature sufficient to form at least a partial coating of a silicon oxide (e.g., $SiO_2$) on a substantial portion of the particulate. For example, in using silicon carbide, firing or heating desirably is at a temperature of from about 1000° C. to about 1500° C., and preferably about 1175°–1275° C. The time required for producing a desirable oxide coating on such fillers depends on factors including particle size, shape, porosity and availability of oxidant. For silicon carbide having a grit size of about 1000 (average particle diameter of about 5 microns) to about 54 (average particle diameter of about 430 microns), a suitable firing time is about 0–40 hours. Alternatively, it has also been discovered that the presence of carbon (e.g., as carbon black, graphite, amorphous carbon, colloidal graphite, etc.) may be important to enhance the growth of a silicon nitride oxidation reaction product into a mass or preform of silicon nitride filler material (e.g., the carbon can be supplied as very fine particles which may be submicron in size). When the filler material is either particulate silicon carbide or silicon nitride, and the oxidation reaction product comprises silicon nitride, the average particle diameter of the filler material may range in size from a few microns to several hundreds of microns.

In certain embodiments of the present invention, it may be desirable to provide at least one protective coating on at least a portion of the filler material which prevents or inhibits any undersirable reaction which may occur between the molten parent metal or forming oxidation reaction product and the filler material. For example, when the parent metal comprises silicon and the oxidant comprises a nitrogenous atmosphere, carbon fibers may be utilized as a filler material if such carbon fibers are coated with at least one coating which will protect the carbon fibers from adverse reaction with the molten parent metal or the forming oxidation reaction product.

As a further embodiment of the invention and as explained in the Commonly Owned Patents and Patent Applications, the addition of dopant materials in conjunction with the parent metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the parent metal (1) may be provided as alloying constituents of the parent metal, (2) may be applied to at least a portion of the surface of the parent metal, or (3) may be applied to the filler bed or preform or to a part thereof, e.g., the support zone of the preform, or any combination of two or more of techniques (1), (2) and (3) may be employed. For example, an alloyed dopant may be used in combination with an externally applied dopant. In the case of technique (3) referred to above, where a dopant or dopants are applied to the filler bed or preform, the application may be accomplished in any suitable manner, such as by dispersing the dopants throughout part or the entire mass of the preform as coatings or in particulate form, preferably including at least a portion of the preform adjacent the parent metal. Application of any of the dopants to the preform may also be accomplished by applying a layer of one or more dopant materials to and within the preform, including any of its internal openings, interstices, passageways, intervening spaces, or the like, that render it permeable. A convenient manner of applying any of the dopant material is to merely soak the entire bed in a liquid (e.g., a solution) of dopant material. A source of the dopant may also be provided by placing a rigid body of dopant in contact with and between at least a portion of the parent metal surface and the preform. For example, a thin sheet of silicon-containing glass (useful as a dopant for the oxidation of an aluminum parent metal) can be placed upon a surface of the parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable preform occurs. In the case where the dopant is externally applied to at least a portion of the surface of the parent metal, the polycrystalline oxide structure generally grows within the permeable preform substantially beyond the dopant layer (i.e., to beyond the depth of the applied dopant layer). In any case, one or more of the dopants may be externally applied to the parent metal surface and/or to the permeable preform. Additionally, dopants alloyed within the parent metal and/or externally applied to the parent metal may be augmented by dopant(s) applied to the preform. Thus, any concentration deficiencies of the dopants alloyed within the parent metal and/or externally applied to the parent metal may be augmented by additional concentration of the respective dopant(s) applied to the preform and vice versa.

Useful dopants for an aluminum parent metal, particularly when used in combination with air as the oxidant, include, for example, magnesium metal and zinc metal, in combination with each other or in combination with other dopants as described below. These metals, or a suitable source of the metals, may be alloyed into the aluminum-based parent metal at concentrations for each of between about 0.1–10% by weight based on the total weight of the resulting doped metal. Concentrations within this range appear to initiate the ceramic growth, enhance metal transport and favorably influence the growth morphology of the resulting oxidation product. The concentration for any one dopant will depend on such factors as the combination of dopants and the process temperature.

Other dopants which are effective in promoting polycrystalline oxidation reaction growth, for aluminum-based parent metal systems are, for example, silicon, germanium, tin and lead, especially when used in combination with magnesium or zinc. One or more of these other dopants, or a suitable source of them, is alloyed into the the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying material to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials useful with an aluminum parent metal include sodium, lithium, calcium, boron, phosphorus and yttrium which may be used individually or in combination with one or more dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

Useful dopants for a silicon parent metal, particularly when used in combination with a nitrogenous atmosphere as the oxidant, include, for example, manganese, barium, germanium, strontium, iron, copper, vanadium, calcium and chromium, in combination with each other or alone, with manganese, iron, germanium and barium being the preferred dopants and manganese and iron being the most preferred dopants. These elements, or a suitable source of these elements, may be alloyed into the silicon-based parent metal at concentrations for each of between about 1–10% by weight based on the total weight of the resulting doped metal. Concentrations within this range appear to initiate the ceramic growth, enhance metal transport and favorably influence the growth morphology of the resulting oxidation reaction product. The concentration for any one dopant will depend on such factors as the combination of dopants and the process temperature.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable preform in selected areas. Thus, growth of the polycrystalline ceramic material into the permeable preform can be controlled by the localized placement of the dopant material upon the parent metal surface. The applied coating or layer of dopant is thin relative to the thickness of the parent metal body, and growth or formation of the oxidation reaction product into the permeable preform extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram of parent metal, or about 0.0001 gram of silicon per square centimeter of exposed parent metal surface, together with a second dopant having a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than about 0.0008 gram of dopant per gram of parent metal to be oxidized and greater than 0.003 gram of dopant per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy, and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

The invention will be illustrated by the following examples which are given by way of illustration and are not intended to be limiting.

EXAMPLE 1

Figure 2:
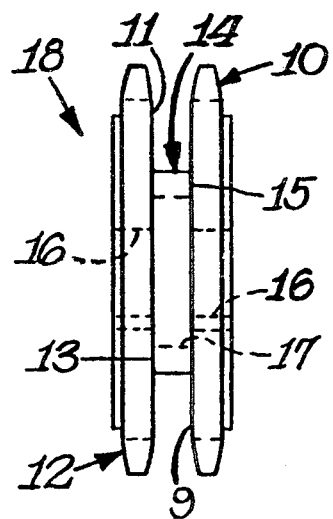
FIG. 2 is a cross-sectional view of the assembled preform of FIG. 1.

Referring in detail to FIGS. 1–7, wherein the same numerals designate similar parts throughout, an intricate ceramic body was fabricated by infiltration of a preform with a ceramic matrix. As shown in FIGS. 1 and 2, the preform comprised an assembly of three separately fabricated preform components 10, 12, and 14 which were bonded together with an organic binder (ELMER'S ®  wood glue). Each of the three preform components was formed by the same conventional method wherein silicon carbide particles were uniformly admixed with an organic binder solution (ELMER'S ® wood glue and water in a 4 to 1 ratio); and the resulting mixture was poured into a silicone rubber mold and allowed to air dry to set. Preform components 10 and 12 each comprised 500 grit silicon carbide particles mixed with the above organic binder solution before pouring into the rubber mold. Preform component 14 comprised 220 grit silicon carbide particles processed in a manner similar to components 10 and 12 except for the geometry of the preform mold. The preform components comprised two sprockets 10 and 12, each 3 inches in outer diameter and 3/16 inch thick having a center key hole shaped bore 16; and one cylinder 14, 1.63 inches in outer diameter and 1.13 inches in internal diameter and 0.33 inch in height. The three rigid preform components were assembled along axis a-b shown in the exploded perspective of FIG. 1 such that surface 9 of preform component 10 was contacted with surface 15 of preform component 14; and surface 11 of preform component 12 was contacted with surface 13 of preform component 14. The resulting geometry of the assembled preform indicated generally at 18 is shown in FIG. 2.

As illustrated in FIG. 3, a generally rectangular plate 19 of commercial aluminum alloy 380.1 served as the parent metal. This alloy was obtained from Belmont Metals Inc. and had a nominally identified composition by weight of 8–8.5% Si, 2–3% Zn and 0.1% Mg as active dopants, and 3.5% Cu as well as Fe, Mn, and Ni, but the actual Mg content was sometimes higher as in the range of 0.17–0.18%. The plate 19 measured approximately 5 inches long by 4 inches wide by 0.30 inch thick and had a circular bore located approximately at the geometric center of the plate. Plate 19 was sawed in half as to bisect this center bore, thereby having semicircular recesses 20 and 21. The split plate 19 was then assembled by moving the halves of plate 19 toward preform 18 along axis c-d and into abutment such that the entire outer surface of preform component 14 was circumscribed by recesses 20 and 21 of plate 19. This center bore now formed by the two recesses 20 and 21 was slightly larger in diameter than the outer diameter of preform component 14 to allow for the thermal expansion of the alloy during processing. The resulting assembly is shown in FIG. 4.

Figure 5:
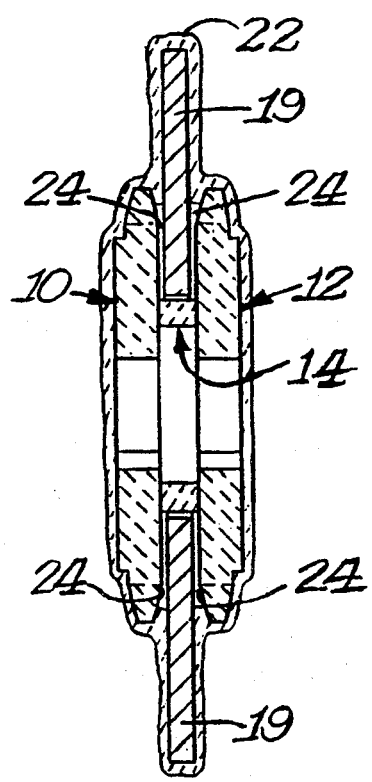
FIG. 5 is a cross-sectional view on line 5—5 of FIG. 4 coated by a barrier in accordance with Example 1.

As illustrated in FIG. 5, a barrier layer 22 approximately 0.03 to 0.06 inch thick, comprising a slurry of Plaster of Paris (BONDEX ® plaster, which contained about 35% by weight calcium carbonate, from Bondex Inc. of St. Louis, Mo.), was applied to all surfaces of the assembly of FIG. 4 which would normally be exposed to the atmosphere. However, space 24 between plate 19 and preform components 10 and 12 was not filled with the barrier as to allow for thermal expansion of the heated alloy. The barrier was applied by painting the exposed surfaces with the slurry, and the barrier 22 was allowed to set and then dried at room temperature to remove excess moisture. FIG. 5 shows the assembled system with the barrier layer applied.

Figure 6:
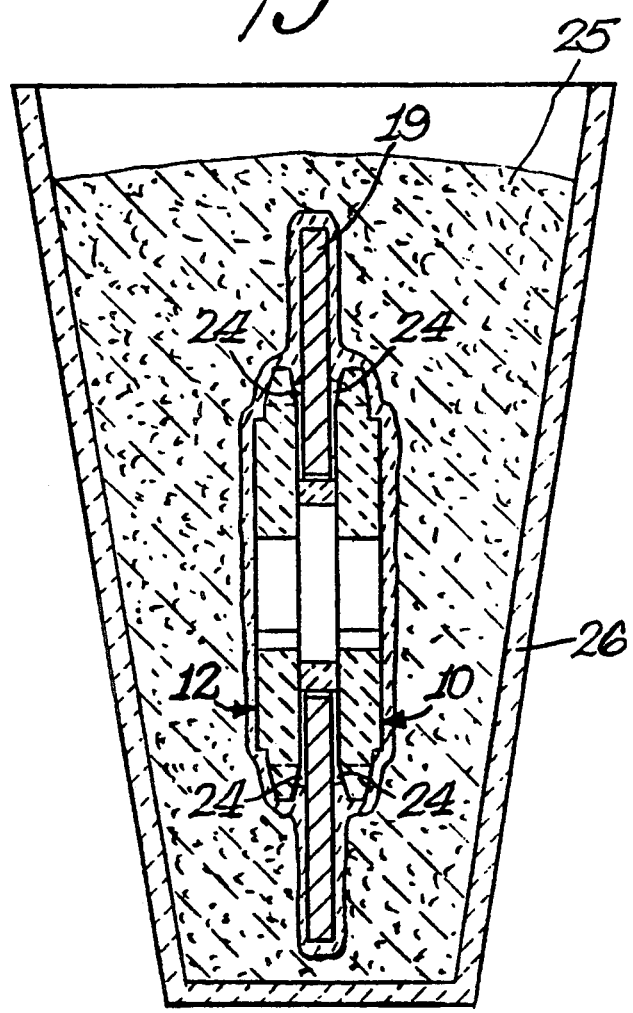
FIG. 6 is a cross-sectional view of the coated assembly on line 6—6 of FIG. 5 placed in an inert bed contained in a refractory vessel.

As illustrated in FIG. 6, the assembly of FIG. 5 was submerged in a bed of alumina particles 25 (E1 ALUNDUM ® alumina from Norton Co., 90 grit) which was contained in a refractory vessel 26. This lay-up was placed in a furnace (which was vented to allow for the flow of air) at 250° C. and heated up at a rate of 300° C./hour to 1000° C. The system was held at 1000° C. for 96 hours, and the lay-up was removed hot so that the excess aluminum alloy could be poured off while molten (which was accomplished by breaking away a portion of the barrier covering the alloy, and then draining off the molten metal).

The Plaster of Paris barrier, dehydrated by the process temperature, was easily removed from the surface of the assembly by light sandblasting without disturbing the surface of the composite.

Figure 7A:
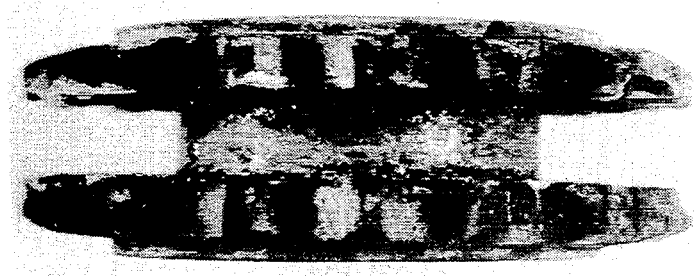
FIGS. 7a and 7b are photographs in elevational and plan view, respectively, of the composite formed in accordance with Example 1.
Figure 7B:
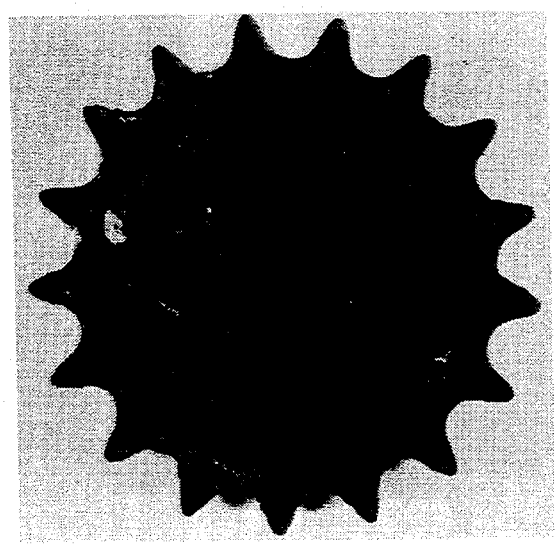

Examination of the assembly revealed that the alpha-alumina ceramic matrix (alpha-alumina identified by x-ray diffraction analysis of the material) had infiltrated preform 18 up to the barrier coated boundary surfaces but did not overgrow those boundary surfaces. In addition, the molten alloy had formed an oxide skin beneath the barrier layer 22; however, there was no oxide growth from the molten alloy body beyond this oxide skin in areas not contacting the preform. The oxide skin was easily removed by light sandblasting, and photographs of the resulting ceramic article is shown in FIGS. 7a and 7b.

The present example is illustrative of the utility of a barrier comprising Plaster of Paris (with calcium carbonate) in preventing overgrowth of a preform by an infiltrating ceramic matrix thereby obtaining a net shape. The present Example is additionally demonstrative of the ability of a Plaster of Paris barrier to efficiently contain a molten body of aluminum thereby mitigating loss of the alloy precursor to oxidation prior to infiltration of the preform thus minimizing the amount of alloy precursor necessary to completely infiltrate a preform body.

EXAMPLE 2

A cylindrical composite with a smooth internal surface was fabricated in the shape of a crucible closed at one end (measuring 3 inches long by 1 inch in external diameter with a 3 mm wall thickness), by growing a ceramic matrix into a crucible preform coated on its interior surfaces with a barrier material.

The preform was fabricated by a conventional slip casting technique. A slurry comprising 47.6 weight percent alumina particles (E67 ALUNDUM® alumina, from Norton, Co., 1000 mesh size), 23.7 weight percent Kaolin clay (EPK, Georgia Kaolin, Union, N.J., 98% less than 20 lm particle size) and 28.5 weight percent water, was mixed uniformly, and poured into a Plaster of Paris mold having the desired geometry of the preform. The crucible preform was cast for approximately 20 minutes, dried at 90° C. and then prefired at 700° C. for 30 minutes in air.

The preform was coated on its interior surfaces with a slurried mixture comprising 70 weight percent of Bondex Plaster of Paris and 30 weight percent silicon dioxide particles (500 mesh size), and the barrier layer was allowed to set and dried to remove excess moisture.

A refractory vessel was partially filled with aluminum alloy 380.1 (having the same nominally identified composition as in Example 1) and heated until the alloy was molten. The preform was filled with zirconia spheres (⅜ inch in diameter) and placed into the molten aluminum-filled refractory vessel such that the level of molten metal surrounding the preform substantially covered its outer geometry without spilling into the interior of the crucible. The zirconia spheres were employed to give the crucible sufficient weight to overcome its buoyancy in molten aluminum and thus maintain the outer surface of the preform in contact with the molten alloy. A layer of dry Plaster of Paris powder followed by a layer of silicon dioxide were placed on top of the molten alloy to mitigate oxidation of the molten alloy on the otherwise exposed surface. This lay-up was placed into a furnace (vented to allow for the flow of air), which was at 1000° C., and held there for 96 hours.

Figure 8:
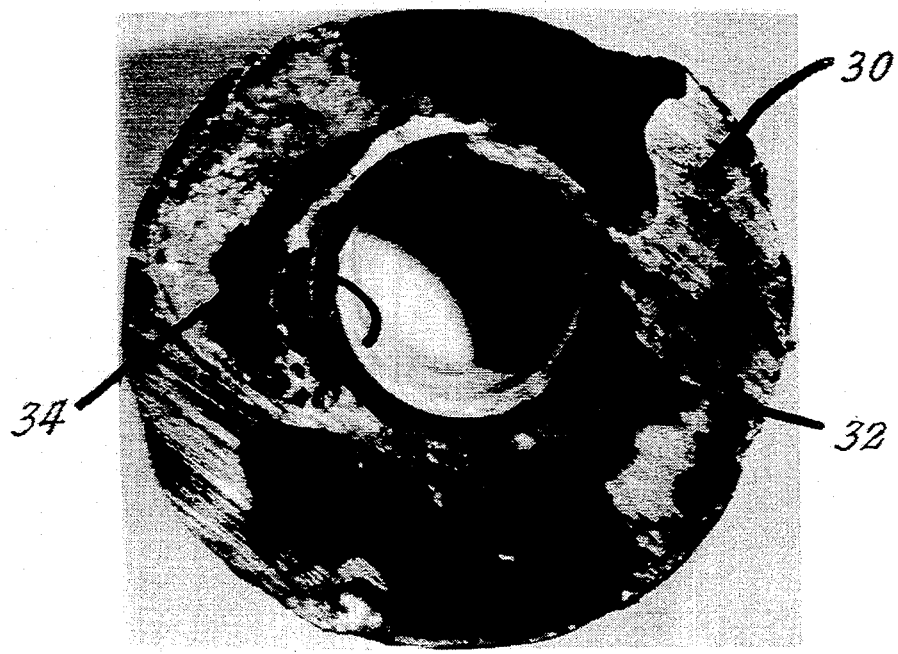
FIG. 8 is a photograph of the cross-sectional composite crucible formed in accordance with Example 2 showing the internal surface of the crucible.

The lay-up was removed from the furnace; and, after cooling, the ceramic crucible and the attached surrounding excess alloy were removed from the refractory vessel, the zirconia spheres removed, and the piece cross-sectioned at the top and bottom exposing the composite. The barrier, dehydrated by the reaction conditions, was easily removed by lightly sandblasting the interior of the cross-sectioned piece. Examination of the cross-sectioned surfaces showed complete infiltration of the preform by an alpha-alumina matrix (as evidenced by X-ray powder diffraction analyses of the material) to the barrier layer on the interior of the preform, but not beyond that layer. Referring to FIG. 8, the excess unreacted aluminum 30 surrounds the exterior of the ceramic composite 32. The internal surface 34 of the composite, which was coated by the barrier layer, is smooth and shows no overgrowth, thereby achieving high fidelity of the interior wall. The excess alloy can be removed by melting and separating the ceramic part without damaging or degrading the composite.

X-ray powder diffraction analysis of the removed barrier material showed the post-process composition of the barrier to be predominantly calcium silicate with minor amounts of unreacted calcium sulfate and silicon dioxide (in the alpha-quartz form).

EXAMPLE 3

An elbow-shaped composite ceramic tube with one open end and one closed end, having a smooth external surface, was fabricated by the infiltration of a preform with a ceramic matrix.

The preform was produced by a conventional sediment casting technique. A uniform mixture was prepared comprising 65 weight percent of 500 mesh alumina particles (38 ALUNDUM® alumina, from Norton Co.), 30 weight percent of 200 mesh alumina particles (38 ALUNDUM® alumina), and 5 weight percent of silicon metal particles (500 mesh size). The mixture was slurried with an organic binder solution (as described in Example 1), poured into a silicone rubber mold and dried to set. The preform was removed from the mold and the residual moisture was removed by drying. The preform was then prefired in air at 1300° C. for 2 hours.

A barrier material was applied to the outer surface of the preform by coating the surface with an approximately 0.2 mm thick layer of a slurried mixture comprising 50 weight percent of Bondex Plaster of Paris and 50 weight percent of alumina particles (38 ALUNDUM® alumina, Norton Co., 500 mesh). The barrier layer was allowed to set and dried to remove excess moisture; and the coated preform was placed into a refractory vessel and supported by refractory alumina spheres (½-¾ inch in diameter) such that the open end of the preform was flush with the alumina spheres.

The lay-up was placed in a furnace at 1000° C. to heat the preform to reaction temperature. The furnace was opened and molten aluminum alloy 380.1 (having the same nominal composition as given in Example 1) was poured into the open end of the preform up to the level of the open end, and thus the entire internal geometry of the preform was in contact with the molten alloy body.

The lay-up was held at 1000° C. for 96 hours, then removed from the furnace while hot, and the excess unreacted alloy was poured from the ceramic tube while still molten.

Figure 9:
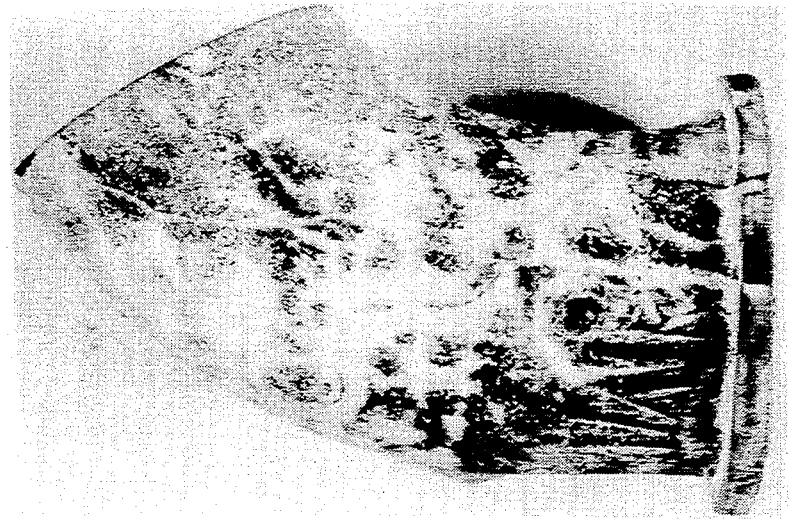
FIG. 9 is a photograph of the exterior surface of the composite body formed in accordance with Example 3.

After cooling the ceramic tube, the barrier layer was removed from the outer surface by light sandblasting. The ceramic tube was cross-sectioned approximately ¼ inch from the open end. Examination of the cross-sectioned composite showed that an alpha-alumina matrix (as evidenced by X-ray powder diffraction analysis) had completely infiltrated the preform up to the outer barrier layer. The outer surface of the ceramic shown in FIG. 9, which had been coated by the barrier, exhibited a smooth morphology with no overgrowth.

Post-process analysis of the removed barrier material showed the barrier composition to be predominantly calcium aluminum oxysulfate ($Ca_4Al_6O_{12}SO_4$) with minor amounts of alpha-alumina and unreacted calcium sulfate present, indicating the conversion of the barrier materials under the process conditions.

EXAMPLE 4

A ceramic sprocket was fabricated by infiltrating a preform with a ceramic matrix and employing a barrier material to control the geometry of the sprocket surface.

The preform (having the same dimensions and geometry as preform components 10 and 12 in Example 1) was fabricated by a conventional sediment-casting technique wherein 500 grit silicon carbide particles were uniformly admixed with an organic binder solution (as described in Example 1), poured into a silicone rubber mold and allowed to set for 6 hours. The excess water was removed from the surface of the sediment and the preform was dried. Two to three grams of silicon metal (2.0 mesh) were uniformly dispersed on the face of a disk of aluminum alloy 380.1 (having the nominal composition described in Example 1), measuring 3½ inches in diameter and ½ inch thick. The rigid preform was removed from the mold and placed on the alloy face with the silicon such that the bottom surface of the sprocket preform (analogous to surface 9 of preform 10 in FIG. 1) was in contact with the circular face of the alloy.

The entire assembly of preform and alloy was coated on all exposed surfaces by a barrier material. The barrier material comprised an aqueous slurried admixture of 25 weight percent Plaster of Paris (BONDEX® plaster), 25 weight percent portland cement (Type 1 from Keystone, Bath, Pa.), 25 weight percent silicon dioxide (Crystobalite, from CED Minerals, Ohio, 200 mesh) and 25 weight percent alumina particles (38 ALUNDUM® alumina, from Norton, 36 grit). The slurry was applied to the assembly on all exposed surfaces in a 1/16-⅛ inch thick layer and was allowed to set and then dried to remove excess moisture. The barrier covered assembly was placed on top of a bed of silicon carbide particles (24 grit) contained in a refractory vessel.

Figure 10:
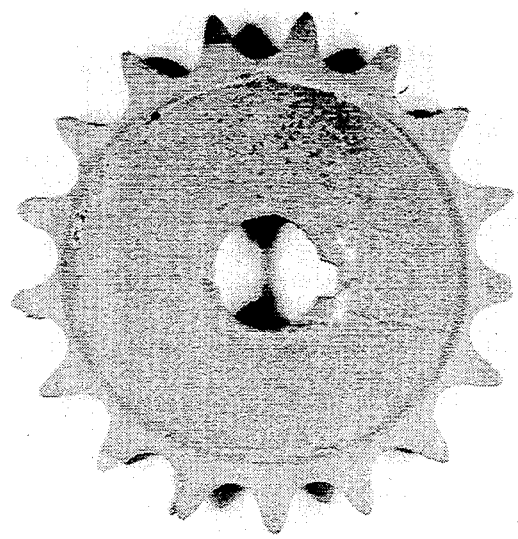
FIG. 10 is a photograph of the resulting composite fabricated in accordance with Example 4.

The above lay-up was placed in a furnace (which was vented to allow for the flow of air) and heated over a period of 5 hours to 900° C. The furnace was held at 900° C. for 80 hours, and then cooled down over a 5-hour period. The lay-up was taken out of the furnace, and the assembly removed from the bed. The barrier layer was removed from the surfaces of the assembly by light sandblasting, and the excess alloy was separated from the ceramic sprocket. The ceramic sprocket, shown in FIG. 10, had substantially no overgrowth by the alpha-alumina matrix on the surface coated with the barrier material. The few isolated spots of overgrowth on the sprocket surface are due to imperfections in the barrier coating (i.e., fissures or air pockets) and are not a result of penetration of the barrier itself.

EXAMPLE 5

A ceramic sprocket was fabricated by the infiltration of a barrier-coated preform, identical to that in Example 4, and by the procedure therein except that the barrier material comprised only portland cement (Type 1, from Keystone Co.).

An aqueous slurry of portland cement was applied as a 1/16-⅛ inch layer to the assembly of the sprocket preform and the 380.1 aluminum alloy disk, as in Example 4 (including the silicon layer as therein described). The barrier layer was allowed to set and dried to remove excess moisture. The coated assembly was placed on a bed of silicon carbide particles (24 mesh), which was contained in a refractory vessel, as in Example 4. The lay-up was placed into a furnace and heated up during a 10-hour period to 900° C. where it was held for 80 hours. The furnace was cooled over 5 hours, and the lay-up was removed. The coated assembly was removed from the bed, the barrier layer was easily removed from the surface of the ceramic composite by light sandblasting, and the excess alloy was separated from the ceramic composite sprocket.

Figure 11:
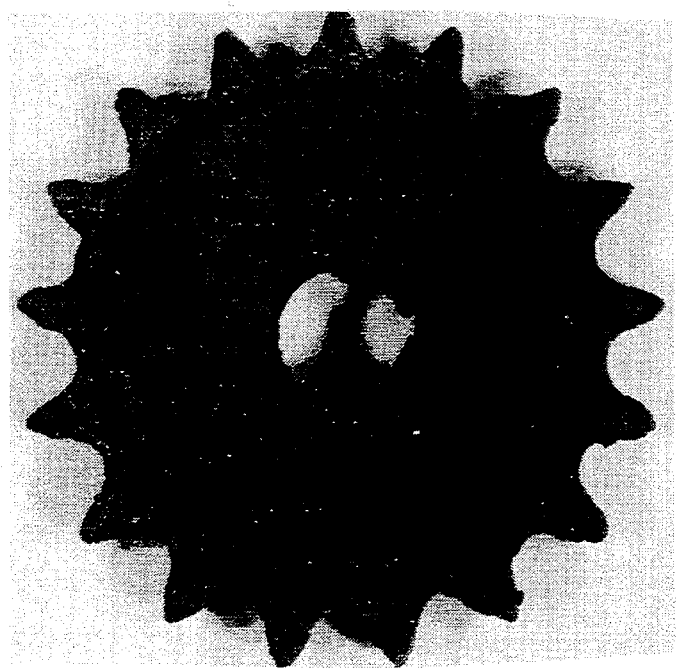
FIG. 11 is a photograph of the resulting composite fabricated in accordance with Example 5.

Examination of the resulting ceramic composite showed the alpha-alumina ceramic matrix had infiltrated the preform completely up to the barrier layer. The portland cement barrier layer effectively prevented overgrowth of preform boundaries by the ceramic matrix. The composite ceramic sprocket is shown in FIG. 11. As in Example 4, isolated incidents of overgrowth on the sprocket surface are due to imperfections in the barrier coating and not to penetration of same.

EXAMPLE 6

A ceramic composite structure having a cylindrical shape, measuring approximately 3¼ inches in diameter and 26 inches long, was fabricated by employing a cylindrical barrier means to attain the external cylindrical shape of the article. The barrier means shown as an exploded perspective in FIG. 12 comprised a three piece stainless steel structure (number 304 stainless steel having a nominal composition by weight of 0.08% C, 2% Mn, 1% Si, 0.045% P, 0.03% S, 18-20% Cr, 8-12% Ni; balance being Fe) comprising a perforated cylinder 50, a screen lining 52 and a bottom cap 54. The perforated cylinder 50 measured 3¼ inches in internal diameter and was constructed of 22 gauge stainless steel perforated uniformly over its surface area with holes 0.0625 inch in diameter such that 40% of the surface area of the cylinder was open for diffusion of air. The screen lining 52 measured approximately 3¼ inches in outer diameter and 0.080 inch thick, and its mesh comprised 0.016 inch diameter holes such that 30% of its surface area was open to diffusion of air. The bottom cap 54 was also constructed of 22 gauge stainless steel. The screen lining 52 was employed to prevent particles of filler material from escaping through the larger perforations in the outer sleeve during processing.

The stainless steel barrier was assembled along axis e-f in FIG. 12. A rod of aluminum (having an alloyed composition by weight of 10% silicon and 3% magnesium), measuring 26 inches long and 1 1/16 inches in diameter, having 16 fin-like protrusions over the center two thirds of its length, was covered uniformly over its entire surface with a layer of silicon dioxide particles (predominantly 100 mesh size or larger), employed as a dopant material and applied thereto with an organic binder. The rod was longitudinally placed in the center of the cylindrical barrier assembly. The assembly was then filled with a uniformly premixed filler material comprising 95 weight percent alumina particles (E38 ALUNDUM® alumina, from Norton Co., 90 mesh size) and 5 weight percent silicon dioxide (predominantly 100 mesh or larger) thus surrounding and supporting the aluminum rod.

The above system was placed in a refractory vessel, standing on its bottom cap. The resulting lay-up was placed in a furnace (vented to allow for the flow of air) and heated up over a 10-hour period to 1250° C. The furnace was held at 1250° C. for 225 hours, and then cooled down over a 30-hour cycle and the lay-up was removed.

Examination of the resulting composite material showed a ceramic cylinder comprising an alpha-alumina matrix embedding the alumina filler material having the outer dimensions of the stainless steel barrier and an internal cavity replicating the shape of the original parent metal assembly. Because a barrier was used in shaping the cylindrical ceramic body, grinding only was required to make a smooth surface on the ceramic cylinder. In the absence of a barrier, the ceramic product would have an irregular shape thereby requiring extensive machining and grinding.

EXAMPLE 7

A ceramic composite block was fabricated by infiltrating a ceramic matrix into a shaped preform which was coated by a barrier to retain the growth of the ceramic matrix within the dimensions of the preform.

The preform, measuring 2 inches square by ½ inch thick, was fabricated by a conventional sediment casting technique whereby an aqueous slurry comprising 98 weight percent silicon carbide particles (a uniform admixture of 70 weight percent 500 grit and 30 weight percent 220 grit particles), 1.75 weight percent of a commercially available latex (CASCOREZ Latex EA-4177, from Bordon Co.) and 0.25 weight percent polyvinyl alcohol, was poured into a silicone rubber mold where it was allowed to settle. Excess water was removed from the top of the sediment, and the preform was dried in air. The dried preform was fired at 1250° C. for 24 hours in air.

A circular disk of aluminum alloy 380.1 (having the same nominal composition as specified in Example 1), measuring 3 inches in diameter and ½ inch thick, had a layer of 2 grams of silicon metal (−20 mesh) uniformly dispersed over the top circular face, and the preform was placed on top of that face.

The above-described assembly of preform and layered alloy disk was coated on its perimeter (i.e., all surfaces of the preform and disk except the abutting faces of preform and disk), with an aqueous slurry comprising calcium silicate (VANSIL ®W10 wollastonite, from R. T. Vanderbilt, Norwalk, Conn.), such that the coating completely encased this assembly. The coating was dried, thus forming a barrier, and the barrier-encased assembly was embedded in silicon carbide particles (24 grit), contained in a refractory vessel, such that the top coated square surface of the preform was exposed to the atmosphere and substantially flush with the level of the bed.

The above lay-up was placed into a furnace and heated up over a 5-hour period to 900° C. The furnace was held at 900° C. for 100 hours and subsequently cooled down over a 5-hour period, at which time the lay-up was removed from the furnace.

The barrier-coated assembly was removed from the bedding and the barrier was separated from the assembly by light sandblasting. Examination of the assembly showed that the ceramic matrix comprising alpha-alumina, formed by the oxidation of the aluminum disk, had infiltrated the preform up to the perimeter of the preform established by the barrier. Isolated incidental overgrowth of the preform was attributed to imperfections in the barrier coating and not to the penetration of the composition of said barrier.

EXAMPLE 8

Figure 13A:
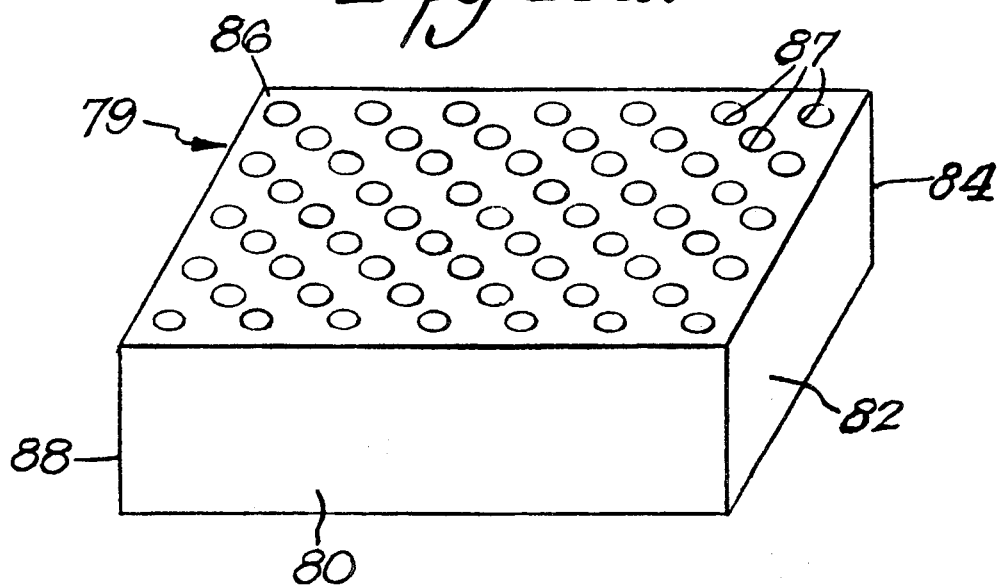
FIG. 13a is a perspective view of the stainless steel barrier of Example 8.
Figure 13B:
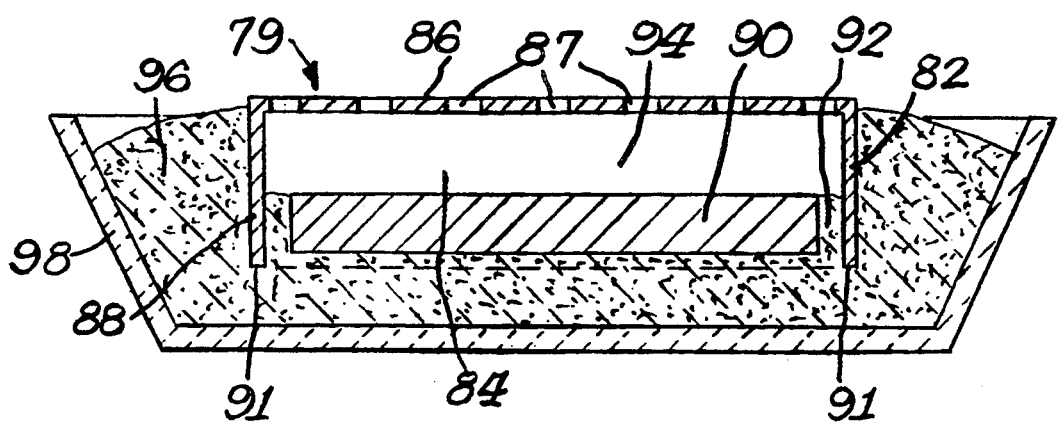
FIG. 13b is a cross-sectional view showing the assembly of the barrier of FIG. 13a overlaying a parent metal placed into an inert bed contained in a refractory vessel as in Example 8.

A ceramic body was produced having defined rectangular dimensions established by a barrier means fabricated from stainless steel (AISI 304, 22 gauge) into a rectangular structure. Referring in detail to FIGS. 13a and 13b, wherein the same numerals designate similar parts throughout, an open-ended rectangular box indicated as barrier means 79 is comprised of two rectangular side walls 80 and 84 measuring 9½ inches long by 2½ inches wide, two rectangular side walls 82 and 88 measuring 4½ inches long by 2½ inches wide, and one perforated top surface 86 measuring 9½ inches long by 4½ inches wide having perforations 87 uniformly covering its surface to allow the venting of air. The barrier was placed into a furnace and heated in air at 1000° C. for 24 hours and then removed from the furnace. As a result of heating, the barrier means was coated over its surface by an oxide coating.

Two rectangular bars 90 of aluminum alloy 380.1 (having the same nominally identified composition as in Example 1), measuring 9 inches long by 4 inches wide by 1½ inches thick, were each placed into separate beds 96 of alumina particles (E1 ALUNDUM® alumina, from Norton, 90 mesh size), contained in separate refractory vessels 98, such that one 9 inch by 4 inch face of the bar was exposed to the atmosphere and substantially flush with the alumina particle bed and the remaining five surfaces of the bar were submerged beneath the bedding. Two grams of a dopant material, silicon dioxide, were uniformly dispersed over the exposed 9 inch by 4 inch surface of each bar. Referring in detail now to FIG. 13b, the barrier was placed over one of the embedded aluminum bars such that the marginal edges 91 of the four side walls were submerged in the alumina particle bed to approximately the depth of the alloy bar 90, thus circumscribing the alloy bar but free from contact with the bar. The barrier was then surrounded by additional alumina particles (E1 ALUNDUM® alumina as above) such that the outer surfaces of the side walls were substantially submerged in bed 96 contained by vessel 98, and space 94 remained between the upper surface of alloy bar 90 and the inside face of top surface 86.

The two embedded aluminum bars, one covered by the aforesaid barrier (as shown in FIG. 13b), were placed into a furnace (which was vented to allow for the flow of air) and heated up over a 10-hour period to 1080° C. The furnace was held at 1080° C. for 55 hours and then cooled down over 10 hours, at the end of which period the vessels containing the embedded bars were removed from the furnace.

Figure 14:
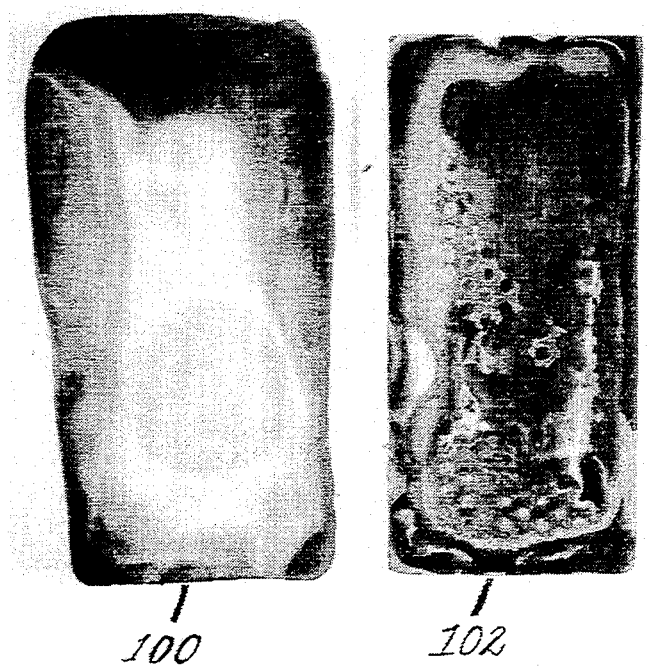
FIG. 14 is a photograph of the two composite bodies fabricated in Example 8.

The formed ceramic bodies were removed from the respective alumina beds, and the barrier was removed from the one contained ceramic body. Examination of the ceramic body 102 (see FIG. 14) fabricated with the barrier showed that the body formed into space 94 and was constrained by the side walls of the barrier, thus resulting in a ceramic body having a rectangular perimeter defined by the perimeter of the barrier (see FIG. 14). The growth of the ceramic body did not, however, completely reach the top surface of the barrier, and hence the top surface of the ceramic body was not so defined. FIG. 14 also shows the other ceramic body 100 resulting from oxidation of the aforesaid aluminum alloy in air with no barrier, and exhibiting an irregular surface resulting from the unconstrained growth.

The present example is demonstrative of the utility of a barrier means in dictating the dimensions of a relatively large ceramic component, fabricated by the oxidation of aluminum in air, thus resulting in substantial mitigation of post-fabrication processing to obtain a desired shape.

EXAMPLE 9

A preform block was prepared of 500 grit silicon carbide and then set up with 380.1 aluminum alloy, as in Example 7. This set-up was coated on all surfaces (except at the interface between the preform and alloy) with a barrier material of ceramic grade bone ash (tricalcium phosphate) from Hamill and Gilespie, Inc., Livingston, N.J. The barrier was dried, and the assembly then embedded in 24 grit silicon carbide particles contained in a refractory vessel with the top of the coated preform exposed to the atmosphere. The lay-up was heated in a furnace with an air atmosphere to 900° C. over a period of 5 hours, held at 900° C. for 100 hours, and then cooled in the furnace over a 5-hour period before being removed from the furnace.

The barrier-coated assembly was removed from the bedding, and some overgrowth that occurred at the interface between the alloy and preform was easily removed by tapping. The barrier was removed from the composite product by sandblasting. Examination of the product showed that the preform was infiltrated by a ceramic matrix, comprising alpha-alumina, to the perimeter established by the barrier.

EXAMPLE 10

This Example demonstrates the fabrication of a ceramic matrix composite body by the directed metal oxidation of a parent metal comprising silicon through a filler material comprising silicon carbide in a nitrogenous atmosphere to form a composite comprising silicon carbide embedded by a matrix comprising silicon nitride and some residual unreacted parent metal. FIG. 15 shows a cross-sectional schematic view of the lay-up employed in fabricating this particular composite body according to the method of the present Example.

A dry pressed preform was fabricated according to the following method.

About 2500 grams of 39 CRYSTOLON® green silicon carbide particulate (Norton Company, Worcester, Mass.) having an average particle diameter of about 86 microns was placed into the mixing bowl of a Model N-50 Hobart mixer (Hobart Corp., New Castle, Del.). The mixer was started on its slowest speed (Speed No. 1) and immediately a small quantity of ethyl alcohol was added to the mixing bowl to begin moistening the silicon carbide particulate. Small quantities were added incrementally until a total of about 200 grams of ethyl alcohol had been added to the contents of the mixing bowl. A binder solution comprising about 62.5 grams of XUS 40303.00 tertiary amide ceramic binder (Dow Chemical Co., Midland, Mich.) and about 150 grams of ethyl alcohol was then added to the contents of the mixing bowl. After adding the binder solution, the contents of the mixing bowl were mixed on speed no. 1 for about 1 hour. The contents of the bowl were then separated into several smaller quantities, each of which were initially mixed at speed no. 1 in the mixing bowl of the Hobart mixer until the contents had been broken down to the form of powder granules. As the powder mixture became granulated, the mixer speed was increased to the middle and finally the highest speed (speed no. 3). After granulation, the mixing was ceased and the granules were then passed through an approximately 20 mesh screen (openings measuring about 850 microns across) to prepare a press mix for dry pressing.

About 67 grams of the granulated and screened press mix was then placed into the cavity of a dry pressing die and leveled. The press mix was uniaxially pressed from both directions in a floating die arrangement on a Carver 40 ton manually operated press until an applied pressure of about 20,000 psi (1,406 kilograms per square centimeter) was realized. A preform in the shape of a block measuring about 2 inches (51 mm) square by about 0.6 inch (15 mm) thick was recovered from the die.

The dry pressed preform was then placed into an air atmosphere drying oven at a temperature of about 60° C. for about 1 hour to remove any residual ethyl alcohol from the preform.

The dried preform was then placed into a retort chamber for further thermal processing, specifically, to remove the ceramic binder from the preform. The retort chamber was then isolated from the external atmosphere and evacuated to at least about 30 inches (762 mm) of mercury vacuum and then backfilled with argon gas to about atmospheric pressure. After repeating this evacuation and backfilling procedure, the retort and its contents were then heated from about room temperature to a temperature of about 200° C. at a rate of about 60° C. per hour. After reaching a temperature of about 200° C., the retort and its contents were then heated to a temperature of about 350° C. at a rate of about 20° C. per hour. After reaching a temperature of about 350° C., the retort and its contents were then further heated to a temperature of about 670° C. at a rate of about 64° C. per hour. After reaching a temperature of about 670° C., the retort and its contents were then cooled to about room temperature at a rate of about 80° C. per hour. After the retort chamber and its contents had substantially reached room temperature, the retort chamber was opened and the preform was removed.

The lay-up used in fabricating the ceramic matrix composite body was then fabricated as follows. Referring to FIG. 15, a parent metal 122 comprising an aggregate mixture of about 143 grams of 99.999% pure silicon (Atlantic Equipment Engineers, Bergenfield, N.J.) having substantially all fragments at about +40 mesh (larger than about 420 microns in diameter) and about 7.6 grams of manganese chips (99.9% pure, AESAR® Division of Johnson-Mathey Corp., Seabrook, N.H.) was placed into the bottom of a Grade ATJ graphite crucible 124 (Union Carbide Co., Carbon Products Division, Cleveland, Ohio), whose interior measured about 3 inches (76 mm) square by about 3¼ inches (83 mm) high. The silicon was supplied as a lump of material which had been previously crushed in a jaw crusher and screened after such crushing so as to obtain +40 mesh (larger than about 120 microns in diameter) fragments. The manganese chips were ultrasonically cleaned in acetone prior to blending the chips with the crushed silicon. The silicon carbide preform 126 was then placed on top of the leveled parent metal aggregate of silicon and manganese. The graphite crucible 124 and its contents were then placed onto a Grade AGSX graphite support tray 128 measuring about 10 inches (254 mm) square by about 4 inches (102 mm) high to complete the lay-up.

The graphite support tray 128 and its contents were then placed into a vacuum furnace which was subsequently isolated from the external environment. The furnace chamber was then evacuated to at least about 30 inches (762 mm) of mercury vacuum and subsequently backfilled with nitrogen gas to about atmospheric pressure. The furnace chamber was evacuated a second time, but to a final pressure in this instance of about $2 \times 10^{-4}$ torr. After checking the furnace chamber leak rate, the furnace chamber was backfilled with commercially pure nitrogen gas to about atmospheric pressure. A nitrogen gas flow rate of about 1 liter per minute through the retort chamber was thereafter established. Materials for absorbing an impurity residual moisture and oxygen were present in the gas line to ensure that these contaminants did not reach the lay-up. The furnace chamber and its contents were then heated from about room temperature to a temperature of about 1500° C. at a rate of about 491° C. per hour. After maintaining a temperature of about 1500° C. for about 48 hours, the temperature of the furnace chamber and its contents was then decreased to a temperature of about 1000° C. at a rate of about 84° C. per hour. After reaching a temperature of about 1000° C., the temperature of the furnace chamber and its contents was then decreased to about room temperature at a rate of about 195° C. per hour.

Figure 16:
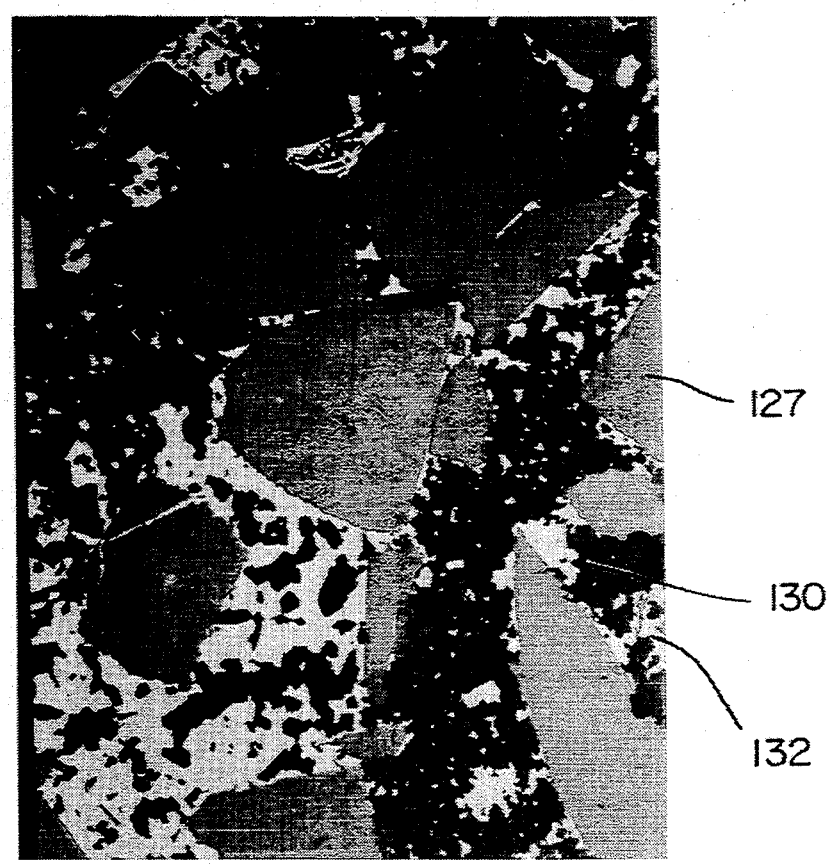
FIG. 16 is a photomicrograph taken at a magnification of about 400 X of the resulting composite produced according to Example 10.

After the furnace chamber and its contents had reached substantially room temperature again, the furnace chamber was opened and the graphite tray 128 and its contents were removed from the furnace chamber. The contents of the graphite crucible 124 on top of the graphite tray 128 were then disassembled to reveal that, during the run, molten parent metal 122 had reacted with the nitrogen gas atmosphere to form a matrix comprising silicon nitride along with some unreacted residual parent metal which embedded the silicon carbide preform 126 to form a ceramic matrix composite body. FIG. 16 is an optical photomicrograph taken at about 400 X magnification of a polished cross-section of this ceramic matrix composite material. The photomicrograph clearly shows silicon carbide filler material 127, silicon nitride oxidation reaction product 130 and residual unreacted silicon parent metal 132. This Example therefore demonstrates that a ceramic matrix composite may be formed by placing a preform comprising silicon carbide in the path of the oxidation reaction product of silicon metal and nitrogen gas.

EXAMPLE 11

The following Example demonstrates, among other things, the use of a barrier material on a preform comprised of a filler material mixture to form a ceramic matrix composite body having a shape corresponding substantially to that of the preform. Specifically, the following Example demonstrates, among other things, the use of boron nitride on a preform comprised of silicon nitride to form a silicon nitride reinforced silicon nitride composite body having a shape corresponding substantially to that of the silicon nitride preform.

A silicon nitride reinforcement material was prepared for incorporation into a filler material mixture. Specifically a gallon NALGENE ® plastic jar (Nalge Co., Rochester, N.Y.) was half filled with —20 mesh (particle diameter less than about 850 microns) SICONIDE ™ Type P95J silicon nitride reinforcement material (KemaNord Industrikem, Nobel Industries, Sweden) and silicon nitride milling media (KemaNord Industrikem, Nobel Industries, Sweden) measuring about ½ inch (13 mm) long and having a diameter of about ½ inch (13 mm) silicon nitride. About 100 grams of acetone were added to the contents of the plastic jar. Then, the plastic jar was closed and placed on a rolling mill. After about 8 hours, the plastic jar and its contents were removed from the rolling mill, the lid to the plastic jar was removed and the plastic jar and its contents placed under an exhaust hood to allow the acetone to evaporate. After the acetone had substantially completely evaporated, any milled silicon nitride reinforcement material on the sides of the plastic jar was scraped from the sides using a spatula. The milling media and the milled silicon nitride reinforcement material were then separated.

A filler material mixture comprised of the milled silicon nitride reinforcement material, a carbon black particulate and a binder material was made. Specifically, about 3.75 grams of XUS 40303.00 tertiary amide ceramic binder (Dow Chemical Corporation, Midland, Mich.) were combined with about 50 grams of acetone in a small plastic bottle. After the plastic bottle was closed, the plastic bottle and its contents were then placed onto a Model GS-74070 reciprocating shaker (Eberbach, Ann Arbor, Mich.) until the tertiary amide ceramic binder had substantially completely dissolved into the acetone. The tertiary amide ceramic binder was substantially completely dissolved by the acetone after about 2 hours thereby forming a binder solution. About 146 grams of the milled silicon nitride reinforcement material were combined with about 4.5 grams of MONARCH ® 120 carbon black particulate (Cabot Corp., Special Black Div., Waltham, Mass.) in a second gallon NALGENE ® plastic jar. After the second plastic jar was closed, the second plastic jar and its contents were placed on a rolling mill. After about an hour, the second plastic jar and its contents were removed from the rolling mill, the second plastic jar was opened and its contents were placed into a mixing bowl of a Model N-50 Hobart mixer (Hobart Corp., New Castle, Del.). About 50 grams of acetone were added to the mixture comprising the milled silicon nitride reinforcement material and the carbon black particulate with the mixer speed set at the first speed setting. After the acetone had substantially completely wet the milled silicon nitride reinforcement material and the carbon black particlate, the earlier formed binder solution was added to the mixing bowl. After the binder solution had been substantially completely incorporated into the mixture comprising the milled silicon nitride reinforcement and the carbon black particulate, the mixer speed was increased to the second setting to complete the mixing of a filler material mixture. When substantially completely dry, the filler material mixture was forced through a 35 mesh sieve and the —35 mesh (particle diameter less than about 500 microns) portion of the filler material mixture powder was set aside as stock for pressing preforms.

About 27 grams of the filler material mixture were placed into the cavity of a steel die measuring about 2 inches (51 mm) square. The filler material mixture was leveled and then pressed at about 2000 pounds per square inch (141 kilograms per square centimeter) to form a preform 206 measuring about 2 inches (51 mm) square and having a thickness of about 0.34 inch (8.6 mm). The preform 206 was then coated with a boron nitride aerosol by placing the preform on a rotatable pedestal such that substantially all of one of the 2 inch (51 mm) square faces contacted the rotatable pedestal.

As the pedestal was rotated, COMBAT® boron nitride aerosol spray (The Carborundum Co., Boron Nitride Division, Amherst, N.Y.) was sprayed onto the surfaces of the preform 206 until the preform became substantially completely white from the boron nitride. The boron nitride was allowed to substantially completely dry thereby forming a boron nitride coating 207 on five sides of the preform 206. The preform formation and coating was substantially repeated five (5) additional times.

Six setups 209 (only one depicted in FIG. 17) were formed using six graphite crucibles 204 measuring about 3 inches (76 mm) square and about 3.25 inches (82.6 mm) high and machined from Grade ATJ graphite (Union Carbide Corp., Carbon Product Division, Cleveland, Ohio). About 148.6 grams of 99.999% pure silicon (Atlantic Equipment Engineers, Bergenfield, N.J.) substantially the same as the silicon lump of Example 10, were combined with about 1.59 grams of 99.98% iron chips (AESAR Co., Johnson Mathey, Seabrook, N.H.) to make a parent metal particulate mixture 205 in the bottom of each graphite crucible 204. The parent metal particulate mixture 205 was mixed within each graphite crucible 204 using a spatula and then leveled. A boron nitride coated preform 206 was then placed onto the parent metal precursor mixture within each of the graphite crucibles 204 thereby forming each setup 209. Each setup 209 was weighed and the weight recorded.

A lay-up 201 comprised of six substantially similar setups 209 was formed within a graphite boat 202 measuring about 24 inches (610 mm) long, about 11 inches (279 mm) wide, about 6 inches (152 mm) high, and having a wall thickness of about 0.63 inch (16 mm). The graphite boat was machined from Grade AGSX graphite (Union Carbide Corporation, Carbon Product Division, Cleveland, Ohio,) and the inner surfaces of the graphite boat were lined with a piece of GRAFOIL® graphite foil 203 (Union Carbide Company, Carbon Products Division, Cleveland, Ohio). Six setups 209 were placed into the graphite boat 202 and onto the graphite foil 203. A lid 208 measuring about 36 inches (914 mm) long, about 12 inches (305 mm) wide, and about 0.25 inch (6.4 mm) thick and machined from Grade AGSX graphite (Union Carbide Corp., Carbon Products Division, Cleveland, Ohio) was placed onto the top of the graphite boat 202 to complete the lay-up 201.

The lay-up 201 and its contents were then placed into a vacuum furnace. After the vacuum furnace door was closed, the furnace and its contents were evacuated to a pressure of about $7.1 \times 10^{-6}$ inch ($1.8 \times 10^{-4}$ mm) of mercury. After about an hour, the furnace was filled with nitrogen flowing at a rate of about 1 liter per minute. The nitrogen flow rate was interrupted after about 15 minutes and the furnace was evacuated a second time to a pressure ranging from about $7.1 \times 10^{-6}$ to $15 \times 10^{-6}$ ($1.8 \times 10^{-4}$ to $4.0 \times 10^{-4}$ mm) of mercury. Then, the vacuum pump was disengaged and nitrogen was once again introduced into the furnace chamber at a flow rate of about 1 liter per minute. The furnace and its contents were then heated from about room temperature to about 1700° C. at about 200° C. per hour, held at about 1700° C. for about 24 hours, while maintaining a nitrogen flow rate of about 1 liter per minute at a gauge pressure within the furnace of about 2 pounds per square inch (0.14 kilograms per square centimeter). After about 24 hours at about 1700° C., the furnace and its contents were cooled to about 1000° C. at about 140° C. per hour and then from about 1000° C. to about room temperature at about 200° C. per hour.

At about room temperature, the lay-up 201 was removed from the furnace, disassembled and each setup 209 was removed from within the graphite boat 202. The weight gain for each setup 209 was noted. Specifically, a weight gain of about 35.1% was measured for one of the setups 209. Additionally, it was noted that a silicon nitride oxidation reaction product had grown into each boron nitride coated preform to form six silicon nitride reinforced silicon nitride composite bodies.

Figure 18A:
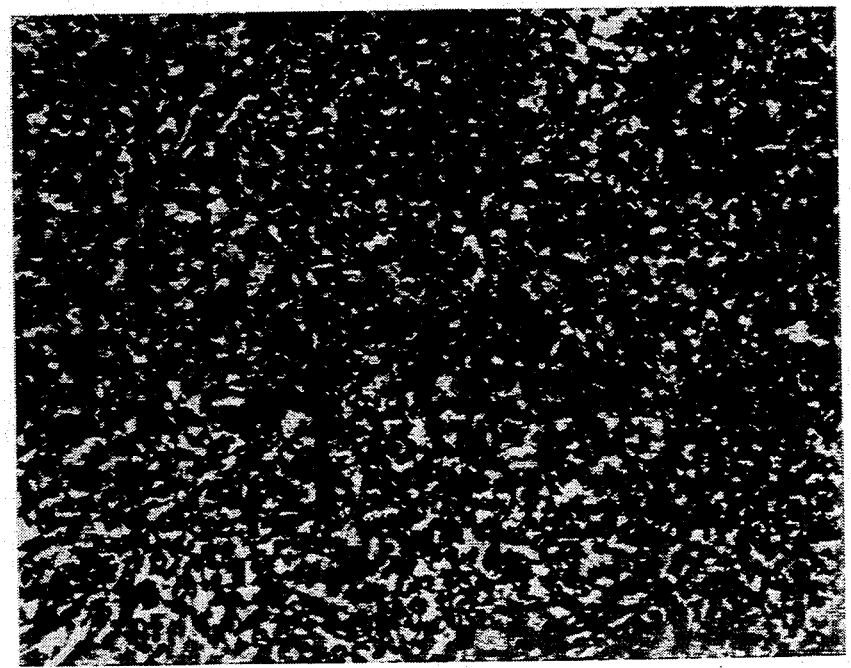
FIGS. 18a and 18b are photomicrographs taken at a magnification of about 50 X and 400 X, respectively, of the composites produced in accordance with Example 11.
Figure 18B:
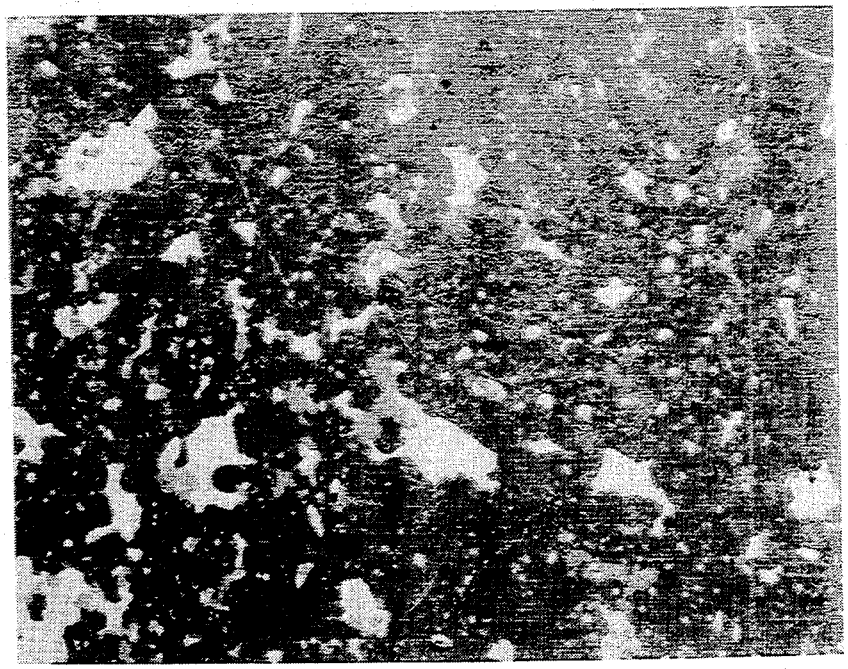
Figure 19A:
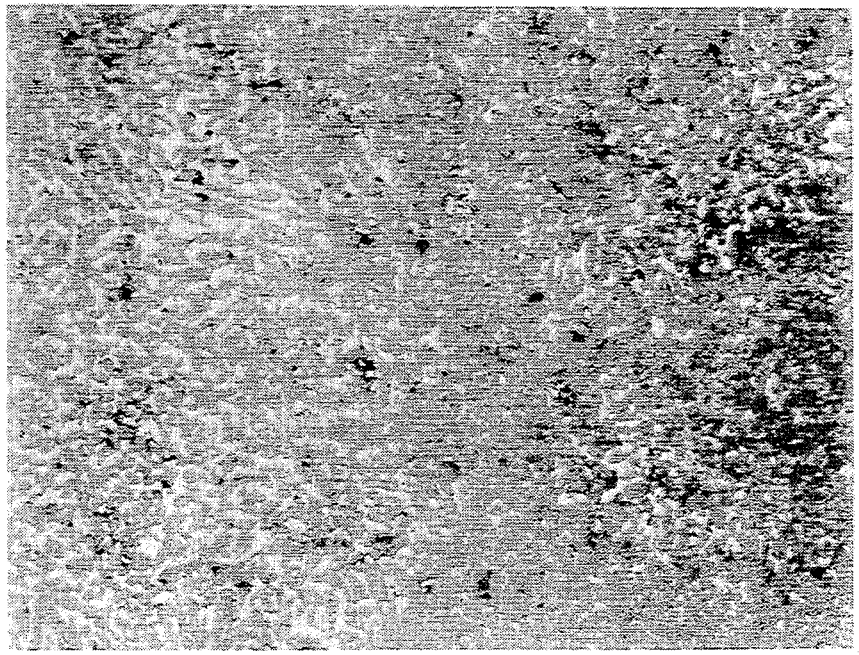
FIGS. 19a–19e are photomicrographs taken at a magnification of, respectively, about 50 X of the composites corresponding to Samples A–E, respectively, of Example 12.
Figure 19B:
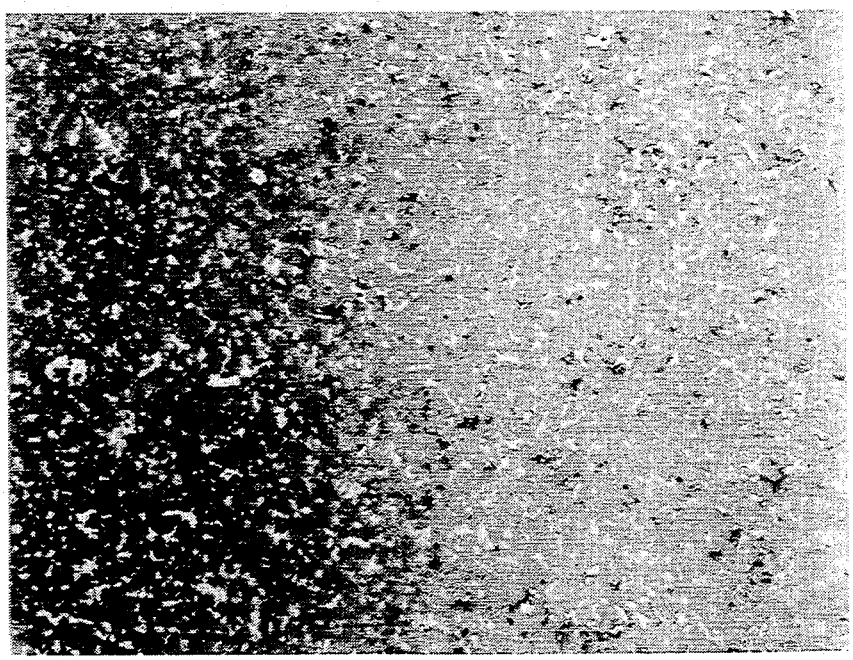
Figure 19C:
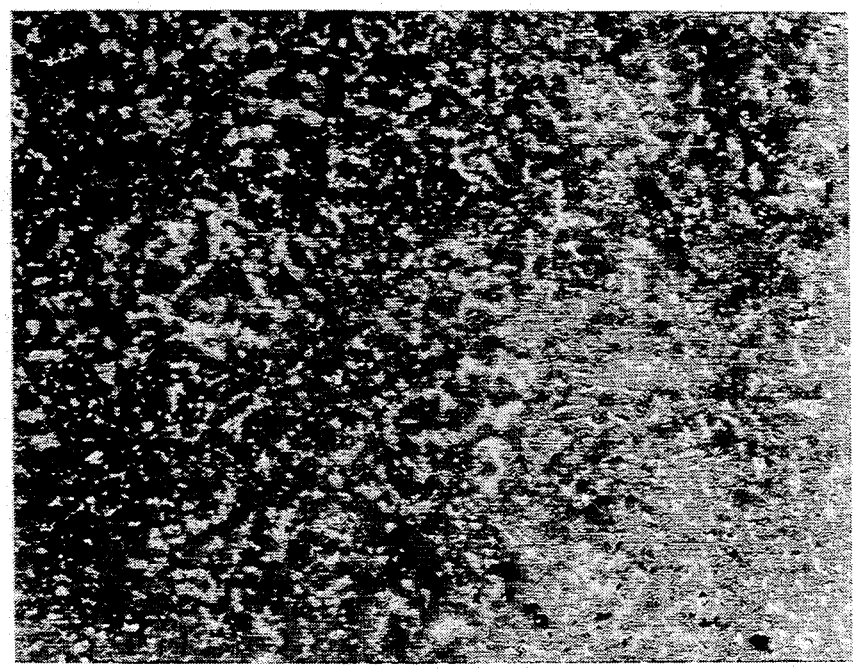
Figure 19D:
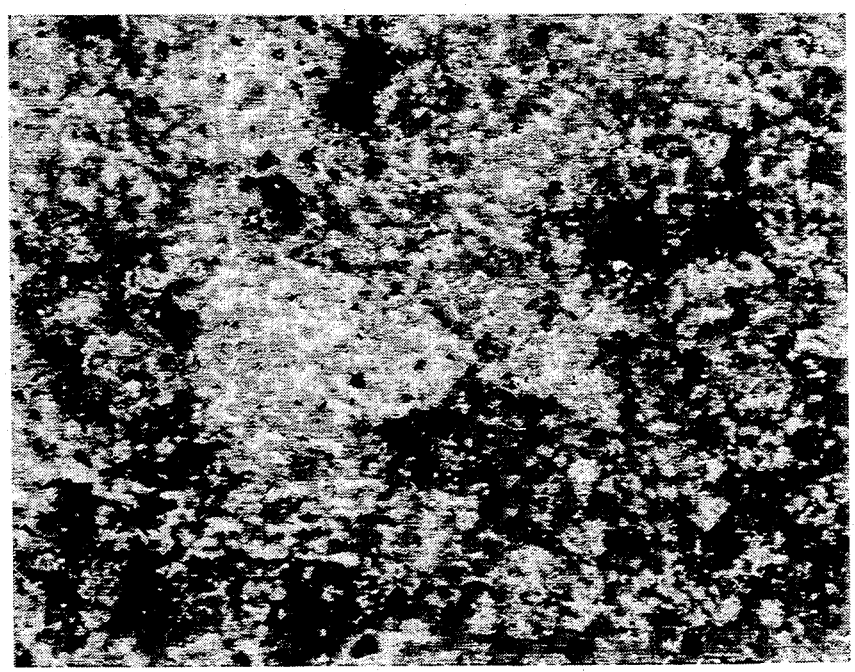
Figure 19E:
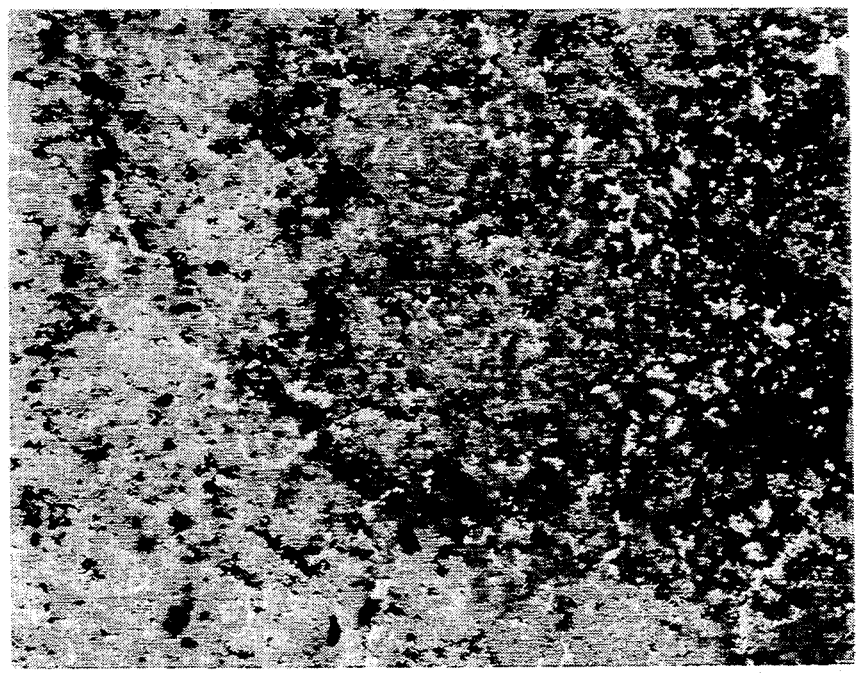
Figure 19F:
FIGS. 19f–19j are photomicrographs taken at a magnification of about 400 X of the composites corresponding to Samples F–J, respectively, of Example 12.
Figure 19G:
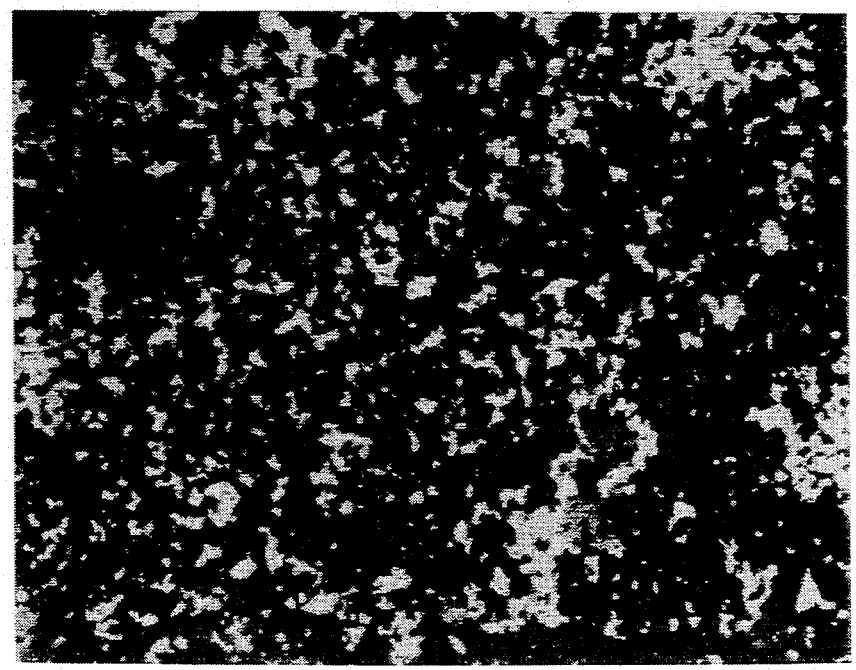
Figure 19H:
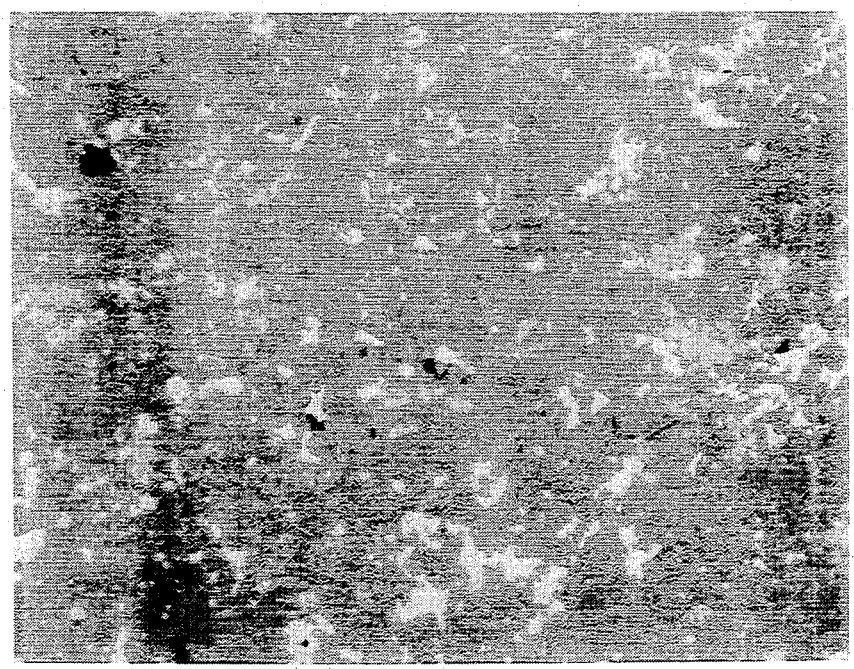
Figure 19I:
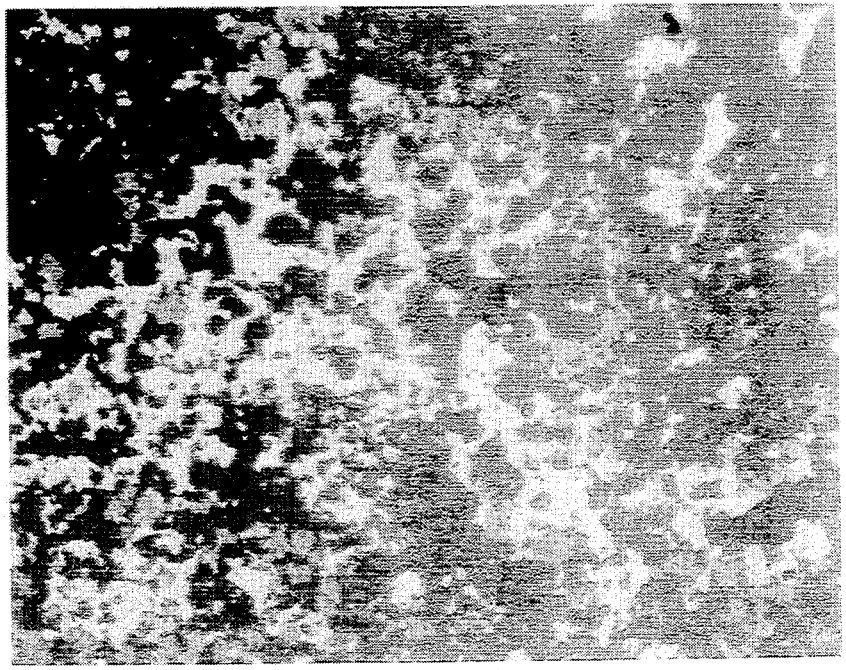
Figure 19J:
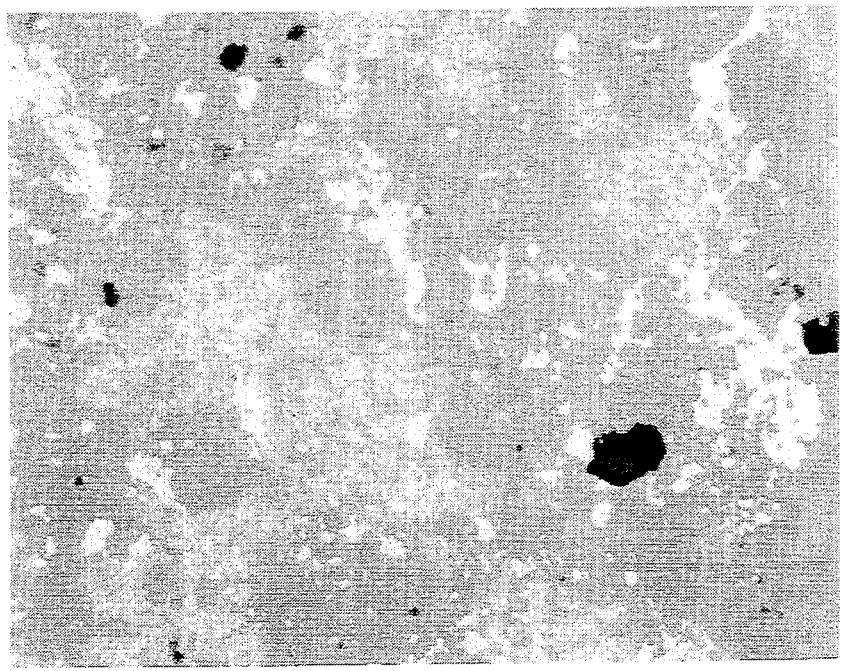

Further detailed analysis of the ceramic matrix composite body of the one setup that had a weight gain of about 35.1% was performed. Specifically, this one ceramic matrix component body was cut, mounted and polished in preparation for metallographic examination. FIGS. 18a and 18b correspond to photomicrographs taken at a magnification of about 50 X and about 400 X respectfully, of the formed ceramic matrix composite body. The apparent density of the ceramic matrix composite body was measured. First, care was taken to ensure that the ceramic matrix composite body was completely dry. The mass of the ceramic matrix composite body was determined as accurately as possible using a Type R180D electronic analytical balance (Savtorius, Gottingen, Germany). The ceramic matrix composite body was then placed into the sample chamber of an AccuPyc 1330 Autopycnometer (Micromeritics, Inc., Norcross, Ga.). The autopycnometer automatically calculated the apparent volume of the ceramic matrix composite body. The apparent density was determined by dividing the mass by the apparent volume. The density of the ceramic matrix composite body was measured to be about 2.98 grams per centimeter cubed.

Moreover, quantitative image analysis of the ceramic matrix composite body of the one setup that had a weight gain of about 35.1% was completed using a magnification of about 300 X. Specifically, the volume fraction of ceramic matrix, volume fraction of residual parent metal and the volume fraction of porosity, were determined by quantitative image analysis. A representative sample of the ceramic matrix composite body was mounted and polished. The polished sample was placed on the stage of a Nikon Microphoto-FX optical microscope (Nikon Inc., Garden City, N.Y.) having a DAGE-MTI Series 68 video camera (Michigan City, Ind.) attached to the top port. The video camera signal was sent to a Model DV-4400 Scientific Optical Analysis System (Lamont Scientific, State College, Pa). At a magnification of about 300 X, ten video images of the microstructure were acquired through the optical microscope and stored in the Scientific Optical Analysis System. Specific color and gray level intensity ranges were assigned to specific microstructural features (i.e., residual parent metal, ceramic matrix or porosity, etc.). To verify that the color and intensity assignments were accurate, a comparison was made between the video image with color and intensity assignments and the originally acquired video image. If discrepancies were noted, corrections were made to the video image assignments using a hand held digitizing pen and a digitizing board. Representative video images with assignments were analyzed automatically by the computer software contained within the Scientific Optical Analysis System to give area percent ceramic matrix, area percent residual parent metal and area percent porosity, which correspond substantially to volume percents. The results of the analysis indicated that the ceramic matrix composite body was comprised by volume of about 10.9% silicon carbide, 68.7% silicon nitride, 1.0% porosity and about 19.4% residual parent metal.

and 19c suggests that the size, amount and morphology of the residual metallic constituent may be affected in each of the formed composite bodies which contained carbon in the filler material mixture.

TABLE I

| Sample | Composition of Filler Material Mixture | | Parent Metal Weight grams | Preform Thickness inches (mm) | Preform Weight grams | Unit Percent Weight Change |
|---|---|---|---|---|---|---|
| | Wt % Si₃N₄+ | wt % C | | | | |
| A | 100 | 0 | 300 | 0.71 (18.0) | 131.1 | 26.8 |
| B | 97 | 3# | 150 | 0.40 (10.1) | 38.8 | 15.1 |
| C | 95 | 5# | 150 | 0.46 (11.7) | 38.7 | 17.1 |
| D | 92.5 | 7.5# | 150 | 0.55 (14.0) | 46.8 | 18.7 |
| E | 90 | 10# | 150 | 0.48 (12.1) | 41.1 | 17.4 |
| F | 100 | 0 | 150 | 0.50 (12.7) | 41.0 | 15.9 |
| G | 99 | 1@ | 150 | 0.64 (16.3) | 62.7 | 14.1 |
| H | 97 | 3@ | 150 | 0.61 (15.5) | 52.1 | 18.7 |
| I | 95 | 5@ | 150 | 0.54 (13.7) | 48.2 | 16.0 |
| J | 90 | 10@ | 150 | 0.53 (13.5) | 51.6 | 13.6 |
| K | 87 | 3# plus 10% SiC* | 150 | 0.53 (13.5) | 45.0 | 21.1 |
| L | 87 | 3# plus 10% SiC$ | 150 | 0.52 (13.2) | 44.4 | 24.3 |

+SICONIDE ™ Type P95J silicon nitride (KemaNord Industrikem, Nobel Industries, Sweden)
MONARCH ® 120 carbon black (Cabot Corporation, Special Black Division, Waltham, MA)
@BOND-CARB ™ Graphite 151 Colloidal Graphite (Superior Graphite Co., Chicago, IL)
*39 CRYSTOLON ® 500 grit (average particle diameter of about 17 microns) silicon carbide (Norton Co., Worcester, MA)
$39 CRYSTOLON ® 1000 grit (average particle diameter of about 5 microns) silicon carbide (Norton Co., Worcester, MA)

Thus this Example demonstrates, among other things, that a silicon nitride reinforced silicon nitride ceramic composite body may be made by the directed oxidation of a parent metal comprised of silicon and about one weight percent iron into a preform comprised of silicon nitride and carbon powder, the preform being coated with a boron nitride barrier material.

EXAMPLE 12

The following Example demonstrates, among other things, the use of varying amounts and various types of carbon or carbon-containing materials in a filler material mixture to grow a ceramic matrix composite body having an altered microstructure. Moreover, the following Example demonstrates the use of carbon black, colloidal graphite, and silicon carbide to form a silicon nitride reinforced silicon nitride composite bodies having a variety of microstructures.

Table I contains a summary, for each of Samples A-L, of the composition of the filler material mixture (e.g., wt % Si₃N₄, wt % C, etc.), the parent metal weight, the preform thickness, the preform weight and the unit percent weight change.

SAMPLES A-E

Samples A-E were formed substantially in accordance with the methods of Example 11, except that the furnace and its contents were heated from about room temperature to about 1700° C. at a rate of about 300° C. per hour instead of about 200° C. per hour. After the lay-up containing Samples A-E were removed from the furnace, the setups were disassembled. The resultant silicon nitride matrix composite bodies were cut, mounted and polished in preparation for metallographic examination. FIGS. 19a, 19b, 19c, 19d and 19e are photomicrographs taken at a magnification of about 50 X of the resultant silicon nitride matrix composite bodies, which photomicrographs correspond to Samples A-E, respectively. A comparison of the microstructures in the photomicrographs suggests that a silicon nitride matrix composite body grown with a silicon nitride filler containing no carbon may contain more residual metallic constituent in comparison to a composite body grown with silicon nitride filler containing carbon. For example, a comparison of FIG. 19a to any of FIGS. 19b and 19c suggests that the size, amount and morphology of the metallic constituent and porosity in the resultant body is altered (e.g., see FIGS. 19b, 19c, 19d and 19e). Furthermore, the amount of the metallic constituent in the silicon nitride matrix composite body apparently is minimized when about 3% by weight carbon black (e.g., MONARCH® 120 carbon black from Cabot Corporation, Special Black Division, Waltham, Mass.) is combined with the silicon nitride filler.

SAMPLES F-J

Samples F-J were formed substantially in accordance with the method of Example 11, except that BOND-CARB ™ graphite 151 colloidal graphite (Superior Graphite Co., Chicago, Ill.) was used in place of MONARCH® 120 carbon black (Cabot Corporation, Special Black Division, Waltham, Mass.). The BOND-CARB ™ graphite 151 colloidal graphite comprised by weight about 22% carbon having an average particle diameter less than about 1 micron. The amount of BOND-CARB ™ graphite 151 combined with the silicon nitride filler to achieve the weight percentages of carbon listed in Table I was about 4.5 times greater than the amount of MONARCH® 120 carbon black. Additional differences between the methods of Example 11 and the methods used for Samples F-J included: (1) pressing the filler material mixture to about 3750 pounds per square inch (263 kg per cm²) to form preforms; and (2) heating the furnace containing the lay-up from about room temperature to about 1700° C. at about 558° C. per hour, holding at about 1700° C. for about 20 hours and cooling from about 1700° C. to about room temperature as rapidly as possible while maintaining a nitrogen flow rate of about 1 liter per minute at a gauge pressure within the furnace of about 2 pounds per square inch (0.14 kg per cm²).

As with Samples A-E, the resultant silicon nitride matrix composite bodies of Samples F-G were cut, mounted and polished in preparation for metallographic examination. FIGS. 19f, 19g, 19h, 19i and 19j are photomicrographs taken at a magnification of about 400 X of Samples F-J, respectively. A comparison between FIG. 19f and FIGS. 19g-19j suggests that by combining carbon with the silicon nitride filler, the size, amount and morphology of the metallic constituent in the resultant silicon nitride matrix composite bodies can be affected. Furthermore, this example suggests that when the filler material mixture comprises about 3% by weight carbon as BOND-CARB ™ graphite 151 colloidal graphite, the volume percent of metallic constituent present in the formed composite body is reduced and is substantially uniformly distributed within the composite body.

SAMPLES K AND L

Samples K and L were made substantially in accordance with the methods of Example 11, except that the filler material mixture comprised, in addition to silicon nitride and about 3% by weight MONARCH® 120 carbon black, for sample K, about 10% by weight 39 CRYSTOLON® 500 grit (average particle diameter of about 17 microns) silicon carbide (Norton Co., Worcester, Mass.) and, for Sample L, about 10% of 39 CRYSTOLON® 1000 grit (average particle diameter of about 5 microns) silicon carbide (Norton Co., Worcester, Mass.). Additional differences between the methods of Samples K-L and those methods of Example 11 included differences in the heating schedule and the nitrogen flow rate. Specifically, the heating schedule included heating the furnace and its contents from about room temperature to about 600° C. at about 50° C. per hour, then holding at about 600° C. for about 1 hour, again heating from about 600° C. to about 1700° C. at about 200° C. per hour, again holding at about 1700° C. for about 24 hours, cooling from about 1700° C. to about 1000° C. at about 200° C. per hour, then cooling from about 1000° C. to about room temperature at about 300° C. per hour, while maintaining a nitrogen flow rate of about 1 liter per minute at a gauge pressure of about 2 pounds per square inch (0.14 kg per cm$^2$) throughout the heating schedule.

As with Samples A–J, Samples K and L were cut, mounted and polished in preparation for metallographic examination. FIGS. 19k and 19l are photomicrographs taken at a magnification of about 50 X of the resultant microstructures of silicon nitride matrix composite bodies corresponding to Samples K and L, respectively, showing the silicon nitride matrix embedding the silicon nitride and silicon carbide fillers.

Among other things, this Example demonstrates that embedding a filler material mixture containing a specified amount of carbon or carbon-containing material with a silicon nitride oxidation product produces a silicon nitride matrix composite body having an apparently substantially uniform distribution of metallic constituent. In this Example, uniformity of the metallic constituent means that the distribution of the size, amount, and morphology of the metallic constituent is substantially homogeneous. Furthermore, this Example demonstrates that the content of the silicon nitride oxidation product within a silicon nitride matrix composite body is substantially maximized when the filler material mixture comprises about 3% by weight carbon.

EXAMPLE 13

The following Example demonstrates the growth of a silicon nitride oxidation reaction product from a silicon parent metal into the interstices of a preform containing interconnected porosity. The resultant ceramic matrix composite body has a reduced volume percentage porosity relative to the starting preform. Specifically, the following Example demonstrates, among other things, growth of a silicon nitride oxidation reaction product into preforms comprising reaction bonded silicon nitride at various volume percentages. Furthermore, the following Example demonstrates the use of boron nitride on reaction bonded silicon nitride preforms to form silicon nitride reinforced silicon nitride composite bodies having a shape corresponding substantially to that of the starting preform. Table II summarizes for Samples M1 through R the composition of the preform, the parent metal weight, the reaction bonded silicon nitride preform thickness, the reaction bonded silicon nitride preform weight and the volume percent silicon nitride of the preforms used to make the silicon nitride reinforced silicon nitride composite bodies.

SAMPLES M1–Q2

Samples M1–Q2 were formed by growing a silicon nitride oxidation reaction product through reaction bonded silicon nitride preforms. The preforms were formed by combining, in a NALGENE® plastic bottle (Nalge Corporation, Rochester, N.Y.), about 27 grams of a binder solution and about 108 grams of a silicon powder-iron powder mixture. The binder solution comprised about 2.2 grams of XUS 40303.00 tertiary amide binder (Dow Corporation, Midland, Mich.) and about 25 grams of acetone. The silicon powder-iron powder mixture comprised −325 mesh (particle diameter less than about 45 microns) silicon powder (Atlantic Equipment Engineers, Bergenfield, N.J.) combined with by weight about 0, 1%, 3%, 5% and 10%, −325 mesh (particle diameter less than about 45 microns) iron powder (Atlantic Equipment Engineers, Bergenfield, N.J.). After the silicon powder-iron powder mixture was combined with the binder solution in the plastic bottle, the plastic bottle was sealed and placed on a jar mill for about 4 hours. After removing the plastic bottle from the jar mill, the plastic bottle lid was removed, and the open plastic bottle with its contents were placed underneath an exhaust hood to allow the silicon powder-iron powder mixture to settle to the bottom of the plastic bottle. Once the silicon powder-iron powder mixture had substantially completely settled to the bottom of the plastic bottle, the binder solution was decanted from the plastic bottle. The silicon powder-iron powder mixture then was evenly spread over an aluminum sheet and allowed to dry until slightly damp to touch. The damp silicon powder-iron powder mixture was placed into a second NALGENE® plastic bottle. After sealing, the second plastic bottle and its contents were placed on the jar mill for about 4½ hours. Then the silicon powder-iron powder mixture was forced through a 60 mesh sieve (sieve opening of about 250 microns) to size the silicon powder-iron powder mixture. Appropriate amounts of the sieved silicon powder-iron powder mixture were then placed into the cavity of a steel die measuring about 2 inches (51 mm) square to obtain a preform having an approximately 2 inch (51 mm) square cross-section and a thickness corresponding to those thicknesses set forth in Table II. After leveling, the silicon powder-iron powder mixtures were pressed to about 2000 pounds per square inch (140 kg per cm$^2$) to form the silicon powder-iron powder preforms. Two preforms were made for each silicon powder-iron powder mixture having iron contents of 0, 1, 3, 5 and 10 weight percent.

The silicon powder-iron powder preforms were then placed in a graphite boat lined with GRAFOIL® graphite foil (Union Carbide, Carbon Product Division, Cleveland, Ohio) to form a lay-up. The lay-up and its contents were then placed into a vacuum furnace. After closing the vacuum furnace door, the furnace chamber and its contents were evacuated to a pressure of about $7.1 \times 10^{-6}$ inch ($1.8 \times 10^{-4}$ mm) of mercury. After about an hour, the furnace chamber was filled with nitrogen flowing at a rate of about 1 liter per minute. The nitrogen flow rate was interrupted after about 30 minutes, and the furnace chamber and its contents were evacuated a second time to a pressure ranging from about $7.1 \times 10^{-6}$ to $15.7 \times 10^{-6}$ inch ($1.8 \times 10^{-4}$ to $4.0 \times 10^{-4}$ mm) of mercury. Then, the vacuum pump was disengaged and nitrogen was once again introduced into the vacuum furnace chamber at a flow rate of about 1 liter per minute. The furnace chamber and its contents were then heated from about room temperature to about 1700° C. at a rate of about 558° C. per hour, held at about 1700° C. for about 36 hours and cooled from about 1700° C. to about room temperature at about 140° C. per hour, while maintaining a nitrogen flow rate of about 1 liter per minute. At about room temperature, the lay-up was removed from the furnace, disassembled and each setup was removed from within the lay-up. Upon disassembling the setups, it was noted that a silicon nitride oxidation reaction product had grown into the boron nitride coated reaction bonded preforms to form silicon nitride reinforced silicon nitride composite bodies conforming substantially in shape to the reaction bonded preforms.

sample R was placed in a setup substantially the same

TABLE II

| Sample | Composition of Preform | Parent Metal Weight grams | Preform Thickness inch (mm) | Preform Weight grams | Volume Percent Ceramic Preform |
|---|---|---|---|---|---|
| M1 | Reaction bonded $Si_3N_4$ | 150 | 0.46 (11.6) | 81.6 | 77 |
| M2 | (made from −325 mesh Si) | 150 | 0.46 (11.6) | 81.6 | 77 |
| N1 | Reaction bonded $Si_3N_4$ | 150 | 0.51 (12.9) | 90.2 | 61 |
| N2 | (made from −325 mesh Si and 1 wt % −325 mesh Fe)[1] | 150 | 0.61 (15.5) | 85.9 | 63 |
| O1 | Reaction bonded $Si_3N_4$ | 150 | 0.62 (15.7) | 85.4 | 61 |
| O2 | (made from −325 mesh Si and 3 wt % −325 mesh Fe)[1] | 150 | 0.56 (14.2) | 78.6 | 62 |
| P1 | Reaction bonded $Si_3N_4$ | 150 | 0.58 (14.5) | 79.1 | 61 |
| P2 | (made from −325 mesh Si and 5 wt % −325 mesh Fe)[1] | 150 | 0.58 (14.5) | 79.6 | 61 |
| Q1 | Reaction bonded $Si_3N_4$ | 150 | 0.63 (16) | 86.6 | 61 |
| Q2 | (made from −325 mesh Si and 10 wt % −325 mesh Fe)[1] | 150 | 0.49 (12.4) | 68.7 | 62 |
| R | 4' (102 mm) square reaction bonded $Si_3N_4$[3] | 567 | 0.26 (6.6) | 191.2 | 82 |

[1]Fired at 1500° C. in nitrogen for 4 hours, x-ray analysis verified the presence of α-$Si_3N_4$ and β-$Si_3N_4$.
[2]When two numbers are given, two samples were evaluated.
[3]ADVACER CX-658 having a density of about 2.79 g/cm$^3$ (Advanced Ceramics Division, Norton Co., Worcester, MA).

and its contents were then heated from about room temperature to about 1100° C. at about 538° C. per hour, from about 1100° C. to about 1400° C. at a about 25° C. per hour, held at about 1400° C. for about 20 hours, again heated from about 1400° C. to about about 1500° C. at about 50° C. per hour, again held at 1500° C. for about 4 hours, and cooled from about 1500° C. to about room temperature at about 245° C. per hour, while maintaining a flow rate of about 1 liter per minute.

At about room temperature, the lay-up was removed from the furnace chamber, disassembled and it was noted that the silicon powder-iron powder preforms had reacted to form reaction bonded bodies. X-ray diffraction analysis indicated that the reaction bonded bodies comprised alpha and beta silicon nitride.

To prepare the silicon nitride reinforced silicon nitride ceramic composite bodies for Samples M1-Q2, one 2 inch (51 mm) square surface and four sides of the reaction bonded preforms were coated twice with Type BN boron nitride (ZYP Coatings, Inc., Oak Ridge, Tenn.) using a sponge brush. The uncoated 2 inch (51 mm) surface was then contacted with a silicon parent metal substantially in accordance with the methods of Example 11 to form individual setups. The setups were subsequently combined to form a lay-up.

The lay-up for Samples M1-Q2 was placed into a vacuum furnace. After the vacuum furnace door was closed, the furnace chamber and its contents were evacuated to a pressure of about $39.4 \times 10^{-6}$ inch ($10 \times 10^{-4}$ mm) of mercury. After about 1½ hours, the vacuum pump was disconnected from the furnace chamber, and the furnace chamber was filled with nitrogen flowing at a rate of about 1 liter per minute. The furnace chamber as that used for Example 11. Specifically, a graphite crucible measuring about 6 inches (152 mm) square was lined with GRAFOIL ® graphite foil material (Union Carbide, Carbon Product Division, Cleveland, Ohio). A parent metal particulate mixture was then placed into the graphite foil lined graphite crucible. A preform of commercially available reaction bonded silicon nitride (Advancer CX-658, Advacer Ceramics Division, Norton Co., Worcester, Mass.) was then spray coated on one 6 inch (152 mm) square surface and on four sides with COMBAT ® boron nitride aerosol spray (Carborundum Corp., Amhurst, N.Y.) and the remaining 6 inch (152 mm) square surface was painted with a mixture of MONARCH ® 120 carbon black (Cabot Corp., Black Division, Waltham, Mass.) and ethanol using a sponge brush. The boron nitride coated preform was then placed onto the particulate parent metal so that the surface of the preform coated with the carbon black contacted the parent metal. The graphite crucible was then covered with a graphite plate to form a lay-up.

The lay-up and its contents were then placed into a vacuum furnace. After the furnace chamber door was closed, the vacuum furnace and its contents were evacuated to a pressure of about $1.6 \times 10^{-6}$ inch ($4.2 \times 10^{-5}$ mm) of mercury. After about 2 hours and after the vacuum pump was disconnected, the furnace chamber was filled with nitrogen flowing at a rate of about 1 liter per minute. The nitrogen flow rate was interrupted after about 10 minutes, and the furnace chamber was evacuated a second time to a pressure of about $10 \times 10^{-6}$ inch ($2.6 \times 10^{-4}$ mm) of mercury. After the vacuum pump was again disconnected nitrogen was once again introduced into the furnace chamber at a flow rate of about 1 liter per minute. The furnace and its contents were then heated from about room temperature to about 1700° C. at about 300° C. per hour, held at about 1700° C. for 24 hours, and cooled from about 1700° C. to about room temperature at about 300° C. per hour, while maintaining a nitrogen flow rate of about 1 liter per minute. At about room temperature, the lay-up was removed from the furnace chamber and disassembled to reveal that the pores of the commercially available reaction bonded silicon nitride had been infiltrated by a silicon nitride oxidation reaction product.

Figure 20A:
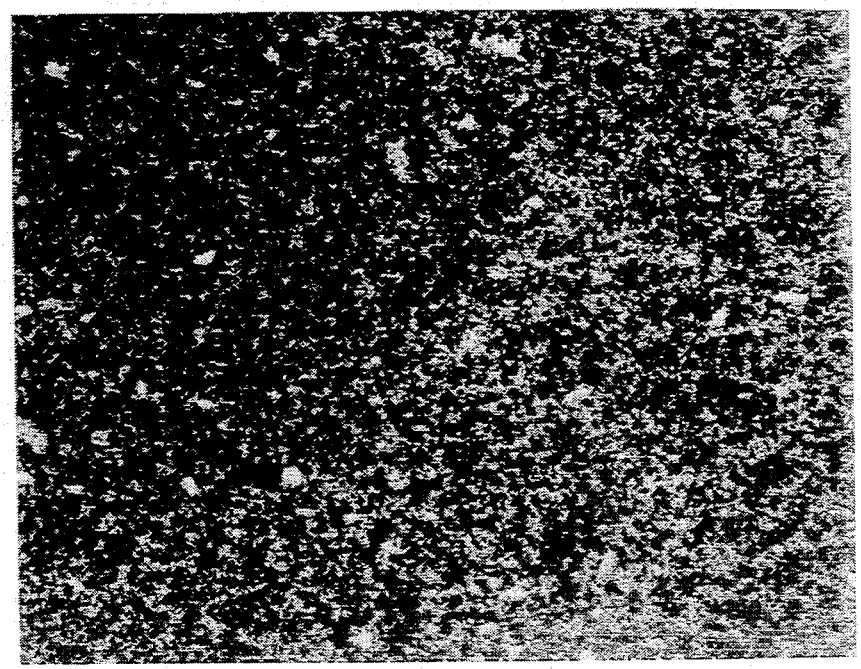
FIGS. 20a and 20b are photomicrographs taken at a magnification of about 50 X of the composites corresponding to Sample Q2 and Sample R, respectively, produced in accordance with Example 13.
Figure 20B:
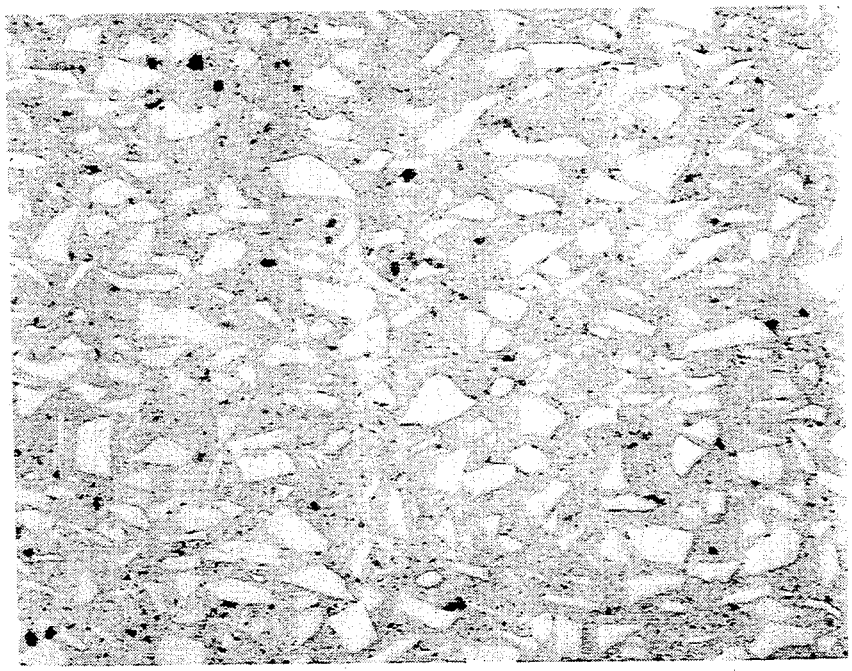

The ceramic composite bodies corresponding to Samples Q2 and R were then cut, mounted and polished in preparation for metallographic examination. FIGS. 20a and 20b are photomicrographs taken at a magnification of about 50 X of the resultant silicon nitride reinforced silicon nitride composite bodies Q2 and R, respectively. From these photomicrographs it is apparent that the porosity of the starting reaction bonded silicon nitride preforms has been reduced by the growth of a silicon nitride oxidation reaction product into the porosity of the reaction bonded bodies. Thus, this Example demonstrates that by growing a silicon nitride oxidation reaction product into the porosity of commercially available reaction bonded silicon nitride products, the overall silicon nitride content of the reaction bonded silicon nitride bodies may be increased.

EXAMPLE 14

The following Example demonstrates the fabrication of a silicon carbide reinforced silicon nitride composite body by the directed oxidation of a silicon parent metal in a nitrogenous atmosphere through a filler material comprised of a blend of various grit sizes of silicon carbide (fired in air prior to incorporation) and silicon powder. The matrix which formed around the filler material comprised silicon nitride oxidation reaction product and some unreacted parent metal.

A preform comprised of a blend of various grit sizes of silicon carbide and silicon metal was formed. Specifically, 39 CRYSTOLON ® silicon carbide (Norton Co., Worcester, Mass.) having sizes of about 54 grit (average particle diameter of about 430 microns), 90 grit (average particle diameter of about 216 microns), 180 grit (average particle diameter of about 86 microns) and 500 grit (average particle diameter of about 17 microns) were combined together in the following amounts: About 1188 grams of 54 grit silicon carbide, about 440 grams of 90 grit silicon carbide, about 330 grams of 180 grit silicon carbide and about 242 grams of 500 grit silicon carbide were homogeneously blended. The silicon carbide blend was then placed into a refractory boat lined with a FIBERFRAX ® paper ceramic (Standard Oil, Engineered Materials Co., Niagara Falls, N.Y.). The refractory boat and its contents were then placed into an air atmosphere furnace. After closing the furnace door, the furnace and its contents were heated from about room temperature to about 1200° C. at about 80° C. per hour. At about 1200° C., the power to the furnace was disconnected to allow the furnace and its contents to cool to room temperature.

The silica content of the fired silicon carbide blend was about 2.96% by weight silica as determined by wet chemical analysis. Specifically, about 15 grams of the fired silicon carbide blend and a TEFLON ® polytetraflouroethylene beaker were placed in an air oven set at about 105° C. After about an hour, both the TEFLON ® beaker and the blended silicon carbide sample were removed from the oven and allowed to cool to about room temperature. The TEFLON ® beaker was placed on a electronic scale. The weight of the TEFLON ® beaker was accounted for so that the electronic balance indicated zero weight. The fired silicon carbide blend sample was then placed into the beaker and weighed to an accuracy of about 0.1 mg. About 60 grams of an acid solution comprised by volume of about 50% nitric acid (about 70% assay (HNO3) W/W, Fisher Scientific, Pittsburgh, Pa) and 50% hydrofluoric acid (about 48% assay (HF) W/W acid, Fisher Scientific, Pittsburgh, Pa.) were added to the TEFLON ® beaker. The acid-fired silicon carbide blend mixture was mixed about every 30 minutes for about 2 hours. A piece of WATMAN ® 40 filter paper (Fisher Scientific, Pittsburgh, Pa.) that had been dried for about 10 minutes at about 105° C. and allowed to cool to about room temperature for about 30 minutes was placed into a vacuum infiltration apparatus. The acid solution containing the fired silicon carbide blend was then poured through the vacuum infiltration apparatus to collect the residue of the blended silicon carbide material. The residue of the blended silicon carbide material on the filter was then dried in a static air oven at a temperature of about 105° C. for about an hour. After the residue of the blended silicon carbide and the filter paper cooled to about room temperature, their combined weight was determined to within about 0.1 mg. The weight percent of silica on the fired silicon carbide was then determined by: (1) adding the initial weight of the fired silicon carbide blend, the initial weight of the filter paper, and subtracting the weight of the residue of silicon carbide blend, and (2) then dividing by the initial weight of fired silicon carbide blend and multiplying by 100.

The fired silicon carbide blend was then combined with −325 mesh (particle diameter less than about 45 microns) (Atlantic Equipment Engineers, Bergenfield, N.J.) silicon powder and an organic binder to prepare a sediment casting mixture. First, a binder solution was formed by: (1) combining in a plastic bottle; (2) heating in a microwave oven; and (3) shaking on a Model GS-7407 reciprocating shaker (Eberbach, Ann Harbor, Mich.) for about 3 hours about 12.75 grams of XUS 40303.00 tertiary amide binder (Dow Corp., Midland, Mich.) and about 110 grams of distilled water. Second, about 500 grams of the fired silicon carbide blend, the binder solution and about 50 grams of −325 mesh silicon powder (Atlantic Equipment Engineers, Bergenfield, N.J.) were combined in a NALGENE ® half-gallon plastic bottle and roll milled for about 5 hours. Simultaneously, a rubber mold having two cavities measuring about 4 inches (102 mm) square was cleaned with ethylene alcohol. The rubber mold was cast using a rubber molding compound (GI-1000, Plastic Tooling Supply Co., Easton, Pa., about 1 part by weight activator and about 10 parts by weight rubber base) around two aluminum plates measuring 4 inches (102 mm) square and about 1 inch (25 mm) thick. After setting sufficiently, the rubber mold was separated from the aluminum plates.

After about 5 hours of roll milling, the contents of the plastic bottle were poured into the cavities of the rubber mold. The rubber mold and its contents were vibrated for about 2 hours using a Model VP51D1 vibrating table (FMC Corporation, Homer City, Pa.). Excess water was removed during the vibration by sponging the surface of the mold cavities. The rubber mold and its contents were then placed into a freezer set at a temperature of about −10° C. After about 64 hours at about −10° C. during which preform tiles formed, the rubber mold and its contents were removed from the freezer. The preform tiles were ejected mechanically from the rubber mold and placed on a bedding of 220 grit silicon carbide supported by an aluminum plate. The aluminum plate and its contents were then placed into a forced air oven preheated to about 120° C. After the preform tiles had substantially completely dried, preforms measuring about 2 inches (51 mm) square and about 0.4 inch (10 mm) thick were cut using a commercially available hacksaw from the preform tiles. The preforms were incorporated into setups and ultimately a lay-up substantially the same as that described in Example 11 was formed. Unlike the lay-up of Example 11, no graphite plate covered the graphite boat.

The lay-up and its contents were then placed into a vacuum furnace. After closing the furnace door, the furnace chamber and its contents were evacuated to a pressure of about $7.9 \times 10^{-6}$ inch ($2 \times 10^{-4}$ mm) of mercury. After about a ½ hour, and after disconnecting the vacuum pump, the furnace chamber and the furnace chamber was filled with nitrogen flowing at a rate of about 1 liter per minute. After about 15 minutes, the nitrogen flow rate was interrupted and the furnace chamber was evacuated a second time to a pressure of about $7.9 \times 10^{-6}$ inch ($2 \times 10^{-4}$ mm) of mercury. Then, the vacuum pump was again disconnected and nitrogen was again introduced into the furnace chamber at a flow rate of about 1 liter per minute. The furnace and its contents were then heated from about room temperature to about 600° C. at about 200° C. per hour, held at about 600° C. for about 1 hour, heated from about 600° C. to about 1700° C. at about 300° C. per hour, held at 1700° C. for about 24 hours and cooled from about 1700° C. to about room temperature at about 200° C. per hour, while maintaining a nitrogen flow rate of about 1 liter per minute. At about room temperature, it was noted that an oxidation reaction product of the silicon parent metal and the nitrogen atmosphere had embedded the porosity of the preform to form a silicon carbide reinforced silicon nitride body.

Figure 21:
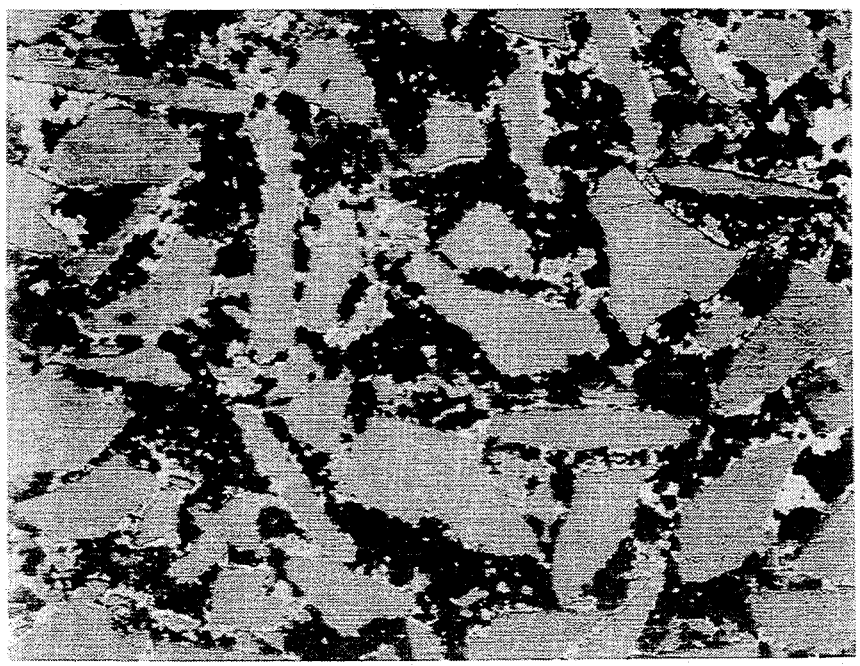
FIG. 21 is a photomicrograph taken at a magnification of about 200 X of the composite produced in accordance with Example 14.

The ceramic matrix composite body of one setup was cut, mounted and polished in preparation for metallographic examination. FIG. 21 corresponds to a photomicrograph at a magnification of about 200 X of the microstructure of the ceramic matrix composite body.

EXAMPLE 15

Figure 22A:
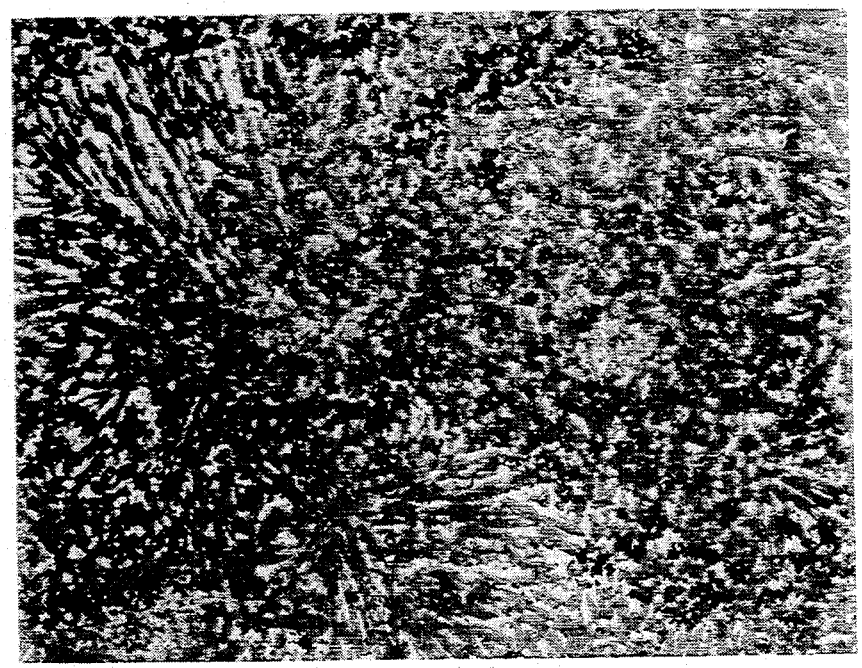
FIGS. 22a and 22b are photomicrographs taken at a magnification of about 50 X of the composites produced in accordance with Example 15.
Figure 22B:
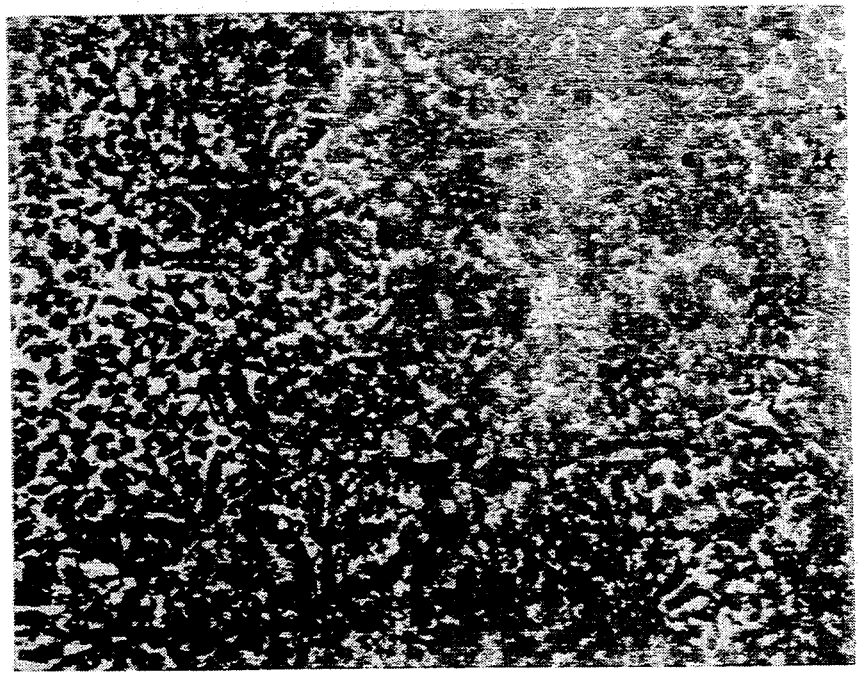

The following Example demonstrates, among other things, that a variety of grades of silicon may be used as a parent metal to form ceramic matrix composite bodies by the directed metal oxidation process. Specifically, this Example shows a comparison of the microstructures of the resultant composite bodies formed by the directed metal oxidation of silicon parent metal comprising metallurgical grade silicon and 99.999% pure silicon. The four ceramic matrix composite bodies were grown substantially according to the methods of Example 11, except that two of ceramic matrix composite bodies were grown using metallurgical grade rather than 99.999% pure silicon. As with Example 11, the ceramic matrix composite bodies of this Example were cut, mounted and polished in preparation for metallographic examination. FIG. 22a is a photomicrograph of the microstructure taken at a magnification of about 50 X of one of the resultant ceramic matrix composite bodies formed by using metallurgical grade silicon. FIG. 22b is a photomicrograph taken at a magnification of about 50 X of the microstructures of the resultant ceramic composite bodies using 99.999% pure silicon parent metal. A comparison of FIGS. 22a and 22b indicates that similar ceramic matrix composite bodies may formed by using either metallurgical grade silicon or 99.999% pure silicon.

EXAMPLE 16

The following Example reports the properties of a silicon nitride reinforced silicon nitride composite body made substantially in accordance with the methods of Example 11. Differences between the methods of this Example and that of Example 11 include: (1) forming a preform measuring about 3 inches (76.2 mm) square and about 0.7 inch (17.8 mm) thick; (2) using about 400 grams of parent metal; (3) evacuating the furnace chamber and its contents to a pressure of about $7.9 \times 10^{-6}$ inch ($1.8 \times 10^{-4}$ mm) of mercury for about an hour, then disconnecting the vacuum pump and filling the furnace chamber with nitrogen flowing at a rate of about 1 liter per minute for about 15 minutes, reconnecting the vacuum pump and evacuating the furnace chamber a second time to a pressure of about $24.4 \times 10^{-6}$ inch ($6.2 \times 10^{-4}$ mm) of mercury, again disconnecting the vacuum pump from the furnace chamber and introducing nitrogen at about 1 liter per minute into the furnace chamber and its contents; (4) heating from about room temperature to about 600° C. at about 200° C. per hour, holding at 600° C. for about 1 hour, again heating from 600° C. to about 1700° C. at about 300° C. per hour, again holding at 1700° C. for 24 hours and cooling from 1700° C. to about room temperature at about 200° C. per hour, while maintaining a nitrogen flow rate of about 1 liter per minute.

As with Example 11, at about room temperature, the lay-up was removed from the furnace chamber, disassembled and it was noted that a silicon nitride oxidation reaction product had grown into the silicon nitride preform to form a silicon nitride reinforced silicon nitride composite body. The resultant composite body was then cut into appropriately sized samples to measure the flexural strength, toughness, elastic or Young's modulus, shear modulus, Poisson's ratio, density and thermal conductivity. Specifically, the elastic or Young's modulus, shear modulus and Poisson's ratio of the silicon nitride reinforced silicon nitride composite was determined by a sonic residence technique substantially the same as ASTM method C848-88. To determine the moduli and Poisson's ratio, samples of the silicon nitride matrix composite measuring about 1.9 inches (50 mm) long, 0.23 inch (6 mm) wide and about 1.8 inches (4.8 mm) thick were placed between two transducers isolated from room vibrations by a air table supporting a granite stone. One transducer excited frequencies within the sample while the other monitored the response frequencies. By stepping through various excitation frequencies and monitoring (i.e., recording) the response levels of each frequency and noting any resonant frequencies, elastic or Young's modulus, the shear modulus and Poisson's ratio were determined. Two samples were cut from the same ceramic composite body to determine the elastic or Young's modulus, the shear modulus and Poisson's ratio. The first sample had a elastic modulus of about 309 gigapascal, a shear modulus of about 85 gigapascal and a Poisson's ratio of about 0.82. The second sample had an elastic or Young's modulus of about 295 gigapascal, a shear modulus of about 112 gigapascal and Poisson's ratio of 0.32. The density of each sample of the ceramic composite body was measured using a mass divided by a volume technique. Values for the densities of the two samples were substantially the same, that is, about 2.98–2.99 grams per centimeter squared.

The flexural strengths of the silicon nitride reinforced silicon nitride composite was measured using the procedure defined by the Department of Army's proposed MIL-STD-1942A (Nov. 21, 1983). This test was specifically designed for strength measurements of high performance ceramic materials. Flexural strength is defined in this standard as the maximum outer fiber stress at the time of failure. A four-point-¼ point flexural test was used. The height and the width of the each sample was measured with the precision of about 390 microinch (0.01 mm). The samples were subjected to a stress which was applied at four points by two lower span bearing points and two upper span bearing points. The lower span bearing points were about 1.6 inches (44 mm) apart, the upper span bearing points were about 0.79 inch (20 mm) apart. The upper span was centered over the lower span so that the load was applied substantially symmetrically on each sample. Flexural strength measurements were made with a Universal testing machine (Syntec, Stoughton, Mass.). A cross head speed during testing was about 0.02 inch (0.55 mm) per minute. Flexural strengths determined at 1000° C., 1200° C. and about 1400° C. were performed with another Universal testing machine equipped with an air atmosphere resistance heated furnace (Advance Test Systems, Butler, Pa.). The flexural strength for the composite at room temperature, 1000° C., 1200° C. and 1400° C. was measured at about 137 MPa, 176 MPa, 164 MPa and about 73 MPa, respectively.

The methods of Munz, Shannon and Bubsey (International Journal of Fracture, Vol. 16 (1980), R137–R141) were used to determine the fracture toughness of the silicon nitride reinforced silicon nitride composite. The fracture toughness was calculated from the maximum load of a Chevron notch sample in four-point loading. Specifically, the geometry of the Chevron notch sample was about 1.9 inches (50 mm) long, about 1.8 inches (4.8 mm) wide and about 0.23 inch (6 mm) high. A Chevron notch was cut in each sample with a diamond saw to permit the propagation of a crack starting at the notch and traveling through the sample. Chevron notch sample, having the apex of a Chevron notch pointing downward, were placed into the fixture of a Universal test machine. The notch of a Chevron notch sample was placed between two points about 1.6 inches (40 mm) apart and about 0.79 inch (20 mm) from each pin. The top side of the Chevron notch sample was contacted by two pins about 0.79 inch (20 mm) apart and about 0.39 inch (10 mm) from the notch. The maximum load measurements were made with a Syntec model CITS-2000/6 Universal testing machine (Systems Integration Technology, Inc., Stoughton, Mass.). A crosshead speed of about 0.02 inch (0.58 mm) per minute was used. The cell load of the Universal testing machine was interfaced to a computer data acquisition system. Chevron notch sample dimensions and the maximum load were used to calculate the fracture toughness of the material. Several samples were used to determine an average fracture toughness at a given temperature. The fracture toughness of the silicon nitride reinforced silicon nitride composite body at room temperature, 1000° C., 1200° C. and 1400° C. was measured to be about 3.64 MPa.m½, 3.64 MPa.m½, 3.92 MPa.m½ and 3.04 MPa.m½, respectively.

The thermal conductivity of the silicon nitride reinforced silicon nitride composite body was determined as a function of temperature using the guarded longitudinal heat flow method substantially as described in "Experimental Techniques In Low Temperature Physics" by G. E. White, published by Oxford University Press in 1979. The results of the thermal conductivity as a function of temperatures are shown in Table III.

The volume fraction of the silicon nitride (e.g., matrix and filler material) volume fraction of the residual parent metal and the volume fraction of porosity were determined by quantitative image analysis. A

TABLE III

| Thermal Conductivity Si$_3$N$_4$/Si Composite | |
|---|---|
| Temperature K | k (W/m.K) |
| 273.5 | 122.4 |
| 281.2 | 113.8 |
| 284.7 | 111.5 |
| 295.7 | 105.1 |
| 304.7 | 100.4 |
| 313.2 | 96.8 |
| 321.8 | 93.4 | representative sample of the silicon nitride matrix composite material was cut, mounted and polished. The polished sample was placed on the stage of a NIKON TM microphoto FX optical microscope (Nikon Inc., Japan) equipped with a DAG-MTI series 68 videocamera manufactured in Michigan City, Ind., at the top port. The videocamera signal was sent to a model DV-4400 scientific optical analysis system manufactured by Lamont Scientific of State College, Pa. At a magnification of about 300 X, about 10 video images of the microstructure were acquired through the optical microscope and stored in the Lamont Scientific Optical Analysis System. After verifying that the video images had even lighting, specific color and gray level intensity ranges assigned to specific microstructural features (e.g., specific matrix, residual parent metal or porosity, etc.). To verify that the color and the intensity assignments were accurate, a comparison was made between a video image with assignments and the originally acquired video image. If discrepancies were noted, corrections were made to the video image assignments with a hand held digitizing pen and a digitizing board. Representative video images with assignments were analyzed automatically by the computer software contained within the Lamont Scientific Optical Analysis System to give area percent silicon nitride, area percent silicon carbide, area percent residual parent metal and area percent porosity. Area percent and volume percent have substantially the same volume. The results of this analysis indicated that the silicon nitride reinforced silicon nitride composite body was comprised by volume of about 9.6+/2.1 percent silicon carbide, 69.2+4.8 percent silicon nitride matrix, 20.4+/5.5 percent residual parent metal and about 0.4+/0.09 percent porosity.

Finally, the mineralogical and chemical make-up of the silicon nitride reinforced silicon nitride composite body was determined by using x-ray diffraction analysis, and energy dispersive x-ray analysis using a scanning electron microscope. The results of the x-ray diffraction analysis indicated that the mineralogical make-up of the silicon nitride reinforced silicon nitride composite body comprised residual silicon parent metal and beta silicon nitride. Additionally, the energy dispersive x-ray analysis indicated that, in addition to silicon nitride and residual silicon parent metal, the composite body contained some silicon carbide.

EXAMPLE 17

Among other things, the following Example demonstrates the use of a barrier material on a preform comprised of a filler material mixture to grow a shaped ceramic matrix composite body having a shape corresponding substantially to that of the barrier coated preform. Specifically, the following Example demonstrates, among other things, the use of aluminum nitride and boron nitride on a preform comprised of fired silicon carbide to grow a silicon carbide reinforced silicon nitride composite body.

The method of Example 10 was substantially repeated, except that the preforms of the following Example were coated with either aluminum nitride powder or boron nitride powder.

A barrier mixture was formed by combining $-100$ mesh aluminum nitride (Consolidated Astronautics, Inc., Saddle Brook, N.J.) with ZAP ™ water based specialty rigidizer (ZYP Coating, Inc., Oak Ridge, Tenn.) to form a paintable slurry. The paintable slurry was spread on five sides of two preforms measuring about 2 inches (51 mm) square and having a thickness of about 0.6 inch (15 mm). The coated preforms were first placed into a laboratory hood for about 14 hours and then into an air atmosphere oven set at about 45° C. for 24 hours. To remove any aluminum nitride coating that may have dripped onto the uncoated 2 inches (51 mm) square surface, the uncoated surfaces were sanded by hand before placing the preforms in a setup as described in Example 10. Additionally, two preforms measuring about 2 inches (51 mm) square and having a thickness of about 0.6 inch (15 mm) were coated with a Type BN boron nitride containing suspension (Zyp Coatings, Inc., Oak Ridge, Tenn.). The boron nitride coated preforms were processed substantially in the same manner as the aluminum nitride coated preforms. The setups containing the boron nitride coated and the aluminum nitride coated preforms were combined to form a lay-up and which was placed on a graphite support tray as in Example 10.

The graphite support tray and its contents were then placed into a vacuum furnace which was substantially isolated from the external environment. The furnace chamber was evacuated to at least 30 inches (762 mm) of mercury vacuum and subsequently backfilled with nitrogen to about atmospheric pressure. The furnace chamber was evacuated a second time to a pressure of about $7.9 \times 10^{-6}$ inch ($2 \times 10^{-4}$ mm) of mercury. After checking the retort leak rate, the furance chamber was backfilled with commercially pure nitrogen gas to about atmospheric pressure. The nitrogen gas flow rate of about 1 liter per minute through the furnace chamber was then established. Materials for absorbing any impurity, residual moisture and oxygen were present in the gas supply line to ensure that these contaminants did not reach the lay-up. The furnace chamber and its contents were then heated from about room temperature to about 1600° C. at a rate of about 525° C. per hour. After maintaining a temperature of about 1600° C. for about 24 hours, the temperature of the retort and its contents was decreased to about 1000° C. in about 5 hours. After reaching a temperature of about 1000° C., the temperature of the furnace and its contents were then decreased to about room temperature in about 4 hours.

Figure 23A:
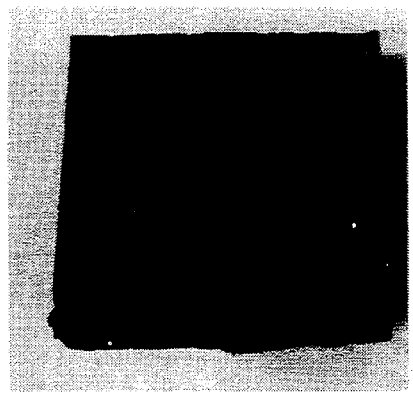
FIGS. 23a and 23b are photographs of the composites produced in accordance with Example 17.
Figure 23B:
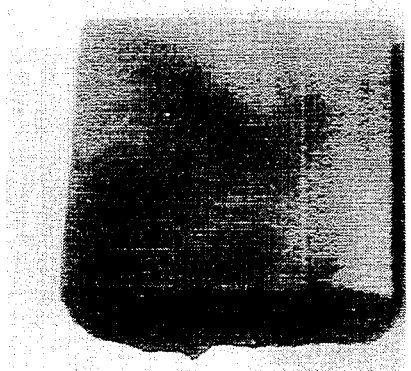

After the furnace chamber and its contents had reached substantially room temperature, the furnace chamber was opened and the graphite tray and its contents were removed from the furnace. The contents of the lay-ups were disassembled to reveal that a silicon nitride oxidation reaction product had grown from the parent metal and into the silicon carbide preforms to form a silicon carbide reinforced silicon nitride composite bodies having a shape corresponding substantially to that of the preforms. FIGS. 23a and 23b are photographs of the resultant net-shaped composite bodies using the aluminum nitride and the boron nitride barrier materials, respectively. Thus, this Example demonstrates that aluminum nitride and boron nitride may be used as barrier materials to the growth of a silicon nitride matrix from a silicon parent metals.

EXAMPLE 18

The following Example demonstrates, among other things, the use of various parent metals to fabricate composite bodies comprising silicon nitride. Moreover, the following Example demonstrates the use of preforms comprising carbon fiber and, specifically, coated carbon fiber to form carbon fiber reinforced silicon nitride composite bodies.

Table IV contains a summary, for each of Samples S-EE, of the preform materials, preform weights, parent metal compositions, parent metal weights and the unit percent weight change.

TABLE IV

| Sample | Preform | Preform Weight (grams) | Parent Metal Composition* | Parent Metal Weight (grams) | Unit Percent Weight Change |
|---|---|---|---|---|---|
| S | carbon fiber (CVI coated) | 7.86 | Si-5 wt % Mn-5 wt % Ni | 50 | 6.7 |
| T | carbon fiber (CVI coated) | 7.63 | Si-5 wt % Mn-5 wt % Cr | 50 | 9.2 |
| U | carbon fiber (CVI coated) | 8.98 | Si-5 wt % Mn-5 wt % Cu | 50 | 6.0 |
| V | carbon fiber (CVI coated) | 8.26 | Si-5 wt % Mo-5 wt % Ni | 50 | 21.2 |
| W | carbon fiber (CVI coated) | 7.65 | Si-5 wt % Fe-5 wt % Ni | 50 | 5.5 |
| X | carbon fiber (CVI coated) | 7.59 | Si-5 wt % Fe-5 wt % Cr | 50 | 5.7 |
| Y | carbon fiber (CVI coated) | 7.67 | Si-5 wt % Fe-5 wt % Cu | 50 | 4.5 |
| Z | carbon fiber (CVI coated) | 7.51 | Si-5 wt % Fe-5 wt % Mo | 50 | 14.1 |

TABLE IV-continued

| Sample | Preform | Preform Weight (grams) | Parent Metal Composition* | Parent Metal Weight (grams) | Unit Percent Weight Change |
|---|---|---|---|---|---|
| AA | carbon fiber 3-D weave (CVI coated, heat treated) | 96.3 | Si-5 wt % Mn | 150 | 3.8 |
| BB | carbon fiber (CVI coated) | 10.4 | Si-1 wt % Fe | 150 | 2.6 |
| CC | carbon fiber (CVI coated) | 10.3 | Si-5 wt % Mn | 150 | 2.4 |
| DD | carbon fiber (CVI coated) | 194.4 | Si-5 wt % Mn | 776 | 3.0 |
| EE | carbon fiber (CVI coated) | 8.05 | Si-5 wt % Mn | 32 | 1.2 |

*Source of alloying elements:
Chromium: 1.5 mm thick chips, 99.996% purity, AESAR Group of Johnson-Matthey Co. Seabrook, NH
Copper: 2-4 mm dia. shot, 99.9% purity, AESAR
Iron: Chips, 99.98% purity, AESAR
Manganese: Chips, 99.9% purity, AESAR
Molybdenum: Minus 250 mesh powder (substantially all particles smaller than about 63 microns in dia.), Alfa Products Div. of Johnson-Matthey Co., Ward Hill, MA
Nickel: Pellets, 99.9% purity, AESAR

SAMPLES S-Z

Samples S-Z were formed substantially in accordance with the method of Example 11. Differences between the formation methods of this Example and those of Example 11 include: (1) the preform material, (2) the parent metal, and (3) the furnace heating ramp rates. These differences are discussed below in greater detail.

Each preform comprised carbon fibers which fibers were chemical vapor infiltrated (CVI) to coat them with carbon followed by silicon carbide. Specifically, a preform measuring about 2 inches (50 millimeters) in length by about 1.5 inches (38 millimeters) in width by about 0.12 inch (3 millimeters) thick and comprising about 8 plies of THORNEL ® T-300 plain weave carbon fabric (Amoco Performance Products, Inc., Ridgefield, Conn.) was arranged such that the fiber direction of alternate plies were at about 90° orientations with respect to adjacent plies. The preform was then CVI coated, first with a layer comprising carbon followed by a layer comprising silicon carbide by Du Pont Advanced Composites of Newark, Del.

Referring to FIG. 17, the CVI coated carbon fiber preform 206 was then coated over its bulk exterior with a boron nitride layer 207 by use of an aerosol spray in substantially the same manner as described in Example 11. The boron nitride was to function as a barrier to infiltration of the matrix of oxidation reaction product and parent metal.

Eight (8) setups 209 (only one depicted in FIG. 17) were formed using eight graphite crucibles 204 each measuring about 3 inches (76 mm) square by about 3.25 inches (83 mm) high and machined from Grade ATJ Graphite (Union Carbide Corporation, Carbon Products Division, Cleveland, Ohio). The machined graphite crucibles were then washed in ethyl alcohol and dried at about 100° C. until the ethyl alcohol had been substantially completely removed. About 45 grams of 99,999% pure silicon metal (Atlantic Equipment Engineers, Bergenfield, N.J.) obtained by substantially the same means as the silicon lump of Example 10, were combined with the appropriate quantities of chips of the alloying elements listed in Table IV to form a parent metal particulate mixture 205 in the bottom of each graphite crucible 204. Each setup 209 was completed in substantially the same fashion as described for the setups of Example 11.

A lay-up 201 comprising the eight substantially similar setups 209 was formed within a graphite boat 202 in substantially the same manner as described in Example 11 with the exception that only the bottom of the boat 202 was lined with the GRAFOIL ® graphite foil 203 (Union Carbide Company, Carbon Products Division, Cleveland, Ohio).

The lay-up 201 and its contents were then placed into a vacuum furnace. After the vacuum furnace door was closed, the furnace and its contents were evacuated and backfilled with nitrogen gas in substantially the same manner as described in Example 11. The purity of the nitrogen gas was such that contamination from oxygen was reduced to less than about 10 ppm.

The furnace and its contents were then heated from about room temperature to about 1500° C. at a rate of about 370° C. per hour, held at about 1500° C. for about 10 hours while maintaining a nitrogen flow rate of about 1 liter per minute at a gauge pressure within the furnace of about 2 pounds per square inch (0.14 kilograms per square centimeter), and cooled to about room temperature at a rate of about 370° C. per hour.

At about room temperature, the lay-up 201 was removed from the furnace, disassembled and each setup 209 was removed from within the graphite boat 202. The weight gain for each setup 209 was noted and is reported in Table IV. Additionally, it was noted that each preform had been infiltrated with a silicon nitride oxidation reaction product and residual unreacted silicon parent metal to form eight carbon fiber reinforced composite bodies comprising silicon nitride.

Thus, this Example demonstrates, among other things, that a carbon fiber reinforced composite body comprising silicon nitride may be made by the directed oxidation of a parent metal comprising silicon into a preform comprising carbon fibers, which fiber had been previously CVI coated with a layer each of carbon and silicon carbide, and the exterior of the preform had been coated with a boron nitride barrier material layer.

SAMPLE AA

Sample AA demonstrates, among other things, the fabrication of a carbon fiber reinforced silicon nitride matrix composite body wherein the carbon fibers are woven into a three-dimensional array. The lay-up employed in fabricating the composite body was substantially the same as that shown in FIG. 15 and described in Example 10 with the exception of a few details which are described in detail below.

The preform was formed into the shape of a disc measuring approximately 3 inches (76 millimeters) in diameter, weighing about 277 grams and comprising carbon fibers similar in character to NOVELTEX® carbon fiber (Societe Europeene de Propulsion, Le Haillan, France). The disc-shaped preform was chemical vapor infiltrated with substantially the same materials in substantially the same manner as was described in the preceding section of this Example 18. The CVI coated preform was then sectioned along a chord of its circumference.

The sectioned CVI coated preform was then exposed to a heat treatment in a nitrogenous atmosphere.

In particular, the sectioned CVI coated preform was placed on a graphite support ring which in turn was placed into a graphite boat. The graphite boat and its contents were then placed into a vacuum furnace. The furnace chamber was evacuated and backfilled with nitrogen gas in substantially the same manner as described in Example 11. After the second evacuation and backfilling, a nitrogen gas flow rate of about 1 liter per minute was established and maintained. Standard materials for absorbing any impurity residual moisture and oxygen were present in the gas line to ensure that these contaminants did not reach the lay-up in any appreciable quantity. The furnace chamber and its contents were then heated from about room temperature to a temperature of about 1400° C. at a rate of about 690° C. per hour. After maintaining the temperature of about 1400° C. for about 24 hours, the temperature of the furnace chamber and its contents was then decreased to about room temperature at a rate of about 690° C. per hour. The graphite boat and its contents were then removed from the vacuum furnace, and the heat treated CVI coated preform was examined visually and weighed. No significant difference in appearance was observed. Moreover, the preform had decreased in weight by only about 0.03 percent for a final weight after this heat treatment of about 96 grams.

Referring to FIG. 15, the coated and heat treated preform was then placed on top of about 150 grams of the Si-5 wt % Mn parent metal particulate mixture 122 contained within graphite crucible 124 such that the sectioned face of the preform contacted the parent metal. The character of the parent metal mixture was substantially the same as that described in Example 10, as was the completion of the lay-up.

The lay-up comprising the graphite support tray 128 and its contents were then placed into a vacuum furnace. The furnace chamber was then evacuated and backfilled with nitrogen gas in substantially the same manner as described in Example 10 with the exception that the second evacuation brought the final pressure down to about $1.2 \times 10^{-4}$ torr.

After establishing a nitrogen gas flow rate of about 1 liter per minute through the furnace chamber, the chamber and its contents were then heated from about room temperature to a temperature of about 1500° C. at a rate of about 740° C. per hour. After maintaining a temperature of about 1500° C. for about 24 hours, the temperature of the furnace chamber and its contents was then decreased to about room temperature at a rate of about 740° C. per hour.

Figure 24A:
FIGS. 24a and 24b are 50 X and 400 X magnification optical photomicrographs, respectively, of the Sample AA composite material produced in accordance with Example 18.
Figure 24B:
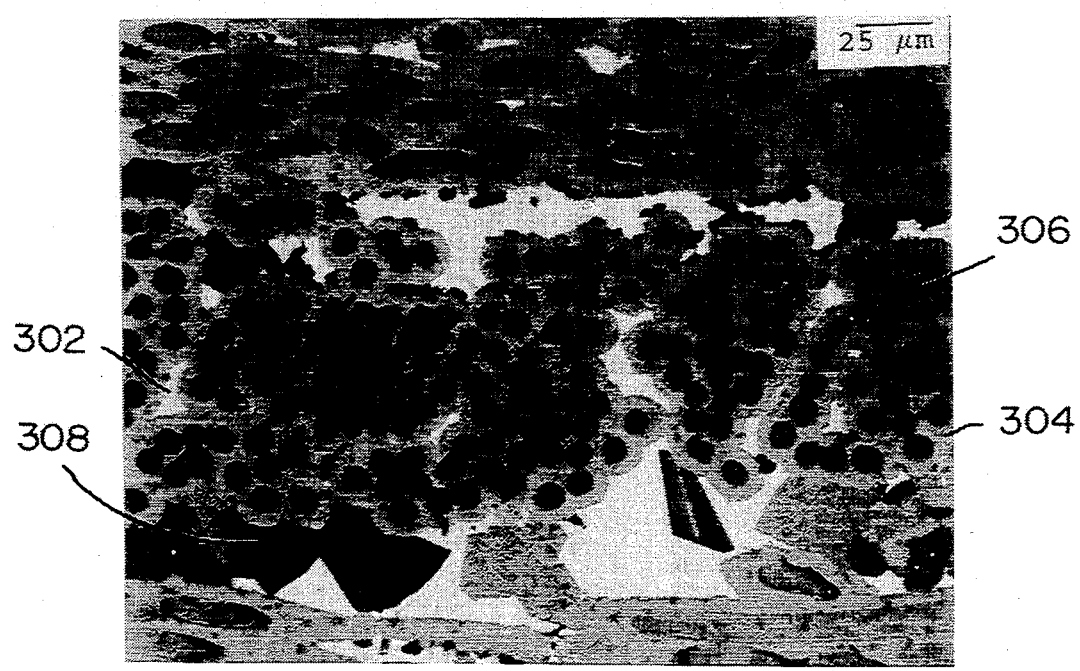
Figure 25:
FIG. 25 is an approximately 400 X magnification scanning electron micrograph of a fracture surface of the Sample AA composite material.

The disassembly of the lay-up following the furnace run was substantially the same as that described in Example 10 and revealed that during the run, molten parent metal 122 had reacted with a nitrogen gas atmosphere to form a matrix comprising silicon nitride and unreacted residual parent metal which embedded the coated carbon fiber preform to form a composite body. FIGS. 24a and 24b are optical photomicrographs taken at about 50 X and 400 X magnification, respectively, of a polished cross section of the formed composite material. In these photomicrographs, the lightest phase comprises silicon 302, the gray phase comprises silicon carbide 304 and the darkest phases comprise either carbon 306, which is identified by its spherical or elliptical morphology, or silicon nitride 308 which is identified by its blocky morphology. FIG. 25 is an approximately 400 X magnification scanning electron micrograph of a fracture surface of the formed carbon fiber reinforced composite material. Substantial pull-out of the fibers are evident from this Figure.

The resultant composite body was then sectioned into appropriately sized samples to measure the Young's Modulus, the shear modulus, Poisson's ratio and the interlaminar shear strength at room temperature, and the flexural strength and fracture toughness at both room temperature and an elevated temperature. The techniques for measuring the elastic properties, the flexural strength and the fracture toughness were substantially the same as those techniques described in Example 16.

The room temperature Young's Modulus and shear modulus were found to be about 124 and 49 gigapascals, respectively. The material had a Poisson's ratio of about 0.267.

At room temperature, this composite material had a four-point flexural strength of about 74 MPa and a chevron-notch fracture toughness of about 3.9 MPa.m$^{\frac{1}{2}}$.

The elevated temperature mechanical properties were measured in substantially the same manner as described in Example 16. At a temperature of about 1000° C. in air, the Sample AA composite material produced a four-point flexural strength of about 58 MPa and a chevron-notch fracture toughness of about 4.6 MPa.m$^{\frac{1}{2}}$.

This Example, therefore, demonstrates that a composite body may be formed by placing a preform comprising a CVI coated and heat treated carbon fiber 3-D weave in the path of the oxidation reaction product of silicon metal and nitrogen gas so as to infiltrate and embed the preform reinforcement with a matrix comprising silicon nitride and silicon.

SAMPLE BB

Sample BB was fabricated by substantially the same procedures as those procedures described above for Samples S-Z with the exception that the amount of parent metal used was about 150 grams and comprised by weight about 1 percent iron and the balance silicon. Specifically, the iron comprised chips of about 99.98% purity (AESAR Group of Johnson-Matthey Company, Seabrook, N.H.). The source and processing of the silicon component of the parent metal was substantially the same as that described in Example 11.

The CVI coated preform had dimensions comparable to the preform described in Samples S-Z and weighed about 10.4 grams.

The exterior of the preform was coated on its top and sides (5 sides in all) with the same barrier material comprising boron nitride in substantially the same manner as described above for Samples S–Z.

The lay-up was assembled in substantially the same manner as described for Samples S–Z. Likewise, the vacuum furnace was evacuated and backfilled with nitrogen gas in substantially the same manner as described for Samples S–Z and the flow rate of the nitrogen gas through the furnace chamber was similarly maintained at substantially the same level.

The furnace chamber and its contents were then heated in substantially the same manner as described for Samples S–Z with the exception that the heating and cooling rates were about 200° C. per hour and the furnace was maintained at a temperature of about 1500° C. for about 24 hours.

The lay-up containing Sample BB was removed from the furnace chamber at about room temperature and parent metal were substantially the same as those described in Example 10.

The same properties which were measured on Sample BB were measured on Sample CC and are similarly reported in Table V. In brief, this Sample CC composite material exhibited a room temperature flexural strength of about 392 MPa, a fracture toughness of about 18.5 MPa.m$^{\frac{1}{2}}$ and an interlaminar shear strength of about 34.8 MPa.

Figure 26A:
FIGS. 26a and 26b are 50 X and 400 X magnification optical photomicrographs, respectively, of a polished cross section of the Sample CC composite material likewise produced in accordance with Example 18.
Figure 26B:

FIGS. 26a and 26b are optical photomicrographs at approximately 50 X and 400 X magnification, respectively, of a polished cross section of the Sample CC composite material. The photomicrographs show the carbon fibers 306, the silicon carbide coating 304 on the fibers, and the matrix of silicon nitride 308 and residual silicon parent metal alloy 302 embedding the coated fibers.

TABLE V

| Sample | Parent Metal Composition | Test Temp (°C.) | 4-point flexural Strength (MPa) | Chevron-Notch fracture toughness (MPa·m$^{\frac{1}{2}}$) | Young's Modulus (GPa) | Shear Mod. (GPa) | Poisson's Ratio | Interlaminar Shear Strength (MPa) |
|---|---|---|---|---|---|---|---|---|
| AA | Si—5Mn | 1000 | 58 ± 12 | 4.6 ± 1.1 | | | | |
| AA | Si—5Mn | 20 | 74 ± 4 | 3.9 ± 0.3 | 124 ± 16 | 49 ± 7 | 0.267 ± .007 | |
| BB | Si—1Fe | 20 | 310 ± 40 | 22.9 ± 2.4 | | | | 31.0 ± 3.0 |
| CC | Si—5Mn | 20 | 392 ± 26 | 18.5 ± 2.5 | | | | 34.8 ± 3.2 | disassembled in a manner similar to Samples S–Z. It was noted that a silicon nitride oxidation reaction product and residual unreacted silicon parent metal had infiltrated the coated carbon fiber preform to form a carbon fiber reinforced composite body having a matrix comprising silicon and silicon nitride. The resultant composite body was then cut into appropriately sized samples to measure the room temperature flexural strength, fracture toughness, and the interlaminar shear strength. The techniques for measuring the flexural strength and the fracture toughness were substantially the same as described in Example 16.

ASTM procedure D2344 was used to measure the interlaminar shear strength. In particular, the height and width of each sample was measured with a precision of about 390 microinches (0.01 millimeters). The samples were subjected to a stress which was applied at three points by two lower span bearing points and one upper span bearing point. The lower span bearing points were separated by about 0.25 inch (6.4 millimeters), and the overall span of the test specimen was about 0.4 inch (10 millimeters). The upper bearing point was centered over the two lower bearing points so that the load was applied substantially symmetrically over the sample. Interlaminar shear strength measurements were made by using a Syntec universal testing machine (Model No. CITS 2000/6, System Integration Technology, Inc., Stoughton, Mass.). The cross-head speed employed during the test was about 0.02 inch (0.5 millimeters) per minute.

This Sample BB composite material exhibited a room temperature flexural strength of about 310 MPa, a fracture toughness of about 22.9 MPa.m$^{\frac{1}{2}}$ and an interlaminar shear strength of about 31.0 MPa.

SAMPLE CC

Sample CC was fabricated in substantially the same manner as Sample BB with the exception that parent metal comprised by weight of about 5 percent manganese and the balance silicon. The components of the

SAMPLES DD–EE

Samples DD–EE were fabricated by substantially the same procedure as the procedure utilized to fabricate Samples S–Z with the following notable exceptions: (1) the parent metal comprised by weight about 5 percent manganese and the balance silicon and weighed about 776 grams for Sample DD and weighed about 32 grams for Sample EE; (2) the vacuum furnace was evacuated to a pressure of between about $3.8 \times 10^{-6}$ and $1.2 \times 10^{-5}$ torr; (3) the vacuum furnace, during the run, was heated and cooled at a ramp rate of about 200° C. per hour; (4) the furnace dwell time at the run temperature of about 1500° C. was about 20 hours. Moreover, the Sample DD preform weighed about 194 grams and was of such a size as to require a Grade AGSX graphite crucible (Union Carbide Company, Carbon Products Division, Cleveland, Ohio), measuring about 10 inches (254 millimeters) square to accommodate the lay-up. Additionally, this graphite crucible was lined on its interior with GRAFOIL ® graphite foil (Union Carbide Company).

The lay-up was removed from the furnace chamber at about room temperature, disassembled following procedures similar to those used for Samples S–Z, and it was noted that a silicon nitride oxidation reaction product and residual unreacted silicon parent metal had infiltrated the coated carbon fiber preform to produce a composite comprising a silicon nitride and silicon alloy matrix embedding a carbon fiber reinforcement, said carbon fiber having a coating of silicon carbide thereon. The resultant composite body was then sectioned into appropriately sized samples to measure the tensile strength, Young's Modulus and the strain to failure.

Specifically, the tensile strength, Young's Modulus and the strain to failure were measured in conjunction with ASTM Test E8 "Standard Methods of Tension Testing of Metallic Materials." The strain of the pin loaded tension test specimen was measured with strain gauges (350 ohm bridges) designated CEA-06-375UW- 350 (Micromeasurements, Inc., Raleigh, N.C.). The tensile test specimen was placed into the gripping fixture of a 5000 pound (2269 kilogram) capacity load cell of a Syntec universal testing machine (Model No. CITS 2000/6, System Integration Technology, Inc., Stoughton, Mass). A computer data acquisition system was connected to the measuring unit and the strain gauges recorded the test responses. The test specimen was deformed at a constant rate of 0.020 inches per minute (0.508 millimeters per minute) in air at ambient temperature until the specimen failed. The tensile stress, Young's Modulus and the strain to failure were calculated from the sample geometry and recorded responses using programs within the computer. These values for Sample DD are shown in Table VI.

TABLE VI

| Room Temperature Properties Derived from Tensile Testing of Sample DD | | |
|---|---|---|
| Strength (MPa) | Young's Modulus (GPa) | Strain-to-Failure (%) |
| 334 | 73 | 0.85 |

While the preceding Examples have been described with particularity, various modifications to these Examples may occur to an artisan of ordinary skill and all such modifications should be considered to be within the scope of the claims appended hereto.

What is claimed is:

1. A shaped self-supporting ceramic composite body, comprising:
a substrate body comprising a three-dimensionally interconnected polycrystalline ceramic matrix incorporating at least one filler material comprising at least one fiber, said ceramic matrix comprising (1) at least one ceramic material comprising at least one polycrystalline oxidation reaction product comprising silicon nitride crystallites and (2) at least one structural feature selected from the group consisting of voids and channels of at least one metallic constituent of a parent metal comprising silicon; and
at least one material contacting at least a portion of a surface boundary of said substrate body, said at least one contacting material comprising at least one material selected from the group consisting of a barrier material and a barrier material that has undergone chemical changes or alterations during formation of said polycrystalline ceramic matrix, said barrier material comprising at least one material selected from the group consisting of titanium nitride, zirconium nitride and aluminum nitride, wherein at least a portion of said at least one contacting material is removably attached to said substrate body.

2. The shaped self-supporting ceramic composite body of claim 1, wherein said filler material comprises at least one shaped self-supporting perform.

3. A shaped self-supporting ceramic matrix composite body comprising a ceramic matrix incorporating at least one mass of filler material having at least one defined surface boundary, said ceramic matrix embedding said filler material and said ceramic matrix consisting essentially of about 60-99 percent by weight of polycrystalline oxidation reaction product comprising silicon nitride, and the remainder of said ceramic matrix consisting essentially of at least one metallic constituent and voids, said self-supporting ceramic matrix composite body corresponding substantially in shape to the configuration of said at least one mass of filler material; and
at least one material contacting at least a portion of said surface boundary of said embedded mass of filler material, said at least one contacting material comprising at least one material selected from the group consisting of a barrier material and a barrier material that has undergone chemical changes or alterations during formation of said ceramic matrix, said barrier material comprising at least one material selected from the group consisting of titanium nitride, zirconium nitride and aluminum nitride, wherein at least a portion of said at least one contacting material is removable from said embedded mass of filler material.

4. The shaped self-supporting ceramic composite body of claim 1, wherein said at least one fiber comprises at least one material selected from the group consisting of silicon nitride, silicon carbide and coated carbon.

5. The shaped self-supporting ceramic composite body of claim 4, wherein said coated carbon comprises carbon coated with at least one material selected from the group consisting of aluminum oxide and silicon carbide.

6. The shaped self-supporting ceramic composite body of claim 1, wherein said parent metal comprising silicon further comprises at least one dopant material selected from the group consisting of manganese, iron, barium, germanium, strontium, copper, vanadium, calcium, chromium and mixtures thereof.

7. The shaped self-supporting ceramic composite body of claim 1, wherein said parent metal comprising silicon further comprises at least one dopant material selected from the group consisting of manganese and iron.

8. The shaped self-supporting ceramic composite body of claim 1, wherein said barrier material comprises aluminum nitride.

9. The shaped self-supporting ceramic composite body of claim 1, wherein said metallic constituent comprises at least one metal dispersed throughout said ceramic matrix, and wherein at least a portion of said metallic constituent is interconnected.

10. The shaped self-supporting ceramic composite body of claim 1, wherein said metallic constituent comprises at least one metal dispersed throughout said the ceramic matrix, and wherein at least a portion of said metallic constituent comprises non-interconnected inclusions.

11. The shaped self-supporting ceramic composite body of claim 1, wherein said ceramic matrix further comprises at least 1% by volume of said voids, said voids being dispersed throughout said ceramic matrix.

12. The self-supporting ceramic composite body of claim 1, wherein said at least one polycrystalline oxidation reaction product comprises silicon nitride and silicon carbide.

13. The self-supporting ceramic composite body of claim 1, wherein said at least one filler material comprises a plurality of carbon fiber substrates, and wherein each of said substrates is coated with carbon and silicon carbide, and wherein said carbon coating is disposed between said silicon carbide coating and said substrate.

14. The self-supporting ceramic composite body of claim 1, wherein said at least one filler material, under those conditions employed fabricating said ceramic composite body, comprises at last one material selected from the group consisting of a thermodynamically stable material, a thermodynamically unstable but kinetically stable material, a material inherently thermodynamically and kinetically unstable but made to be stable, and mixtures thereof.

15. The self-supporting ceramic composite body of claim 1, wherein said at least one filler material possesses a size ranging from about 0.8 microns to about 2000 microns.

16. The self-supporting ceramic matrix composite body of claim 1, wherein said at least one filler material comprises an admixture of at least two grit sizes.

17. A shaped self-supporting ceramic composite body, comprising:

a substrate body comprising a three-dimensionally interconnected polycrystalline ceramic matrix incorporating at least one filler material comprising at least one fiber, said ceramic matrix comprising (1) at least one structural feature selected from the group consisting of metal channels and voids; and (2) at least one polycrystalline oxidation reaction product comprising silicon nitride crystallites, said ceramic matrix characterized by crystal lattice misalignments between adjacent oxidation reaction product crystallites which are less than said lattice misalignments between oxidation reaction product crystallites having said at least one structural feature disposed therebetween; and at least one material which is removably attached to at least a portion of a surface boundary of said substrate body, said at least one material comprising a material selected from the group consisting of a barrier material and a barrier material that has undergone chemical changes during formation of said ceramic matrix, said barrier material comprising at least one material selected from the group consisting of titanium nitride, zirconium nitride and aluminum nitride.

18. The shaped self-supporting ceramic composite body of claim 1, wherein said ceramic matrix possesses at least one microstructural characteristic of a directed metal oxidation.

19. The shaped self-supporting ceramic composite body of claim 18, wherein said at least one microstructural characteristic comprises crystal lattice misalignments between adjacent oxidation reaction product crystallites which are less than said lattice misalignments between oxidation reaction product crystallites having said at least one structural feature disposed therebetween.

20. The shaped self-supporting ceramic composite body of claim 18, wherein interface boundaries between said oxidation reaction product and said at least one metallic constituent are substantially arcuate.

21. The shaped self-supporting ceramic composite body of claim 3, wherein said ceramic matrix possesses at least one microstructural characteristic of a directed metal oxidation.

22. The shaped self-supporting ceramic composite body of claim 3, wherein said filler material comprises at least one fiber.

23. The shaped self-supporting ceramic composite body of claim 4, wherein said silicon carbide comprises fired silicon carbide.

* * * * *